(12) United States Patent
Shiohara

(10) Patent No.: US 10,358,090 B2
(45) Date of Patent: Jul. 23, 2019

(54) VEHICLE IMAGING DEVICE, VEHICLE IMAGING DISPLAY SYSTEM, AND VEHICLE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 137 days.

(21) Appl. No.: 15/501,484

(22) PCT Filed: Aug. 7, 2015

(86) PCT No.: PCT/JP2015/003984
§ 371 (c)(1),
(2) Date: Feb. 8, 2017

(87) PCT Pub. No.: WO2016/024395
PCT Pub. Date: Feb. 18, 2016

(65) Prior Publication Data
US 2017/0225621 A1 Aug. 10, 2017

(30) Foreign Application Priority Data

Aug. 11, 2014 (JP) ................................ 2014-163282
Jul. 7, 2015 (JP) ................................ 2015-136255

(51) Int. Cl.
*H04N 7/18* (2006.01)
*B60R 1/00* (2006.01)
(Continued)

(52) U.S. Cl.
CPC ................ *B60R 1/00* (2013.01); *H04N 5/12* (2013.01); *H04N 5/23296* (2013.01); *H04N 5/247* (2013.01); *H04N 7/0127* (2013.01); *H04N 7/18* (2013.01); *H04N 7/181* (2013.01); *B60K 2350/106* (2013.01); *B60K 2350/1076* (2013.01); *B60K 2350/2013* (2013.01);
(Continued)

(58) Field of Classification Search
CPC ........ B60R 1/00; H04N 5/12; H04N 5/23296; H04N 5/247; H04N 7/0127; H04N 7/181
USPC ......................................................... 348/148
See application file for complete search history.

(56) References Cited

U.S. PATENT DOCUMENTS

| 5,812,332 A | 9/1998 | Freeman |
| 2002/0008926 A1 | 1/2002 | Freeman |

(Continued)

FOREIGN PATENT DOCUMENTS

| JP | 05-008661 A | 1/1993 |
| JP | 06-144083 A | 5/1994 |

(Continued)

*Primary Examiner* — Joseph G Ustaris
*Assistant Examiner* — Matthew David Kim

(57) ABSTRACT

A vehicle imaging device for displaying an image of the outside of a vehicle on a display unit used in the vehicle includes an imaging unit that is attached to the vehicle, images of the outside of the vehicle, and outputs an imaging signal; an image signal generation unit that performs a generation process of generating an image signal indicating an image to be displayed in each line of the display unit based on the imaging signal, and outputs the image signal to the display unit; and a timing control unit that controls a timing when the image signal generation unit outputs the image signal to the display unit.

14 Claims, 33 Drawing Sheets

(51) Int. Cl.
*H04N 5/12* (2006.01)
*H04N 5/232* (2006.01)
*H04N 5/247* (2006.01)
*H04N 7/01* (2006.01)

(52) U.S. Cl.
CPC . *B60K 2350/2052* (2013.01); *B60R 2300/105* (2013.01); *B60R 2300/205* (2013.01); *B60R 2300/303* (2013.01); *B60R 2300/802* (2013.01); *B60R 2300/8033* (2013.01); *B60R 2300/8046* (2013.01); *B60R 2300/8066* (2013.01)

(56) References Cited

U.S. PATENT DOCUMENTS

| | | | |
|---|---|---|---|
| 2004/0109251 | A1 | 6/2004 | Freeman |
| 2005/0158520 | A1 | 7/2005 | Freeman |
| 2005/0168695 | A1* | 8/2005 | Ooba .............. B60R 1/00 353/13 |
| 2009/0244740 | A1 | 10/2009 | Takayanagi et al. |
| 2010/0245701 | A1 | 9/2010 | Sato et al. |
| 2011/0018987 | A1* | 1/2011 | Doi .............. H04N 7/183 348/65 |
| 2012/0050470 | A1 | 3/2012 | Oba |
| 2012/0320205 | A1* | 12/2012 | Hong .............. H04N 7/181 348/148 |
| 2013/0038735 | A1 | 2/2013 | Nishiguchi et al. |
| 2013/0229482 | A1* | 9/2013 | Vilcovsky .............. H04N 7/144 348/14.07 |
| 2013/0300846 | A1* | 11/2013 | Miller .............. H04N 7/183 348/65 |
| 2014/0160339 | A1 | 6/2014 | Shiohara |
| 2014/0186006 | A1* | 7/2014 | Jin .............. H04N 5/772 386/230 |
| 2014/0240542 | A1* | 8/2014 | Toguchi .............. H04N 5/23293 348/231.99 |
| 2015/0062024 | A1* | 3/2015 | Kim .............. G06F 3/0488 345/173 |
| 2015/0183322 | A1* | 7/2015 | Arai .............. G02B 5/02 701/36 |
| 2015/0350555 | A1* | 12/2015 | Nishi .............. H04N 5/23293 348/333.02 |

FOREIGN PATENT DOCUMENTS

| | | |
|---|---|---|
| JP | 07-195959 A | 8/1995 |
| JP | 08-178679 A | 7/1996 |
| JP | 09-254681 A | 9/1997 |
| JP | 10-166943 A | 6/1998 |
| JP | 10-305742 A | 11/1998 |
| JP | 11-255020 A | 9/1999 |
| JP | 2000-131642 A | 5/2000 |
| JP | 2000-177483 A | 6/2000 |
| JP | 2001-114048 A | 4/2001 |
| JP | 3154676 B2 | 4/2001 |
| JP | 2006-135797 A | 5/2006 |
| JP | 2006-248374 A | 9/2006 |
| JP | 2007-110572 A | 4/2007 |
| JP | 2008-094292 A | 4/2008 |
| JP | 2008-126973 A | 6/2008 |
| JP | 2009-075988 A | 4/2009 |
| JP | 2009-141456 A | 6/2009 |
| JP | 4280648 B2 | 6/2009 |
| JP | 2010-058742 A | 3/2010 |
| JP | 2010-221899 A | 10/2010 |
| JP | 4695665 B2 | 6/2011 |
| JP | 4706896 B2 | 6/2011 |
| JP | 2011-213185 A | 10/2011 |
| JP | 2011-213186 A | 10/2011 |
| JP | 2012-049918 A | 3/2012 |
| JP | 2012-240467 A | 12/2012 |
| JP | 2014-103647 A | 6/2014 |
| WO | 2011/118125 A1 | 9/2011 |

\* cited by examiner

FIG. 22

VEHICLE IMAGING DEVICE, VEHICLE IMAGING DISPLAY SYSTEM, AND VEHICLE

TECHNICAL FIELD

The present invention relates to a vehicle imaging device, a vehicle imaging display system, and a vehicle.

BACKGROUND ART

In the related art, an imaging display system that displays an image indicating an external state of a vehicle in the interior of the vehicle and assists the driving of the vehicle has been known. For example, PTL 1 discloses an imaging display system that images an image of a blind spot area of the vehicle by using an image sensor and displays the imaged image on a display unit in the interior of the vehicle. In the following description, a signal output from the image sensor is referred to as an imaging signal, and a signal supplied to the display unit is referred to as an image signal.

CITATION LIST

Patent Literature

PTL 1: Japanese Unexamined Patent Application Publication No. 2010-58742

SUMMARY OF INVENTION

Technical Problem

Incidentally, in general, the imaging display system performs image processing on the imaging signal output from the image sensor, and generates an image signal indicating an image displayed on the display unit. Since the image sensor and the display unit are different devices, these devices are typically operated in synchronization with different reference signals. Thus, there is a discrepancy between the starting of a frame of the imaging signal and the starting of a frame of the image signal, and thus, a delay time becomes long. For example, if the frame of the imaging signal is started immediately after the frame of the image signal is started, as many delay time as one or more frame periods of the image signal occurs.

However, in a case where an electronic imaging display system is used instead of a wing mirror or a rear-view mirror, it is necessary to take the fact that the vehicle moves at a high speed into consideration. That is, if a delay time from when the image sensor images a subject to when the display unit displays the image becomes long, even though a following vehicle is displayed distant from the vehicle itself on the display unit, and thus, an actual distance between the vehicles may be shortened. For example, in a case where the vehicle runs at a speed of 120 km/h, an elapsed time of 30 mS is equivalent to a movement amount of 1 m. The shortening of the delay time is of importance in safely running the vehicle.

The present invention has been made in view of such circumstances, and it is an object of the present invention to display an image of the outside of a vehicle which is useful for safely driving the vehicle by reducing a delay time from imaging to displaying.

Solution to Problem

In order to achieve the above-described object, an aspect of the present invention provides a vehicle imaging device for displaying an image of the outside of a vehicle on a display unit used in the vehicle. The device includes: an imaging unit that is attached to the vehicle, images of the outside of the vehicle, and outputs an imaging signal; an image signal generation unit that performs a generation process of generating an image signal indicating an image to be displayed in each line of the display unit based on the imaging signal, and outputs the image signal to the display unit; and a timing control unit that controls a timing when the image signal generation unit outputs the image signal to the display unit. When a time from when a frame of the imaging signal is started to when a frame of the image signal output to the display unit is started is a phase difference, a frame rate of the imaging unit is a first frame rate, and a highest frame rate at which the display unit is able to display is a second frame rate, the timing control unit is able to perform first timing control for gradually decreasing the phase difference by causing the image signal generation unit to output the image signal such that the frame rate of the display unit is the second frame rate in a case where the phase difference is greater than a predetermined time, and second timing control for causing the image signal generation unit to output the image signal such that the frame rate of the display unit is the first frame rate after the phase difference is equal to or less than the predetermined time.

According to the present invention, it is possible to display the image of the outside of the vehicle which is required to safely drive the vehicle on the display unit within the vehicle. Thus, in a case where the aspect of the vehicle imaging device is used instead of a rear-view mirror, a wing mirror (door mirror), or a fender mirror (mirror provided at a front end of an engine hood of a car), and an auxiliary mirror thereof, the external state of the vehicle which is required to safely drive the vehicle can be visually perceived by the driver. Accordingly, since it is possible to design a vehicle with excellent design and it is not necessary to attach the wing mirror or the fender mirror onto a vehicle external surface, a wind pressure at the time of running is reduced.

Especially in a large-size vehicle such as a truck, it is difficult to sufficiently check the state in the rear of the vehicle by only using the rear-view mirror of the related art. However, according to the present invention, since the state in the rear of the vehicle is imaged by the imaging unit and is displayed as the image, it is possible to sufficiently check the rear of the vehicle. It is not necessary to adjust an orientation of the rear-view mirror or the wing mirror with the hand or using adjustment means such as a button so as to be fit for the driver's seating height or physique unlike the related art, and thus, convenience is improved.

According to the present invention, since the images indicating the states in the rear left area and the rear right area of the outside of the vehicle are displayed on the display unit within the vehicle, it is possible to further reduce the amount of movement of a sightline than the door mirror of the related art requiring a great amount of movement of the sightline in the left and right direction.

Since the external state of the vehicle is displayed as the image, the brightness of an image in a dark place can be corrected and displayed.

According to the present invention, in a case where the phase difference which is the time from when the frame of the imaging signal is started to when the frame of the image signal is started is greater than the predetermined time, the image signal is output at the second frame rate which is the higher frame rate than that of the imaging unit, and thus, the phase difference is reduced by the period equivalent to the difference between the frame period of the display unit and the frame period of the imaging unit. After the phase difference is equal to or less than the predetermined time, the frame rate of the display unit becomes the first frame rate which is the frame rate of the imaging unit, and thus, the image signal is output in synchronization with the imaging signal. As a result, in a case where the phase difference is greater than the predetermined time, it is possible to gradually reduce the phase difference until the phase difference is equal to or less than the predetermined time, and it is possible to maintain the phase difference after the phase difference converges on the length which is equal to or less than the predetermined time. Accordingly, the delay time from the imaging to the displaying is reduced, and thus, it is possible to display the image of the outside of the vehicle which is useful for safely driving the vehicle.

When the time from when the imaging signal is output from the imaging unit to when the image signal is generated is the image processing time, the predetermined time is preferably the image processing time.

In the aspect of the vehicle imaging device, the imaging unit may image an image of a rear lateral area of the vehicle, and the generation process may include at least one of a first process of relatively further magnifying an area of the image based on the imaging signal which is close to a vehicle body in a left and right direction than an area thereof which is far away from the vehicle body and a second process of relatively further magnifying an area of the image based on the imaging signal which is located in the center in an up and down direction than an area thereof which is located in an upper or lower area than the center area. For example, the rear lateral area of the vehicle is equivalent to an area that may be reflected on the wing mirror or the fender mirror of the vehicle, and the auxiliary mirror thereof in the related art. According to the aspect, it is possible to improve visual perceptibility of a useful area by the safety check when the vehicle is driven, among the image based on the imaging signals. For example, it is possible to further improve visual perceptibility of the area which is at least the area close to the vehicle body or the center area without requiring a physical machining process than that in the configuration in which a plane-surface portion and a convex-surface portion are formed on the mirror surface of the wing mirror and the mirror image reflected on the convex-surface portion is contracted.

In this case, preferably, when a length of the area close to the vehicle body in the left and right direction is X1 and a magnification ratio thereof is H1, and a length of the area far away from the vehicle body in the left and right direction is X2 and a minification ratio thereof is H2, the H1 and the H2 may be determined such that $X1+X2=X1 \cdot H1+X2 \cdot H2$ in the first process, and when a length of the center area in the up and down direction is Y1 and a magnification ratio thereof is V1, a length of the upper area in the up and down direction is Y2 and a minification ratio thereof is V2, and a length of the lower area in the up and down direction is Y3 and a minification ratio thereof is V3, the V1, the V2 and the V3 may be determined such that $Y1+Y2+Y3=Y1 \cdot V1+Y2 \cdot V2+Y3 \cdot V3$ in the second process. According to the aspect, it is possible to cause the size ratio between the areas to be different without changing the entire size of the image based on the imaging signal.

Preferably, the aspect of the vehicle imaging device may further include: an operation unit through which an instruction of a user is able to be input. At least one of the magnification ratio of the area close to the vehicle body in the left and right direction and the minification ratio of the area far away from the vehicle body in the left and right direction, and at least one of the magnification ratio of the center area in the up and down direction, the minification ratio of the upper area in the up and down direction, and the minification ratio of the lower area in the up and down direction may be input through the operation unit in the first process. If any one of the magnification ratio of the area close to the vehicle body in the left and right direction and the minification ratio of the area far away from the vehicle body in the left and right direction is determined, the other ratio may be determined through calculation. Similarly, in a case where the minification ratio of the upper area in the up and down direction and the minification ratio of the lower area in the up and down direction are the same, if at least one of the magnification ratio of the center area in the up and down direction, the minification ratio of the upper area in the up and down direction, and the minification ratio of the lower area in the up and down direction is determined, the other two ratios may be determined through calculation.

According to the aspect, the user can change the magnification ratios and the minification ratios of the respective areas as desired, and thus, convenience is improved.

In the aspect of the vehicle imaging device, the generation process may include a trimming process of trimming the image based on the imaging signal. According to the aspect, it is possible to generate an image of an area acquired by removing a portion that is recognized as being unnecessary by the driver from the image based on the imaging signal.

In this case, preferably, the imaging unit may be fixed to and attached to the vehicle, and in the trimming process, the image based on the imaging signal may be trimmed in response to an operation of an operation unit through which an instruction of a user is input. According to the aspect, it is possible to cut an area designated by the driver from the image based on the imaging signal, and thus, the convenience of the driver is improved. That is, it is possible to arbitrarily change the area by an electronic method of cutting an area desired to be seen from the image based on the imaging signal to display the desired area instead of allowing the driver to mechanically change an orientation of the wing mirror in the up, down, left, and right directions to select the area desired to be seen as in the related art. It is possible to arbitrarily change an area desired to be seen of an image having a wide area imaged at a wide angle without providing a movable unit for mechanically moving a camera of the imaging unit.

In the aspect of the vehicle imaging device, the generation process may include a trimming process of trimming the image based on the imaging signal, and a magnification varying process of magnifying or minifying a first area and a second area of the image based on the imaging signal to cause a magnification of the first area and a magnification of the second area to be different, and the magnification varying process may be performed after the trimming process. According to the aspect, since the magnification varying process is performed after the trimming process, it is possible to previously exclude the image of the area to be cut by the trimming process from a target of the magnification varying process.

In the aspect of the vehicle imaging device, the generation process may include a process of generating a mirror image acquired by reversing the left and right of the image based on the imaging signal. According to the aspect, it is possible to check the safety by using the image of which the left and right are the same as those of the mirror image reflected on the wing mirror or the fender mirror of the related art.

In the aspect of the vehicle imaging display system according to the present invention, the imaging unit may include a lens, and an image sensor that outputs the imaging signal, and the generation process may include a process of correcting distortion of the lens. Distortion (for example, distortion which is further expanded outwards or is further contracted inwards than the image to be originally displayed) caused by the optical characteristics of the lens included in the imaging optical system may occur in the image indicated by the imaging signal. According to the present invention, since the distortion caused by the optical characteristics of the lens can be corrected, the image of which the distortion is corrected is provided to the driver of the vehicle, and the visual perceptibility of the area of the outside of the vehicle is improved.

Another aspect of the present invention provides a vehicle imaging display system including: the aforementioned vehicle imaging device; and the display unit. According to the present invention, it is possible to acquire the same advantages as those of the vehicle imaging device.

In the vehicle imaging display system, the display unit may include a projector, a field lens that adjusts a direction of irradiation light of the projector, and a combiner that reflects light from the field lens to output the reflected light through an opening, and the projector and the field lens may be provided above the opening. According to the aspect, since the projector and the field lens are provided above the opening, there is an advantage that external rubbish or dust is difficult to adhere to the lens or the like even though the rubbish or dust are introduced through the opening.

In the aspect of the vehicle imaging display system, three pairs of vehicle imaging devices and display units may be provided, and the three pairs may include a first vehicle imaging device that outputs the image signal indicating an image of a rear left side of the vehicle, a second vehicle imaging device that outputs the image signal indicating an image of a rear side of the vehicle, a third vehicle imaging device that outputs the image signal indicating an image of a rear right side of the vehicle, a first display unit that displays the image signal output from the first vehicle imaging device, a second display unit that displays the image signal output from the second vehicle imaging device, and a third display unit that displays the image signal output from the third vehicle imaging device. The first display unit may be disposed on a left side of the second display unit, and the third display unit may be disposed in a right side of the second display unit. The first display unit that displays the image signal output from the first vehicle imaging device may be provided. According to the present invention, the driver who gets used to the right wing mirror, the rear-view mirror, and the left wing mirror of the related art can visually perceive the image without feeling a sense of incompatibility.

Still another aspect of the present invention provides a vehicle including the aforementioned vehicle imaging display system. According to the present invention, it is possible to acquire the same advantages as those of the vehicle imaging display system.

BRIEF DESCRIPTION OF DRAWINGS

FIG. 22 is a timing chart for describing the operation of the vehicle imaging display system 1.

DESCRIPTION OF EMBODIMENTS

Embodiments for implementing the present invention will be described with reference to the drawings. In the respective drawings, dimensions and scales of the respective units are appropriately different from actual dimensions and scales. Since the embodiments to be described below are preferable specific examples of the present invention, various preferable technical limitations are imposed thereon. However, the scope of the present invention is not limited to these embodiments unless there is particularly description limiting the present invention in the following description.

A. First Embodiment

Hereinafter, a vehicle imaging display system 1 according to a first embodiment of the present invention will be described.

1. Entire Configuration of Imaging Display System

Figure 1:
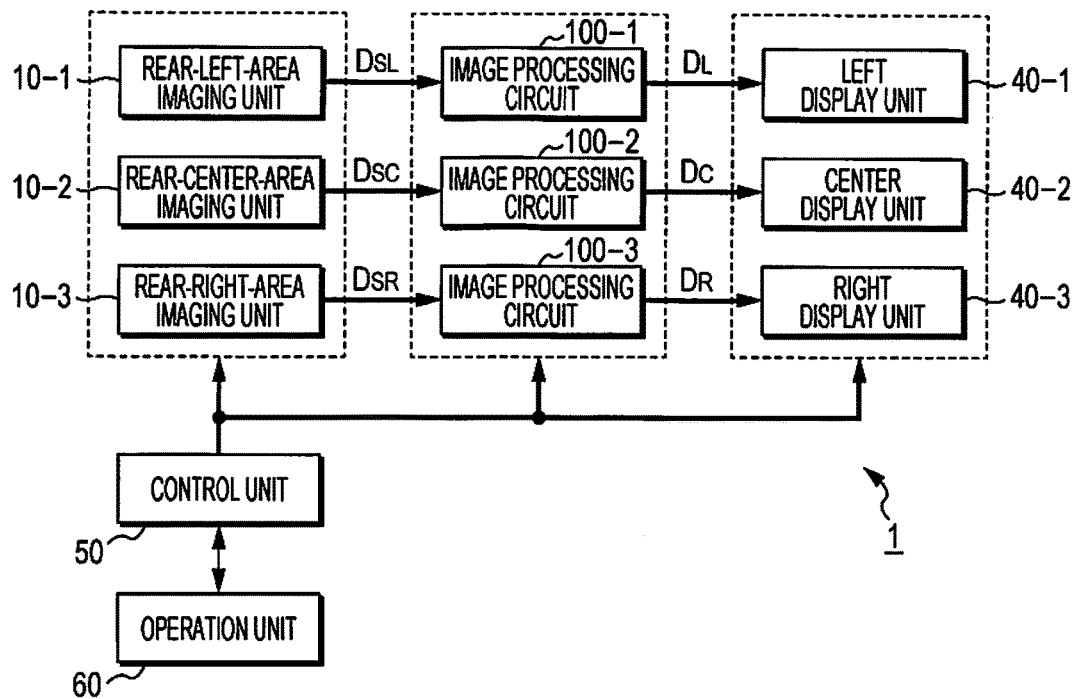
FIG. 1 is a schematic block diagram showing a configuration of a vehicle imaging display system 1 according to a first embodiment of the present invention.

FIG. 1 is a block diagram showing a schematic configuration of the vehicle imaging display system 1. The vehicle imaging display system 1 is a system that displays an image for assisting the running of a vehicle when a driver drives a vehicle such as an automobile or a tram.

As shown in FIG. 1, the vehicle imaging display system 1 includes a rear-left-area imaging unit 10-1, a rear-center-area imaging unit 10-2, a rear-right-area imaging unit 10-3, image processing circuits 100-1, 100-2, and 100-3 that respectively generate image signals DL, DC, and DR by performing image processing on imaging signals DSL, DSC, and DSR output from these imaging units, and a left display unit 40-1, a center display unit 40-2, and a right display unit 40-3 which display images indicated by the image signals DL, DC, and DR.

The vehicle imaging display system 1 includes an operation unit 60 for inputting a change of the setting or an instruction related to image processing of an imaging signal DS, and a control unit 50 that controls an operation of the entire vehicle imaging display system 1. The operation unit 60 is a touch panel provided integrally with a display device. For example, the driver can input an instruction for designating a trimming position in a process of trimming an image based on the imaging signal DS through the operation unit 60. After the image based on the imaging signal DS is divided into a plurality of areas, a minification ratio and a magnification ratio may be input for a process of minifying or magnifying the respective areas.

In the vehicle imaging display system 1, the rear-left-area imaging unit 10-1, the rear-center-area imaging unit 10-2, the rear-right-area imaging unit 10-3, the image processing circuits 100-1, 100-2, and 100-3, the operation unit 60, and the control unit 50 are an example of a "vehicle imaging device".

In the following description, the rear-left-area imaging unit 10-1, the rear-center-area imaging unit 10-2, and the rear-right-area imaging unit 10-3 may be referred to as an "imaging unit 10". Similarly, the left display unit 40-1, the center display unit 40-2, and the right display unit 40-3 may be referred to as a "display unit 40", and the image processing circuits 100-1, 100-2, and 100-3 may be referred to as an "image processing circuit 100".

The rear-left-area imaging unit 10-1 may image a subject existing in a rear left area of the vehicle, the rear-center-area imaging unit 10-2 may image a subject existing in a rear area of the vehicle, and the rear-right-area imaging unit 10-3 may image a subject existing in a rear right area of the vehicle.

Figure 2:
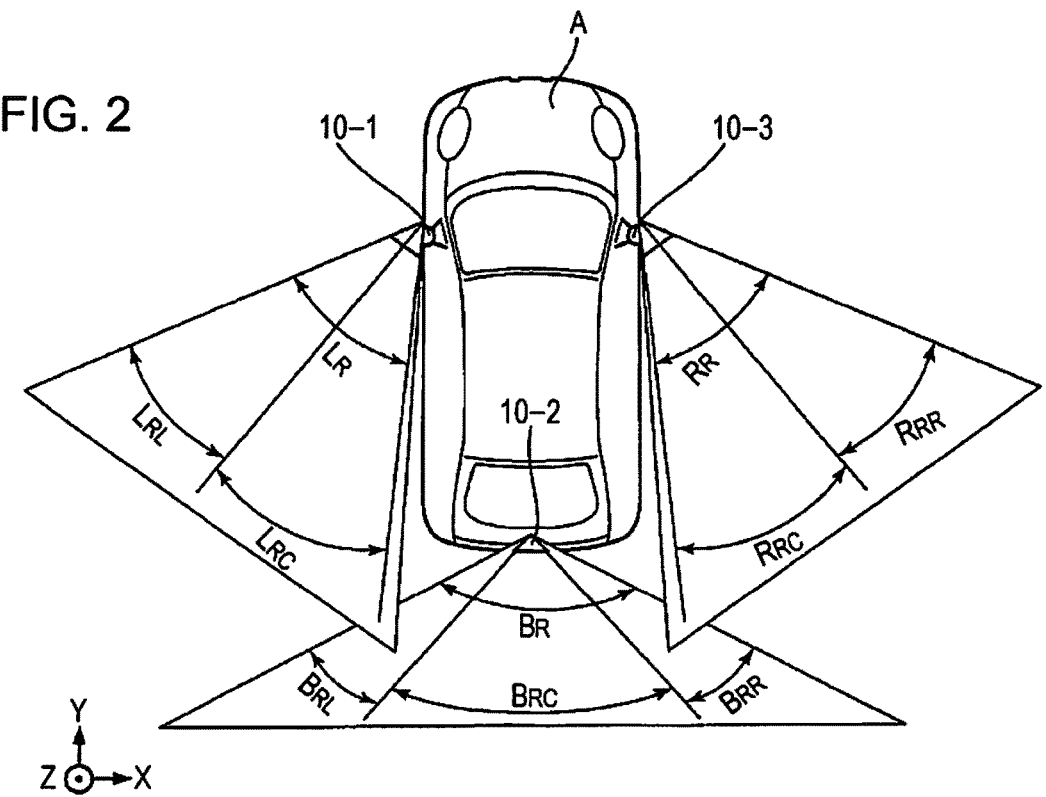
FIG. 2 is a diagram showing an arrangement example of a rear-left-area imaging unit 10-1, a rear-center-area imaging unit 10-2, and a rear-right-area imaging unit 10-3 in a vehicle A.

An arrangement example of the rear-left-area imaging unit 10-1, the rear-center-area imaging unit 10-2, and the rear-right-area imaging unit 10-3 in the vehicle is shown in FIG. 2. As shown in FIG. 2, the rear-left-area imaging unit 10-1 is disposed near (in a position in which a left wing mirror according to the related art is provided in the example of the drawing) an external surface of a left front A pillar of a vehicle A, and images a rear left area LR of the vehicle A. The rear-right-area imaging unit 10-3 is disposed near (in a position in which a right wing mirror according to the related art is provided in the example of the drawing) an external surface of a right front A pillar of the vehicle A, and images a rear right area RR of the vehicle A. The rear-center-area imaging unit 10-2 is disposed near (on a lower side of a rear window in the example of the drawing) a midpoint of a rear end of the vehicle A in a vehicle width direction, and images a rear area BR of the vehicle. The arrangement example of the drawing is an example, and may be appropriately changed without departing from the gist of the present invention. For example, the rear-left-area imaging unit 10-1 and the rear-right-area imaging unit 10-3 may be arranged beside headlamps attached to, for example, the front of the vehicle A. In this case, since the rear side can be checked in a wider range than that in the illustrated example, it is possible to further improve safety.

The left display unit 40-1 displays an image of the rear left area LR instead of the left wing mirror of the related art, and the center display unit 40-2 displays an image of the rear area BR instead of the rear-view mirror of the related art. The right display unit 40-3 displays an image of the rear right area RR instead of the right wing mirror of the related art. That is, the left display unit 40-1, the center display unit 40-2, and the right display unit 40-3 respectively display an image corresponding to the imaging signal DSL, an image corresponding to the imaging signal DSC, and an image corresponding to the imaging signal DSR (precisely, an image corresponding to the image signal DL, an image corresponding to the image signal DC, and an image corresponding to the image signal DR on which the image processing has been performed by the image processing circuit 100) which are respectively output from the rear-left-area imaging unit 10-1, the rear-center-area imaging unit 10-2, and the rear-right-area imaging unit 10-3.

Figure 3A:
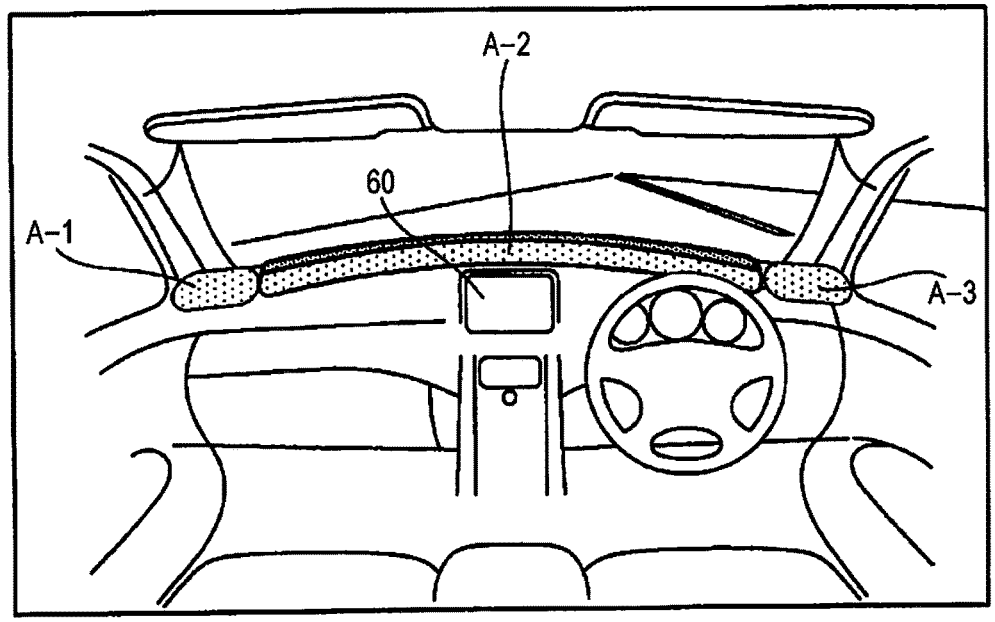
FIG. 3A is a diagram showing an arrangement example of a display area in the interior of the vehicle A.
Figure 3B:
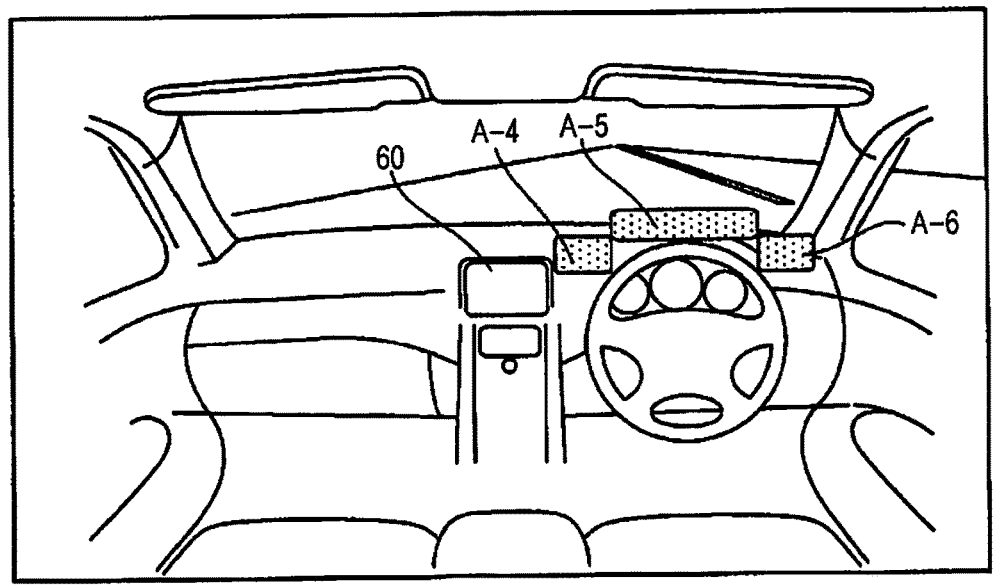
FIG. 3B is a diagram showing an arrangement example of a display area in the interior of the vehicle A.
Figure 3C:
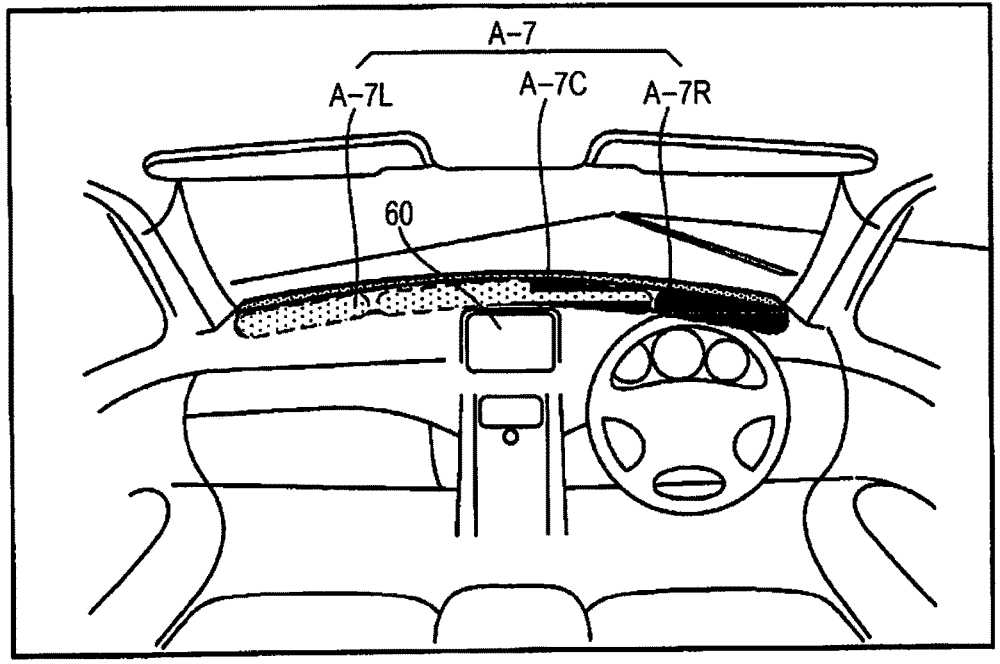
FIG. 3C is a diagram showing an arrangement example of a display area in the interior of the vehicle A.

Arrangement examples of display areas of the images displayed by the left display unit 40-1, the center display unit 40-2, and the right display unit 40-3 in the interior of the vehicle A are shown in FIGS. 3A, 3B, and 3C. In any example thereof, the left display unit 40-1, the center display unit 40-2, and the right display unit 40-3 are arranged in front of the driver's seat such that the images displayed by the display units are visually perceived by the driver with ease. The left display unit 40-1 is disposed such that an area in which the image displayed in the rear left area LR is visually perceived by the driver is located on a left side of an area in which the image displayed in the rear area BR is visually perceived. The right display unit 40-3 is disposed such that an image displayed on the image of the rear right area RR is located on a right side of an area in which the image displayed in the rear area BR is visually perceived. That is, the center display unit 40-2 is disposed such that an area in which the image displayed in the rear area BR is visually perceived by the driver is located between an area in which the image displayed in the rear left area LR is visually perceived and an area in which the image displayed in the rear right area RR is visually perceived. The left display unit 40-1, the center display unit 40-2, and the right display unit 40-3 are arranged in this manner, and thus, the driver who gets used to the right wing mirror, the rear-view mirror, and the left wing mirror of the related art can visually perceive the image without feeling a sense of incompatibility.

That is, the images in the rear left and right areas and the rear center area are preferably arranged so as to be intuitively understood by the driver. Thus, preferably, the image in the rear left area (image displayed in the rear left area LR) is relatively disposed on a left side in front of the driver, the image in the rear right area (image displayed on the image of the rear right area RR) is relatively disposed on a right side in front of the driver, the image in the rear center area (image displayed in the rear area BR) is disposed between the image in the rear left area and the image in the rear right area (near a midpoint), or on an upper side or a lower side of the midpoint.

In FIGS. 3A, 3B, and 3C, the liquid crystal panel of the center (an intermediate area between the front of the driver's seat and the front of a front passenger's seat) of a dashboard is the operation unit 60 according to the present embodiment.

In the example shown in FIG. 3A, the left display unit 40-1 and the right display unit 40-3 are respectively arranged within the left front A pillar and the right front A pillar, and the image corresponding to the imaging signal DSL and the image corresponding to the imaging signal DSR are displayed so as to be visually perceived in areas A-1 and A-3 near the left and right front A pillars. The center display unit 40-2 is disposed within the dashboard under a windshield in front of the driver's seat, and the image corresponding to the imaging signal DSC is displayed so as to be visually perceived in a strip-shaped area A-2 on a lower portion of the windshield glass.

Figure 4:
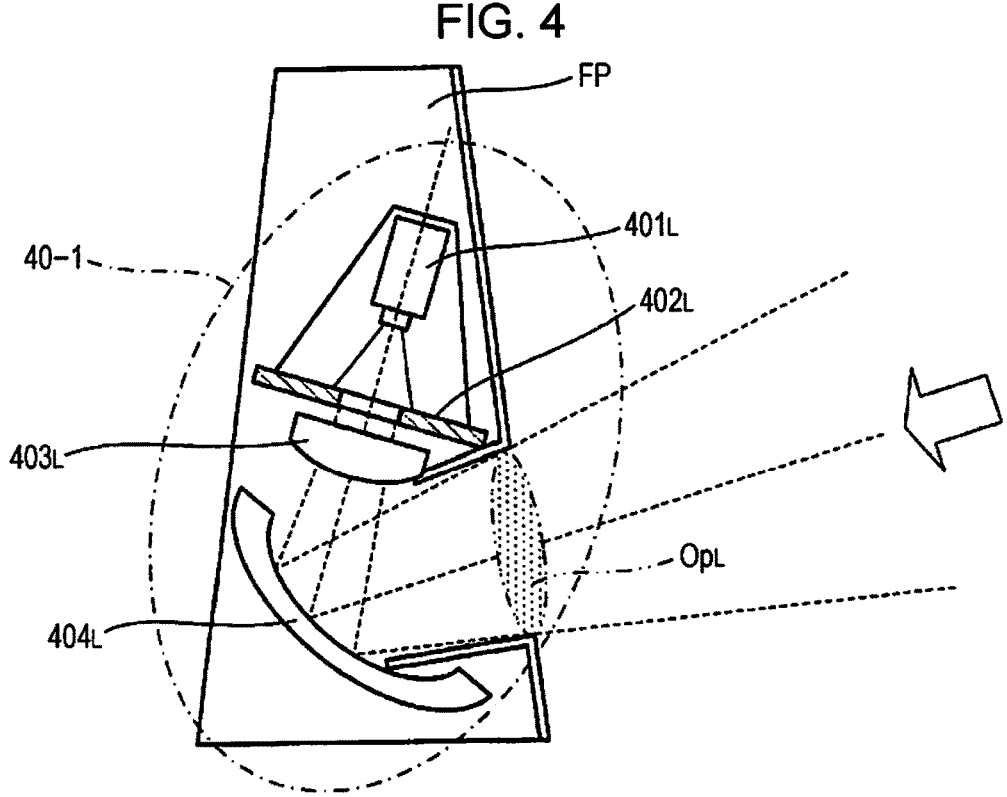
FIG. 4 is a diagram showing a configuration example of a left display unit 40-1.

In the present embodiment, the display unit 40 is a so-called head-up display (HUD). FIG. 4 shows a configuration example of the left display unit 40-1 disposed in a left front A pillar FP. FIG. 4 is a longitudinal sectional view when the left display unit 40-1 is viewed in a sightline direction of the driver. As shown in FIG. 4, the left display unit 40-1 includes a pico projector 401L, a transmission type screen 402L, a field lens 403L, and a combiner (concave half mirror) 404L. The pico projector 401L projects the image corresponding to the input image signal D onto the transmission type screen 402L to draw a real image. Light that penetrates through the transmission type screen 402L is reflected from the combiner 404L after a direction of the image is adjusted by the field lens 403L. In this case, if the light reflected from the combiner 404L is incident on the eyes of the driver through an opening OpL of the left front A pillar, the driver sees the image that looks as if the image is magnified and displayed in the area A-1 of the left front A pillar (that is, a virtual image of the magnified image is formed in front of the left front A pillar). The right display unit 40-3 has the same configuration as that of the left display unit 40-1. That is, the right display unit 40-3 includes a pico projector 401C, a transmission type screen 402C, a field lens 403C, and a combiner 404C (all are not shown). An orientation of the combiner 404C may be appropriately adjusted depending on the sightline of the driver.

The display unit 40 according to the present invention is not limited to the aspect of the present embodiment, and may be a HUD that displays a virtual image of a direct-vision type panel, a projector type HUD, or a direct-vision type display panel such as a liquid crystal display (LCD) or an organic EL panel.

Here, as shown in the drawing, since the pico projector 401L projects downwards, a projection surface (facing surface to the field lens 403L) of the transmission type screen 402L on which the real image is drawn heads downwards. That is, the pico projector 401L, the transmission type screen 402L, and the field lens 403L are provided above the opening OpL. Thus, there is an advantage that rubbish or dust is difficult to adhere to the projection surface of the transmission type screen 402L and the field lens 403L unlike the configuration in which the transmission type screen 402L is disposed such that the projection surface thereof heads upwards. It is possible to easily clean a front surface of the combiner 404L (for example, it is possible to easily remove adhesion substances).

A configuration in which the real image projected on a translucent screen through the opening OpL is seen by the driver may be adopted instead of the configuration in which the virtual image is seen by the driver by using the combiner 404L. Preferably, the real image may be projected on the screen of the opening OpL from a rear surface (that is, the inside of the opening OpL) by the projector.

Figure 5:
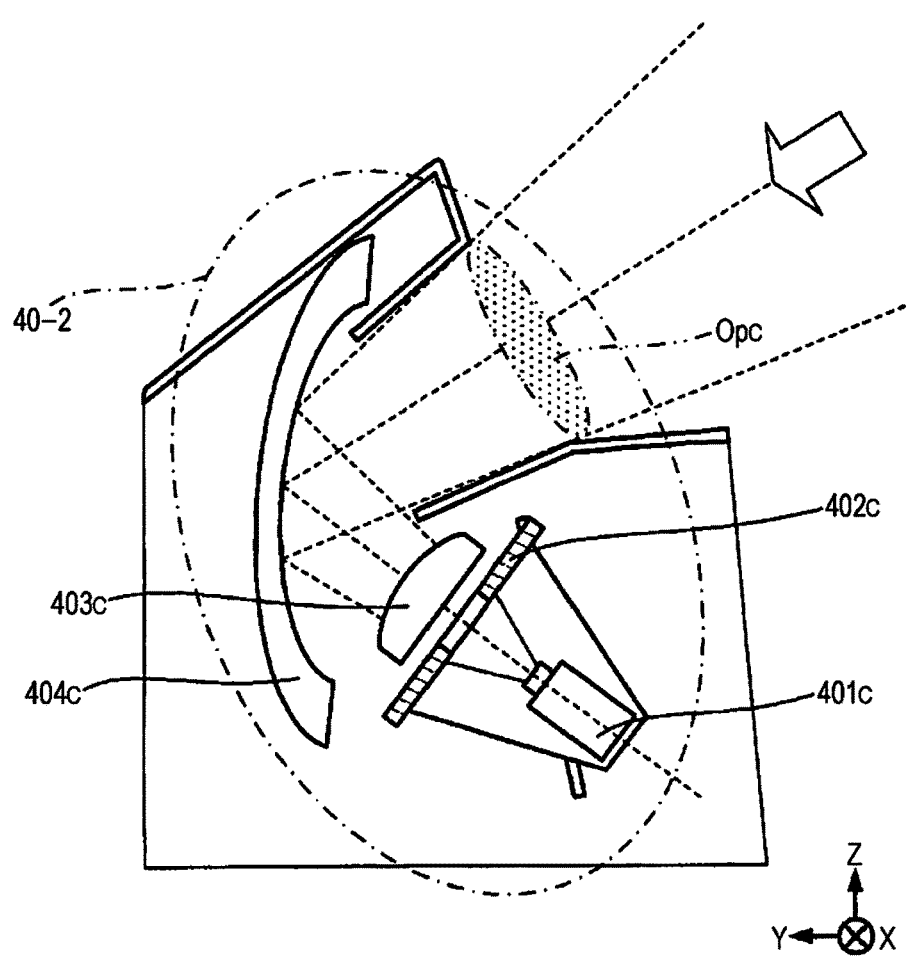
FIG. 5 is a diagram showing a configuration example of a center display unit 40-2.

FIG. 5 shows a configuration example of the center display unit 40-2 disposed within the dashboard. Similarly to the left display unit 40-1, the center display unit 40-2 also includes the pico projector 401C, the transmission type screen 402C, the field lens 403C, and the combiner 404C. As shown in the drawing, the pico projector 401C causes projection light to reflection from the combiner 404C via the transmission type screen 402C and the field lens 403C from a diagonal direction. The light reflected from the combiner 404C is reflected in the eyes of the driver through the opening OpC of the dashboard, the driver sees the image that looks as if the image is magnified and displayed in the area A-2. The opening OpC may be closed by a transparent plate, and thus, it may be possible to prevent rubbish or dust from entering the inside thereof. Similarly to the left display unit 40-1, the transparent screen may be provided in the opening OpC, and the real image from the projector may be projected on the screen.

In the example shown in FIG. 3B, as shown in the drawing, the images are displayed such that the image (that is, the image corresponding to the imaging signal DSC) indicating the rear area BR of the vehicle A is visually perceived in an area A-5 on an upper side of the instrument panel of the vehicle A, the image (that is, the image corresponding to the imaging signal DSL) indicating the rear left area LR in the rear of the vehicle A is visually perceived in an area A-4 on a left side of the panel, and the image (that is, the image corresponding to the imaging signal DSR) indicating the rear right area RR is visually perceived in an area A-6.

In the example shown in FIG. 3C, the image indicating the rear left area LR, the image indicating the rear area BR, and the image indicating the rear right area RR are displayed such that all these images are visually perceived in a strip-shaped area A-7 on the lower portion of the windshield glass. In this case, in the area A-7, an area A-7L in which the image (that is, the image corresponding to the imaging signal DSL) indicating the rear left area LR of the vehicle A is visually perceived, an area A-7R in which the image (that is, the image corresponding to the imaging signal DSR) indicating the rear right area RR is visually perceived sandwich an area A-7C in which the image (that is, the image corresponding to the imaging signal DSC) indicating the rear area BR of the vehicle A.

As shown in FIGS. 3A to 3C, in the vehicle imaging display system 1 according to the present embodiment, in a case where the rear left area LR of the vehicle A, the rear area BR of the vehicle A, and the rear right area RR of the vehicle A are imaged, and these images are displayed in a place that is able to be viewed by the driver, an image indicating the rear left area LR is located on a left side of an image indicating the rear area BR, an image indicating the rear right area RR is located on a right side of the image indicating the rear area BR, and the image indicating the rear area BR is located on a right side of the image indicating the rear left area LR and on a left side of the image indicating the rear right area RR. Accordingly, the respective images are located such that the driver can intuitively and visually perceive the rear left side of the vehicle A, the rear center side of the vehicle A, and the rear right side of the vehicle A.

The examples shown in FIGS. 3A to 3C are merely examples, and for example, the image indicating the rear left area LR may be disposed on a left side of the driving position of the driver, and the image indicating the rear right area RR may be disposed on a right side of the driving position of the driver. In this case, for example, the image indicating the rear area BR may be disposed between the image indicating the rear left area LR and the image indicating the rear right area RR.

Figure 6:
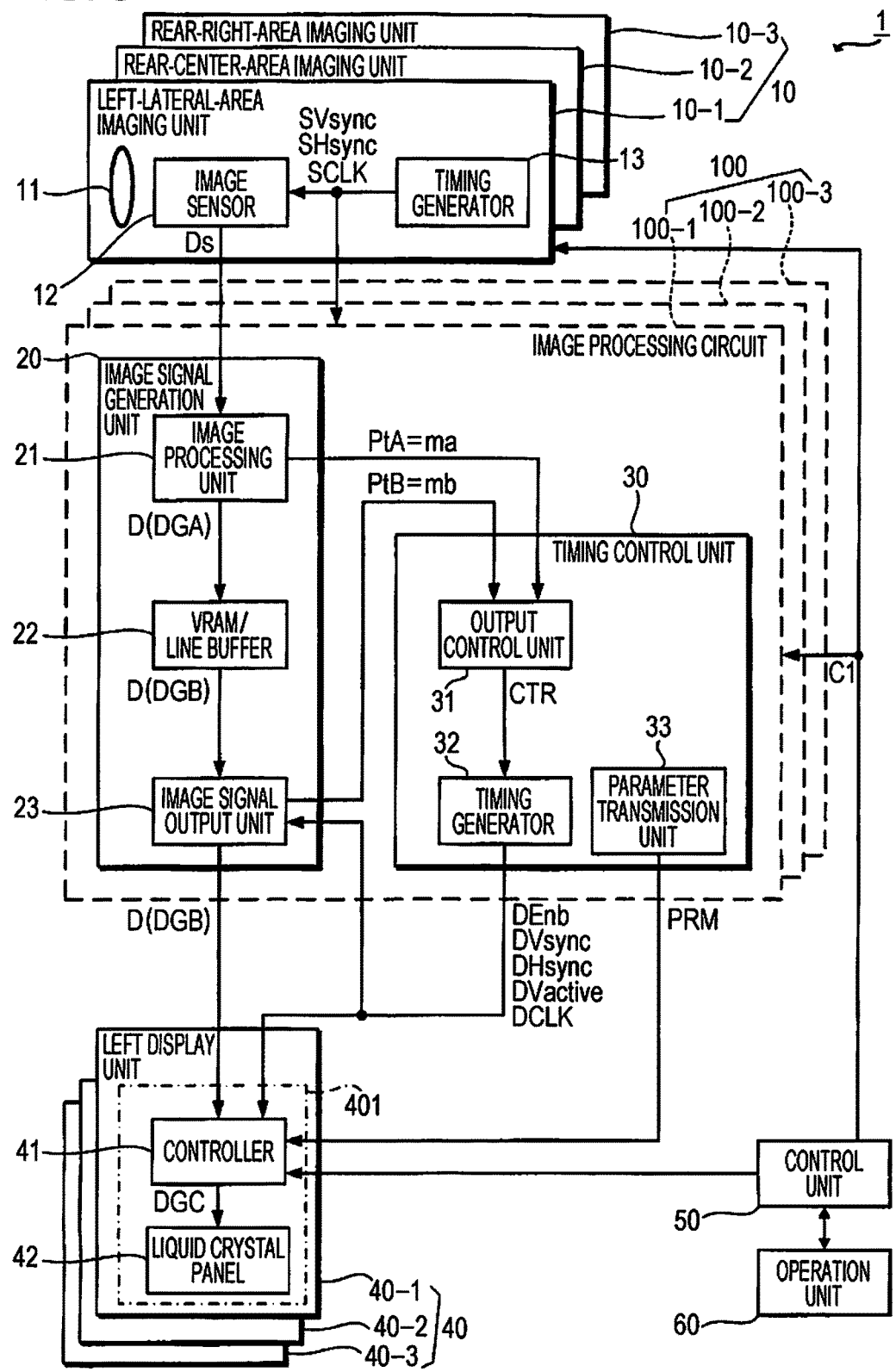
FIG. 6 is a block diagram showing a detailed configuration of the vehicle imaging display system 1.

FIG. 6 is a block diagram showing a detailed functional configuration of the vehicle imaging display system 1.

As shown in FIG. 6, the rear-left-area imaging unit 10-1 includes an imaging optical system 11 that forms an image of the subject, an image sensor 12 that sequentially scans signals from light receiving elements (imaging elements) arranged in a matrix shape through line scanning to output an imaging signal DS corresponding to the image of the subject, and a timing generator 13 that outputs various timing signals to the image sensor 12. The rear-center-area imaging unit 10-2 and the rear-right-area imaging unit 10-3 have the same configuration as that of the rear-left-area imaging unit 10-1.

In the following description, for the sake of simplicity, it is assumed that the imaging signal DSL output from the rear-left-area imaging unit 10-1 is the imaging signal DS. The respective imaging signals DSL, DSC, and DSR are simply described as the imaging signal DS unless it is necessary to particularly distinguish between these signals. Similarly, the image signal DL output from the image processing circuit 100-1 is described as the image signal D, and the respective image signals DL, DC, and DR are simply described as the image signal D unless it is necessary to particularly distinguish between these signals.

Figure 7:
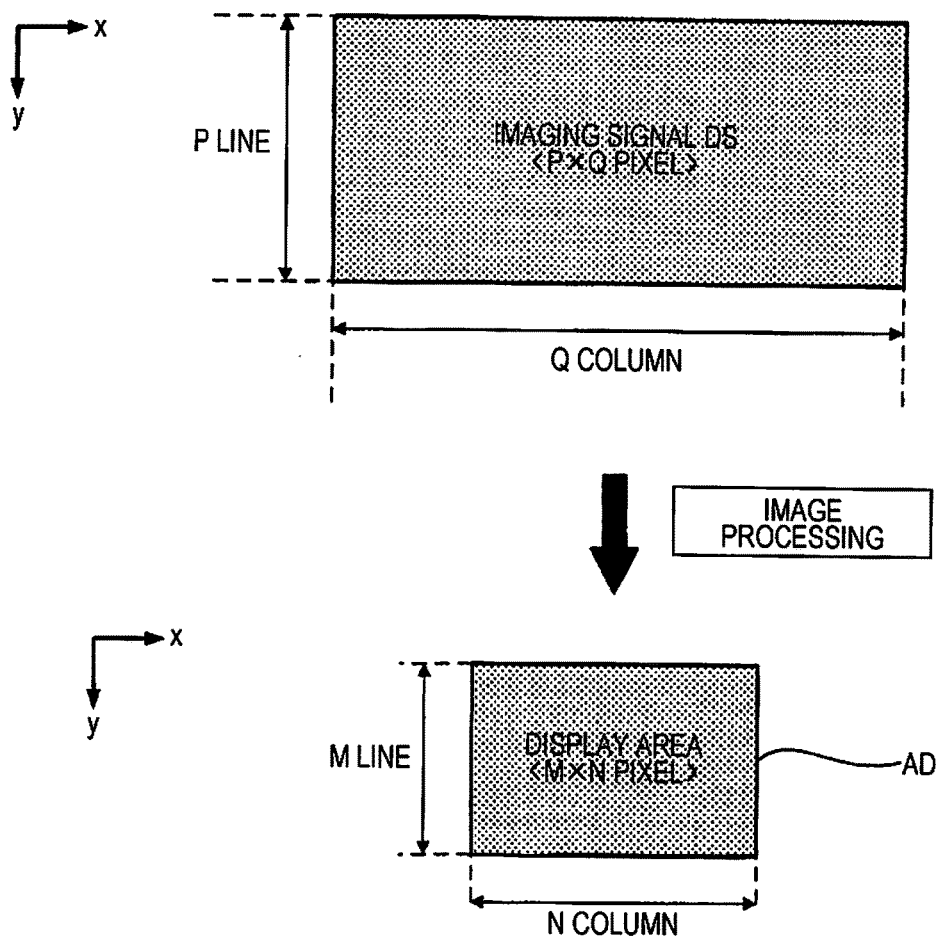
FIG. 7 is an explanatory diagram for describing the relationship between an imaging signal DS and a display area AD.

As shown in FIG. 7, the image sensor 12 is output as the imaging signal DS corresponding to the pixels in P rows×Q columns. The image processing circuit 100 performs the image processing on the imaging signal DS, and outputs the image signal D corresponding to the pixels in M rows×N columns (M is a natural number which satisfies $2 \leq M \leq P$. N is a natural number which satisfies $2 \leq N \leq Q$).

Figure 8:
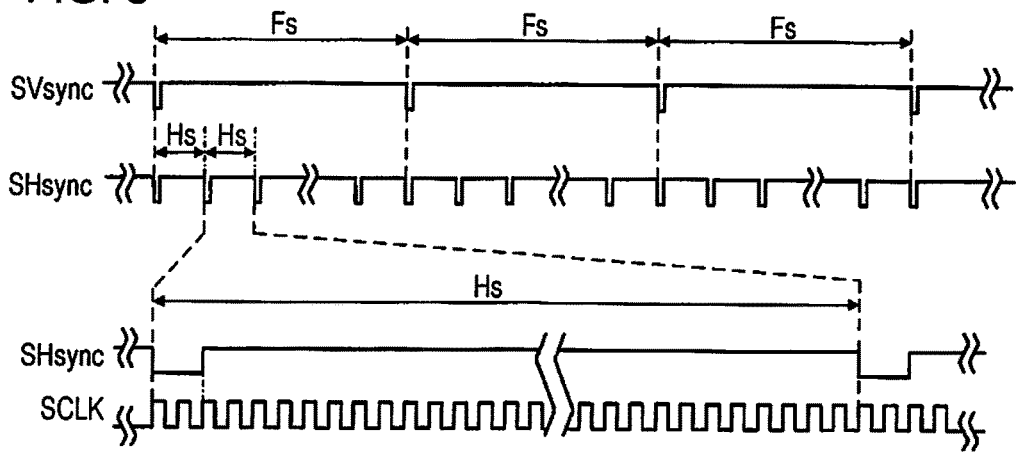
FIG. 8 is a timing chart for describing the operation of the vehicle imaging display system 1.

The timing generator 13 generates an imaging vertical synchronization signal SVsync, an imaging horizontal synchronization signal SHsync, and an imaging dot clock signal SCLK which are shown in FIG. 8, and outputs the generated signals to the image sensors 12. The imaging vertical synchronization signal SVsync is a signal for defining the imaging vertical scanning period Fs (that is, the frame period of the imaging unit 10) for reading the detection signals from the light receiving elements of the image sensor 12. A frame rate of the imaging unit 10, namely, "1/Fs" may be referred to as a "first frame rate". The imaging horizontal synchronization signal SHsync is a signal for defining a horizontal scanning period Hs during which detection signals are read from as many light receiving elements as one line. The imaging dot clock signal SCLK is a signal for defining a timing when detection signals are read from as many light receiving elements as one pixel.

A time length of the imaging vertical scanning period Fs is constant (has a fixed length), and a time length of the horizontal scanning period Hs is also constant (has a fixed length). The imaging vertical scanning period Fs includes a plurality of horizontal scanning periods Hs.

The timing generator 13 may output the imaging vertical synchronization signal SVsync, the imaging horizontal synchronization signal SHsync, and the imaging dot clock signal SCLK to the image processing circuit 100.

The description refers back to FIG. 6.

The left display unit 40-1 is a device that displays an image indicating a subject in the rear left area LR imaged by the rear-left-area imaging unit 10-1 to allow the driver of the vehicle A to recognize the external state of the vehicle, and the structure thereof is as described referring to FIG. 4. The pico projector 401L includes a light source (not shown), a liquid crystal panel 42, a projection optical system (not shown), and a controller 41 that controls an operation of the liquid crystal panel 42. For example, the light source includes a light-emitting diode (LED) or a laser diode, and irradiates the liquid crystal panel 42 with white light. The projection optical system is, for example, a convex lens that projects light penetrating through the liquid crystal panel 42. In FIG. 6, a major function of the left display unit 40-1 displays the controller 41 and the liquid crystal panel 42.

The center display unit 40-2 and the right display unit 40-3 have the same configuration as that of the left display unit 40-1.

As shown in FIG. 7, a plurality of pixels is arranged in a matrix shape so as to be N columns in an X-axis direction and M rows (M lines) in a Y-axis direction in the display area AD of the liquid crystal panel 42. In other words, the display area AD is formed such that the lines of the N pixels arranged in the X-axis direction are arranged in M rows in the Y-axis direction. The image corresponding to the image signal D generated by the image processing circuit 100 is displayed in the display area AD.

2. Image Processing Circuit

As shown in FIG. 6, the image processing circuit 100-1 includes an image signal generation unit 20 that generates the image signal D based on the imaging signal DS and outputs the generated image signal to the left display unit 40-1, and a timing control unit 30 that controls a timing when the image signal generation unit 20 outputs the image signal D.

The image signal generation unit 20 includes an image processing unit 21 that performs image processing on the imaging signals DS to generate the image signals D, a VRAM/line buffer 22 (hereinafter, referred to as a "line buffer 22") that temporarily stores the image signals D generated by the image processing unit 21, and an image signal output unit 23 that acquires the image signals D from the line buffer 22 and outputs the acquired image signals D to the display unit 40.

The image signals D are signals that define images (gradation) to be displayed by the pixels in M rows×N columns formed in the display area AD of the liquid crystal panel 42. Hereinafter, among the image signals D indicating the image to be displayed in the display area AD, as many image signals D as one line indicating the image to be displayed in an (m-th)-row line of the display area AD are described as image signals D[m] (m is a natural number satisfying 1≤m≤M).

The image processing unit 21 generates the image signal D indicating the image to be displayed in the display area AD of the liquid crystal panel 42 for every image to be displayed as many pixels as one line. More specifically, the image processing unit 21 generates the image signals D in the order of the image signal D[1], the image signal D[2], . . . , and the image signal D[M].

Figure 9:
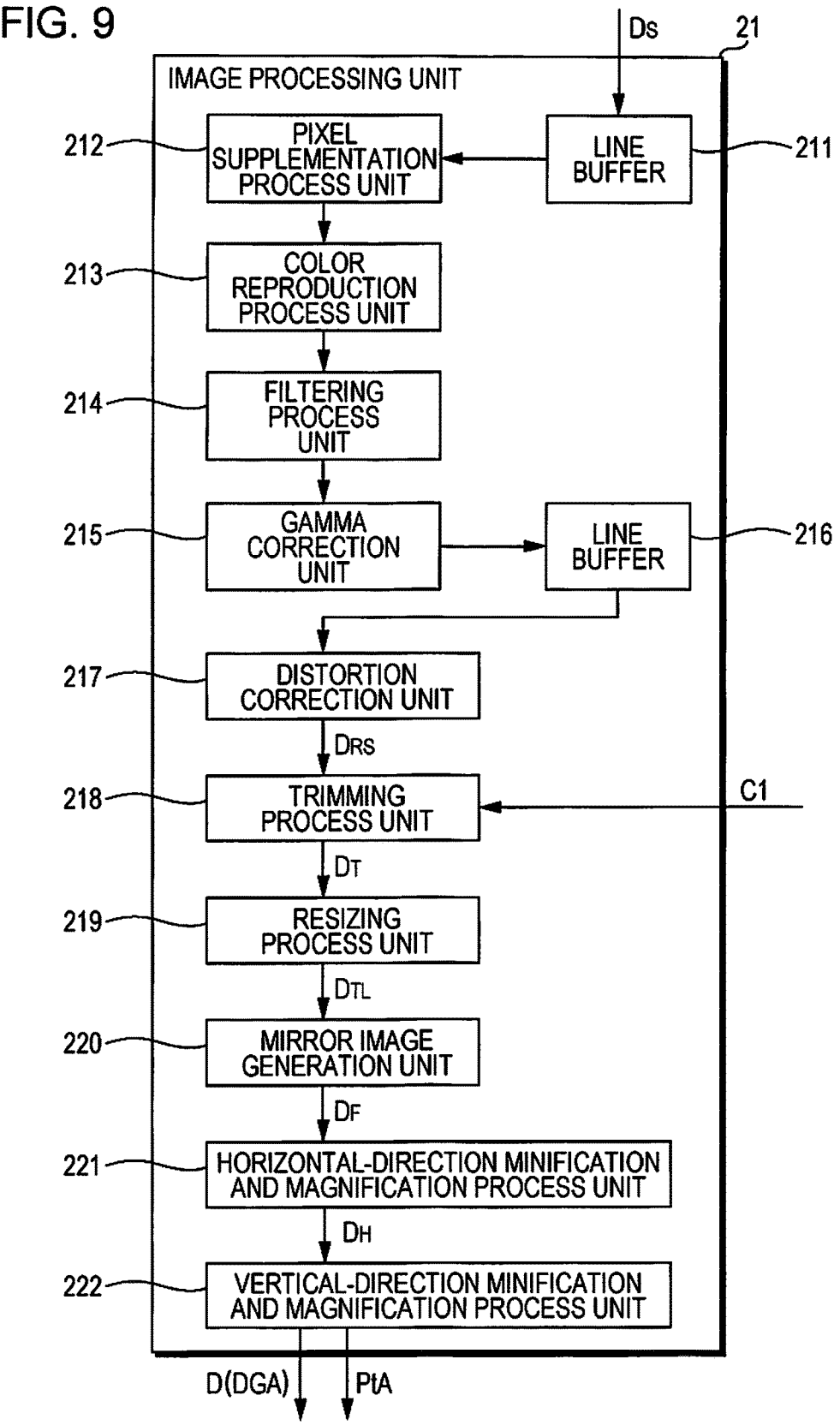
FIG. 9 is a block diagram showing a configuration of an image processing unit 21.

FIG. 9 is a block diagram showing a configuration of the image processing unit 21.

As shown in this drawing, the image processing unit 21 includes a line buffer 211 that temporarily stores the imaging signal DS output from the image sensor 12, a pixel interpolation process unit 212 that performs an interpolation process on the imaging signal DS stored in the line buffer 211, a color reproduction process unit 213 that performs a color reproduction process on the interpolated imaging signal DS, a filtering process unit 214 that performs a filtering process on the color-reproduced imaging signal DS, a gamma correction unit 215 that performs gamma correction on the filtered imaging signal DS, and a line buffer 216 that temporarily stores the gamma-corrected imaging signal DS. The image processing unit 21 includes a distortion correction process unit 217 that converts the image indicated by the imaging signal DS stored in the line buffer 216 into as many image signals DRS as pixels included in the display area AD, a trimming process unit 218 that performs a trimming process of trimming the area corresponding to the position designated by the driver on the image signals DRS among the distortion-corrected image signals DRS, and a resizing process unit 219 that magnifies the trimmed image to an image corresponding to the number of pixels included in the display area AD.

As stated above, the number of pixels of the image indicated by the imaging signal DS is different from the number of pixels (the number of pixels of the display area AD) of the image indicated by the image signal D. The distortion correction process unit 217 may perform the vertical and horizontal magnification and minification processes of the image or the distortion correction process of converting the imaging signal DS into the image signals DRS corresponding to the number of pixels of the display area AD (the size of the image output from the distortion correction process unit 217 is optimized to the size in consideration of the image processing of the trimming process unit 218 or the resizing process unit 219).

Incidentally, distortion caused by the optical characteristics of the lens included in the imaging optical system 11 may occur in the image indicated by the imaging signal DS. Specifically, the image indicating the imaging result when the subject is imaged may have barrel distortion in which the image is outwardly further expanded than an image to be originally displayed in the display area AD or pincushion distortion in which the image is inwardly further contracted than an image to be originally displayed. Thus, the distortion correction process unit 217 performs the distortion correction process of correcting the distortion such as the barrel distortion or the pincushion distortion.

Figure 10:
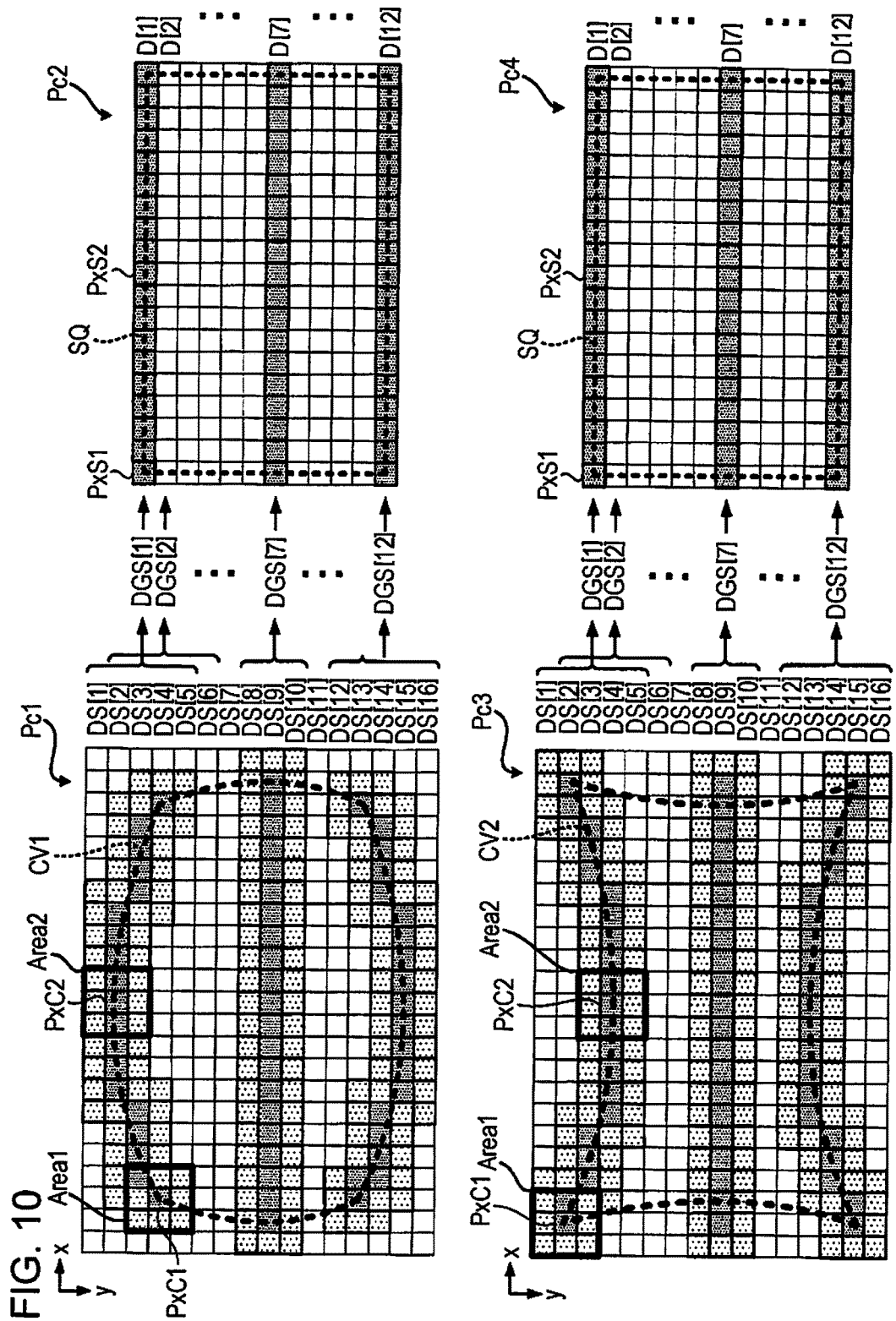
FIG. 10 is an explanatory diagram for describing a distortion correction process.

FIG. 10 is an explanatory diagram for describing the distortion correction process performed by the distortion correction process unit 217.

Hereinafter, the distortion correction process will be described with reference to FIG. 10. In FIG. 10, it is assumed that the number of lines of the image indicated by the imaging signal DS is 16 lines (P=16) and the number of lines of the image indicated by the image signal DRS is 12 lines (M=12).

In FIG. 10, the image indicated by the imaging signals DS in a case where the barrel distortion occurs is denoted by reference signal Pc1, the image indicated by the image signals DRS when the subject is imaged based on the imaging signals DS indicating the image Pc1 is denoted by reference sign Pct, the image indicated by the imaging signals DS in a case where the pincushion distortion occurs is denoted by reference sign Pc3, and the image indicated by the image signals DRS when the subject is imaged based on the imaging signals DS indicating the image Pc3 is denoted by reference sign Pc4.

The image Pc1 is the image indicated by the imaging signal DS in a case where the imaging signal DS indicates a closed curve line CV1 acquired by which a square SQ is expanded due to the barrel distortion even though the image to be displayed in the display area AD is the square SQ. The image Pc3 is the image indicated by the imaging signal DS in a case where the imaging signal DS indicates a closed curve line CV2 acquired b which the square SQ is contracted due to the pincushion distortion even though the image to be displayed in the display area AD is the square SQ.

The distortion correction process unit 217 corrects the image Pc1 indicating the closed curve line CV1 to the image Pc2 indicating the square SQ in the distortion correction process in a case where the barrel distortion occurs. Similarly, the distortion correction process unit 217 corrects the image Pc3 indicating the closed curve line CV2 to the image Pc4 indicating the square SQ in the distortion correction process in a case where the barrel distortion occurs.

In such cases, the distortion correction process unit 217 associates the pixels in the non-corrected image with the pixels in the corrected image, and determines gradation to be displayed in the corrected pixels based on the gradation displayed by the pixels within a reference area including center pixels and surrounding pixels which are pixels around the center pixels by using the non-corrected pixels corresponding to the corrected pixels as center pixels.

For example, in a case where the gradation of the corrected pixels PxS1 constituting the image Pc2 or the image Pc4 is determined, the distortion correction process unit 217 determines non-corrected pixels PxC1 constituting the image PC1 or the image Pc3 as the center pixels. The distortion correction process unit 217 determines the gradation to be displayed in the pixels PxS1 based on the gradation to be displayed in the pixels within a reference area Area1 including the pixels PxC1 which are the center pixels.

Similarly, when the gradation of the corrected pixels PxS2 constituting the image Pc2 or the image Pc4 is determined, the distortion correction process unit 217 determines the non-corrected pixels PxC2 constituting the image Pc1 or the image Pc3 as the center pixels. The distortion correction process unit 217 determines the gradation to be displayed in the pixels PxS2 based on the gradation to be displayed in the pixels within a reference area Area2 including the pixels PxC2 which are the center pixels.

The pixels hatched in dark in the image Pc2 and the image Pc4 indicate the corrected pixels positioned in a first row, a seventh row, and a twelfth row of the image signal DRS, the pixels hatched in dark in the image Pc1 and the image Pc3 indicate the non-corrected pixels (central pixels) which respectively correspond to the corrected pixels, and the pixels hatched in light in the image Pc1 and the image Pc3 indicate the surrounding pixels which respectively correspond to the central pixels.

As can be apparent from the example shown in FIG. 10, a degree of expansion of the image in a case where the barrel distortion occurs is changed depending on the position of the line of the screen, and as the position of the line in the vertical direction (Y-axis direction) becomes closer to the end, the degree of expansion of the image becomes larger. A degree of contraction of the image in a case where the pincushion distortion occurs is changed depending on the position of the line of the screen, and as the position of the line in the vertical direction (Y-axis direction) becomes closer to the end, the degree of contraction of the image becomes larger.

Accordingly, the number of lines of the imaging signal DS required in a case where the distortion correction process unit 217 generates the image signal D[m] is changed depending on the position (value of m) of the line corresponding to the image signal D[m]. Thus, the time length necessary for the distortion correction process unit 217 to perform the distortion correction process is changed depending on the position of the line.

Here, the imaging signal DS corresponding to the (p-th)-row line is expressed by an imaging signal DS[p] (p is a natural number which satisfies 1≤p≤P).

In this case, for example, in the example shown in FIG. 10, in order for the distortion correction process unit 217 to generate the image signal D[1] corresponding to the first-row line, the imaging signals DS[1] to DS[5] corresponding to the first-row to fifth-row lines are required. In contrast, in order for the distortion correction process unit 217 to generate the image signal D[7] corresponding to the seventh-row line, the imaging signals DS[8] to DS[10] corresponding to the eighth-row to tenth-row lines are required. That is, the time length necessary for the distortion correction process unit 217 to generate the image signal D[1] is greater than the time length necessary to generate the image signal D[7].

Hereinafter, the imaging signals DS[p] in one or a plurality of lines which is required to generate the image signals D[m] are referred to as imaging signals DGS[m].

For example, in the example shown in FIG. 10, the imaging signal DGS[1] required to generate the image signal D[1] is as many imaging signals DS[p] as five lines of the imaging signals DS[1] to DS[5], the imaging signal DGS[7] required to generate the image signal D[7] is as many imaging signals DS[p] as three lines of the imaging signals DS[8] to DS[10], and the imaging signal DGS[12] required to generate the image signal D[12] is as many imaging signals DS[p] as five lines of the imaging signals DS[12] to DS[16].

Incidentally, in the wing mirror of the related art, the driver sets an orientation of the mirror in the up, down, left and right directions to be in an arbitrary direction by an operation lever or a button positioned beside the driver's seat, and can change an area reflection on the mirror. In order to allow for the same area change, in the present embodiment, the driver of the vehicle A can input an instruction for designating a trimming position through a touch panel (the operation unit 60) for the trimming process of trimming a partial area of the image indicated by the image signals DRS on which the distortion correction process is performed.

Figure 11A:
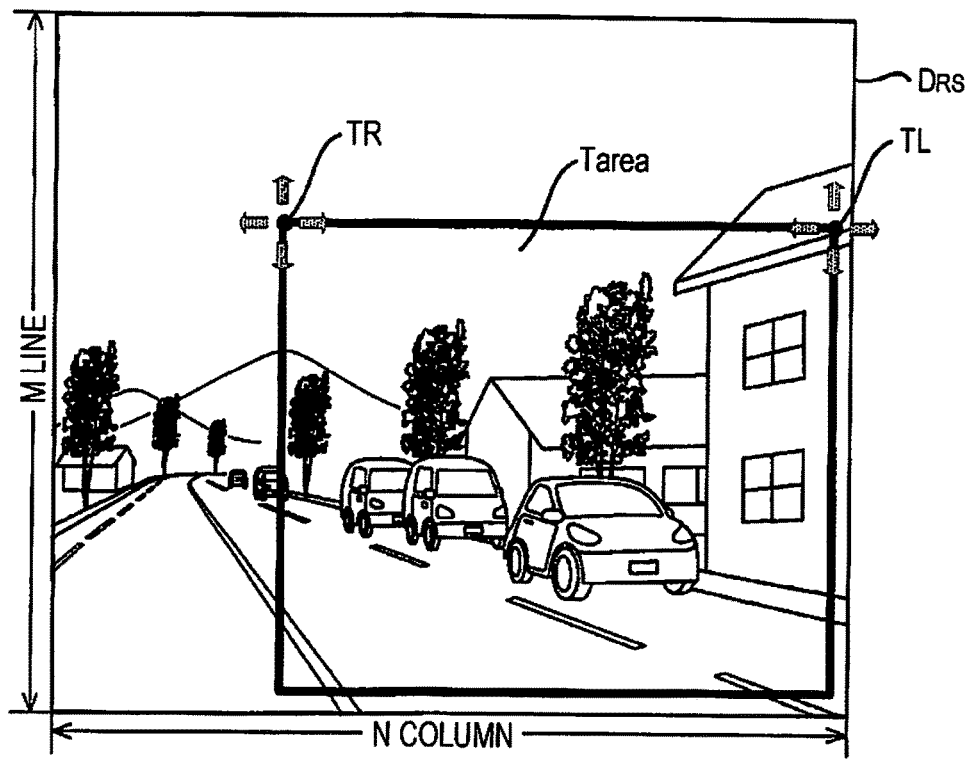
FIG. 11A is a diagram showing an example of a trimming area.

FIG. 11A shows an example of a trimming area designated by the driver. As shown in FIG. 11A, a trimming area Tarea is a rectangular area which is a part of the image indicated by the image signals DRS. For example, the driver designates the trimming area Tarea while visually perceiving the image indicated by the image signal DRS displayed on the touch panel in a trimming area setting mode when the vehicle is not driven. Such designation is realized by designating the position of an upper left vertex TR of the trimming area Tarea and designating the position of an upper right vertex TL. If an aspect ratio of the display area AD is, for example, 4:3, an aspect ratio of the trimming area Tarea needs to be 4:3. Thus, the size of the trimming area Tarea is uniquely determined by designating the positions of the upper left vertex TR and the upper right vertex TL (that is, by designating one side of a rectangle). That is, the size of the trimming area Tarea and the position thereof in the left, right, up and down directions are determined by designating the positions of the upper left vertex TR and the upper right vertex TL.

The aspect ratio of the display area AD is determined depending on the size of the display unit 40. Thus, if the aspect ratio is, for example, 3:2, the size and the position thereof in the left, right, up and down directions are determined such that the aspect ratio of the trimming area Tarea is 3:2. If the aspect ratio is, for example, 16:9, the size and the position thereof in the left, right, up and down directions are determined such that the aspect ratio of the trimming area Tarea is 16:9.

If the input for confirming the positions of the upper left vertex TR and the upper right vertex TL is performed by the driver, the control unit 50 generates a control signal C1 for designating these positions, and supplies the generated signal to the image processing unit 21. The trimming process unit 218 respectively sets the position of the upper left vertex TR and the position of the upper right vertex TL designated by the control signal C1 as the upper left vertex and the upper right vertex, determines the trimming area Tarea corresponding to the aspect ratio of the display area AD, and performs the trimming process of trimming the trimming area Tarea of the image indicated by the image signal DRS.

As the method of designating the trimming area Tarea, an arbitrary method is used. For example, positions of a lower left vertex and a lower right vertex may be designated instead of designating the upper left vertex and the upper right vertex. One short side (that is, the positions of the upper left vertex and the lower left vertex or the positions of the upper right vertex and the lower right vertex) may be designated. A rectangular frame corresponding to the aspect ratio of the display area AD may be displayed on the display unit 40, and the position or size of the rectangular frame may be freely changed through a touch operation.

The driver moves a rectangular frame having a predetermined size in a left, right, up and down direction by operating the operation lever with the hand as in the related art, and thus, the driver can designate the trimming area Tarea.

Figure 11B:
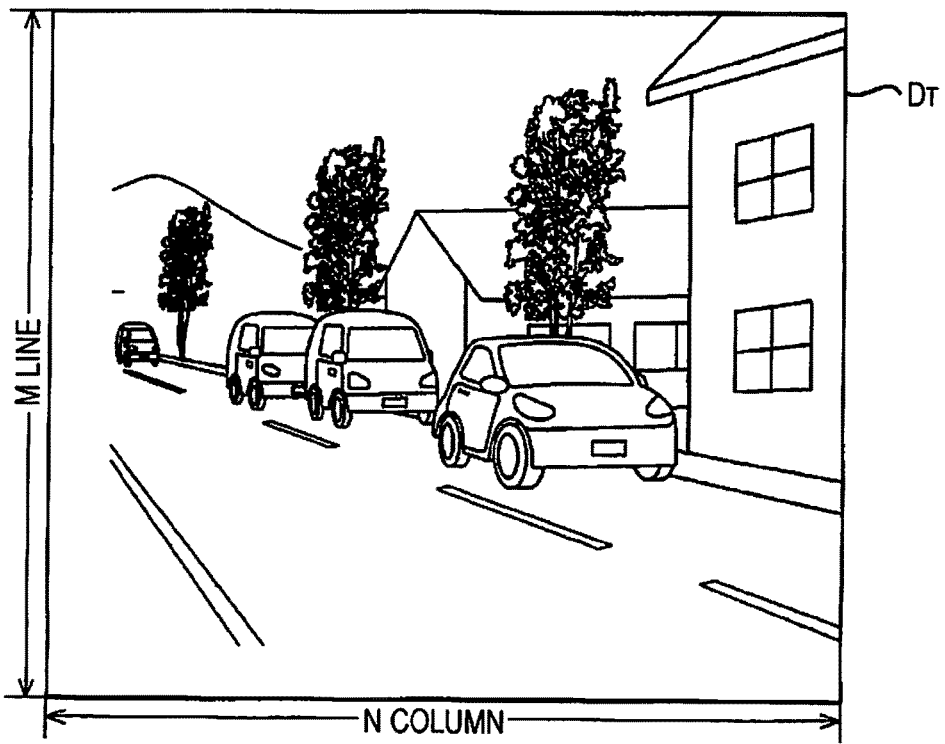
FIG. 11B is a diagram showing an example of an image after the trimming process.

In this example, since the number of pixels of the image signal DRS matches to the number of pixels of the display area AD, the number of pixels of the trimming area Tarea which is a part thereof is less than the number of pixels of the display area AD. Thus, the number of pixels of the trimming area Tarea needs to match to the number of pixels of the display area AD. The resizing process unit 219 performs a resizing process of magnifying the trimming area Tarea by performing the interpolation process after the trimming area Tarea is designated. FIG. 11B shows an example of the image after the resizing process. As can be seen from FIGS. 11A and 11B, the image indicated by the trimming area Tarea shown in FIG. 11A is magnified by the resizing process, and the image signals DTL having the number of pixels of the display area AD are generated.

The resizing process unit 219 has an arbitrary configuration. That is, the image in W rows×Z columns (W is a natural number which satisfies M<W<P, and Z is a natural number which satisfies N<Z<Q) may be generated by the distortion correction process, and the trimming process may be performed on an image in M rows×N columns from the image. In this case, since the trimming area Tarea is in M rows×N columns, the resizing process is not required, and thus, it is possible to improve the quality of the image.

According to the trimming process, for example, there is an advantage that cost is suppressed since a mechanism for varying an orientation of a camera is not required unlike the configuration in which an imaging range is changed by varying an orientation in which the camera itself in the imaging unit images. In the trimming process, since the trimming area Tarea is magnified so as to match to the size of the display area AD after the trimming area is designated, there is an advantage that an area desired to be viewed by the driver is magnified and displayed.

As shown in FIG. 9, the image processing unit 21 includes a mirror image generation unit 220 that reverses the left and right of the image signal D, a horizontal-direction minification and magnification process unit 221 that minifies and magnifies the image signal D on which the trimming process has been performed in the horizontal direction for every line, and a vertical-direction minification and magnification process unit 222 that minifies or magnifies the image signal D on which the horizontal-direction minification and magnification process has been performed in the horizontal direction, in the vertical direction for every line.

Figure 11C:
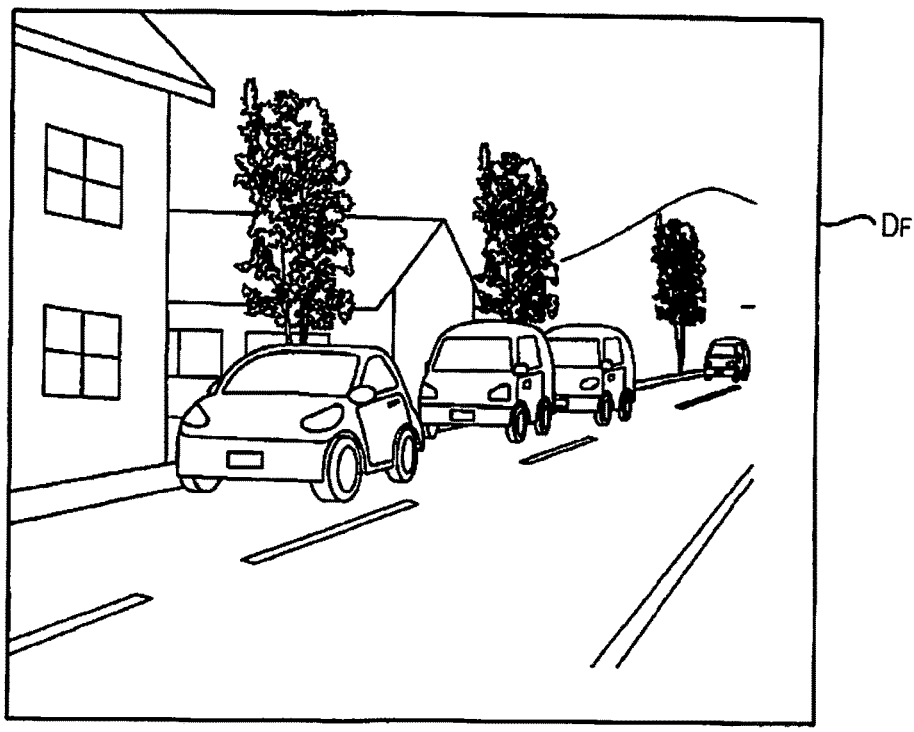
FIG. 11C is a diagram showing an example of an image generated by a left-right reversal process.

FIG. 11C shows an example of the image generated by the left-right reversal process performed by the mirror image generation unit 220. The driver of the vehicle sees a mirror image reflected on the wing mirror or the rear-view mirror of the related art, and checks the safety of the vehicle on the rear side and rear lateral side.

Incidentally, since the camera is caused to face rearwards and the imaging signal DS output from the rear-left-area imaging unit 10-1 is acquired by imaging the subject, an orientation of the image output from the image sensor 12 is reversed in the left and right direction with respect to the mirror image reflected on the wing mirror or the rear-view mirror of the related art. Thus, the mirror image generation unit 220 performs the left-right reversal process of reversing the left and right of the image (FIG. 11B) indicated by the image signal DT output from the trimming process unit 218 and generating the image signal DF (FIG. 11C) which is a mirror surface image. According to the left-right reversal process, since the safety can be checked using the image of which the left and right direction are the same as those of the mirror image reflected on the wing mirror or the fender mirror of the related art, there is not a concern that the left-right reversal image to that in the related art is reflected, and thus, the driver may be confused.

Figure 12A:
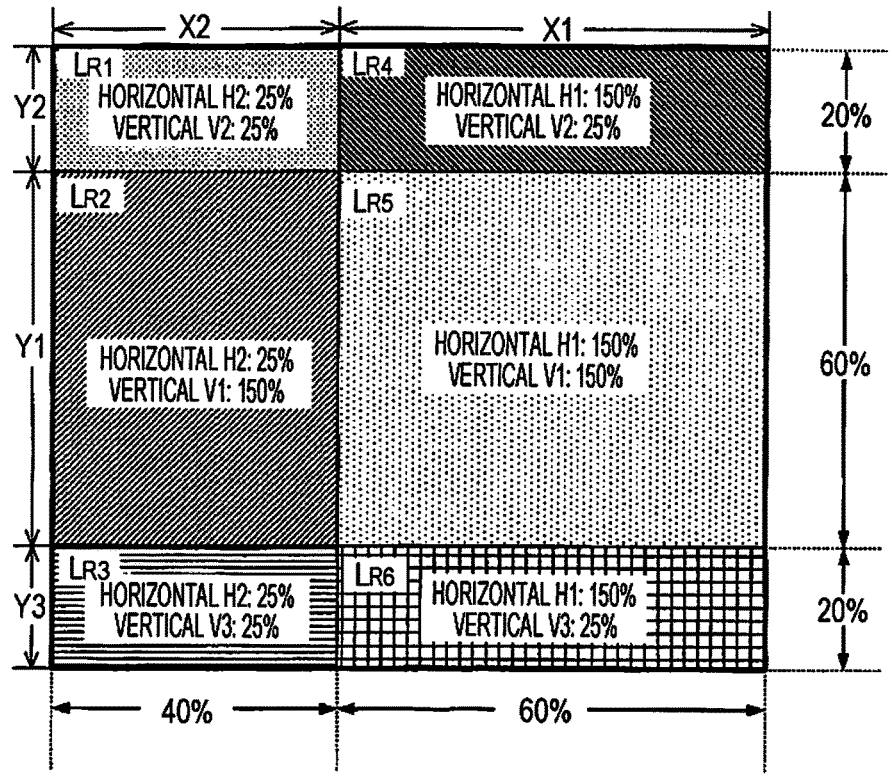
FIG. 12A is a conceptual diagram for describing a magnification and minification process performed on an image based on an imaging signal DSL.

FIG. 12A is a conceptual diagram of the magnification and minification process of the image according to the present embodiment. The illustrated example is an image based on the imaging signal DS output from the rear-left-area imaging unit 10-1. As shown in the drawing, in the magnification and minification process, the image of the image signal DF output from the mirror image generation unit 220 is divided (separated) into six areas including an upper left area LR1, a left center area LR2, a lower left area LR3, an upper center area LR4, a center area LR5, and a lower center area LR6. In the left and right direction, a length ratio between a left area (an area far away from the vehicle body) and a center area (an area close to the vehicle body) is "2:3" (that is, "40%:60%"), and in the up and down direction, a length area between an upper area, a center area, and a lower area is "1:3:1" (that is, "20%:60%:20%"). Hereinafter, this ratio may be referred to as a "division ratio".

A predetermined horizontal-direction variable magnification (a magnification ratio or a minification ratio in the left and right direction) and a predetermined vertical-direction variable magnification (a magnification ratio or a minification ratio in the up and down direction) are previously set to the respective areas. Since an image present in the area LRC (FIG. 2) of the image reflected on the wing mirror, which is close to the vehicle body, shows that there is a high risk that the subject will collide with the vehicle, such information is information required to safely drive the vehicle. In contrast, an image present in the area LRL far away from the vehicle body, for example, an image such as a roadside building has low importance in checking the safety. Thus, in the present embodiment, the magnification ratio or the minification ratio in the left and right direction is set such that the area LRC close to the vehicle body in the left and right direction is relatively further magnified than the area LRL far away from the vehicle body. An image such as another vehicle or a pedestrian of the images based on the imaging signals DS is information required to safely drive the vehicle, but an image of the scenery such as sky or mountain present in the upper area of the image or an image of a road surface in the lower area of the image has low importance. Thus, in the present embodiment, the magnification ratio or the minification ratio in the up and down direction is set such that the center area in the up and down direction is relatively further magnified than the upper or lower area.

Specifically, a minification ratio H2 in the left and right direction and minification ratios V2 and V3 in the up and down direction are set as 25% to the upper left area LR1 and the lower left area LR3 which are far away from the vehicle body and are upper or lower areas, as shown in FIG. 12A. The minification ratio H2 in the left and right direction and the magnification ratio V1 in the up and down direction are respectively set as 25% and 150% to the left center area LR2 which is far away from the vehicle body but is the center area in the up and down direction. A magnification ratio H1 in the left and right direction and the minification ratios V2 and V3 in the up and down direction are respectively set as of 150% and 25% to the upper center area LR4 and the lower center area LR6 which are close to the vehicle body but are the upper or lower area. The magnification ratio H1 in the left and right direction and the magnification ratio V1 in the up and down direction are set as 150% to the center area LR5 which is close to the vehicle body and is the center area in the up and down direction. By setting the ratios in this manner, it is possible to improve visual perceptibility of a required area by the safety check when the vehicle is driven, among the image based on the imaging signals DS. For example, it is possible to further improve visual perceptibility of the area which is closer to the vehicle body and is the center in the up and down direction without requiring a physical machining process than that in the configuration in which a plane-surface mirror portion and a convex-surface mirror portion are formed on the mirror surface of the wing mirror and the mirror image reflected on the convex-surface mirror portion is contracted.

The magnification ratio H1 and the minification ratio H2 in the left and right direction are determined such that $X1+X2=X1 \cdot H1+X2 \cdot H2$ when the length of the area close to the vehicle body in the left and right direction is X1 and the length of the area far away from the vehicle body in the left and right direction is X2, and the magnification ratio V1 of the center area, the minification ratio V2 of the upper area, and the minification ratio V3 of the lower area in the up and down direction are determined such that $Y1+Y2+Y3=Y1 \cdot V1+Y2 \cdot V2+Y3 \cdot V3$ when the length of the center area in the up and down direction is Y1, the length of the upper area in the up and down direction is Y2, and the length of the lower area in the up and down direction is Y3. By setting the magnification ratio and the minification ratio in this manner, it is possible to generate the image signal DH of which the size ratio between the respective areas without changing the size (the number of pixels) of the image itself based on the imaging signal DS. In other words, the number of pixels of the image signal DH can match to the number of pixels of the display area AD.

Figure 12B:
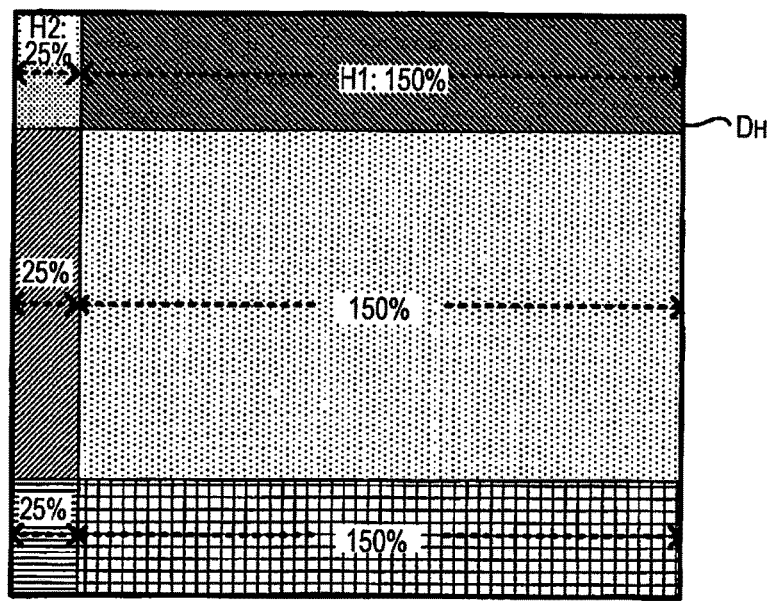
FIG. 12B is a conceptual diagram for describing a horizontal-direction minification and magnification process.
Figure 12C:
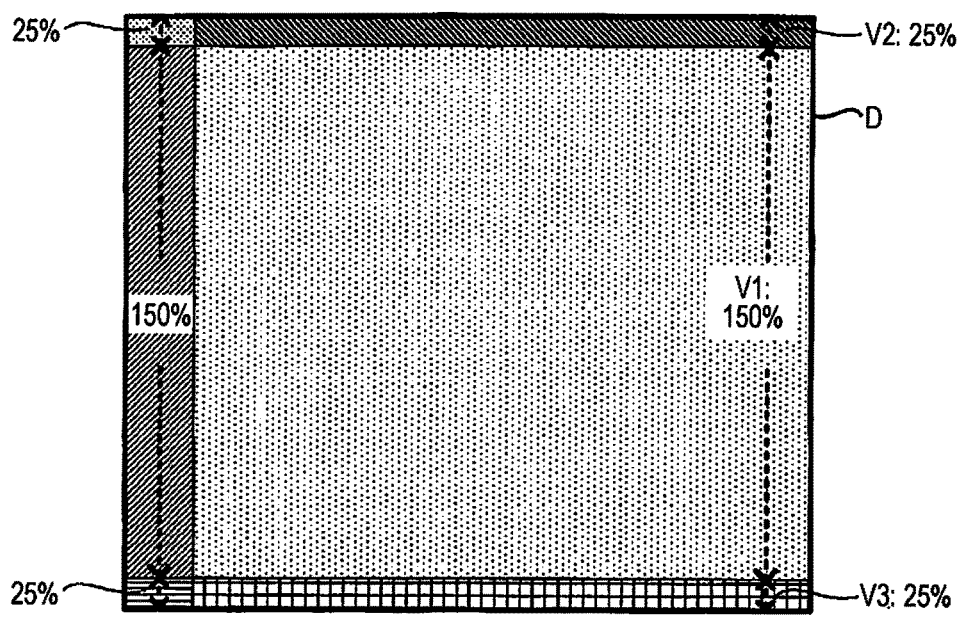
FIG. 12C is a conceptual diagram for describing a vertical-direction minification and magnification process.

FIG. 12B is a conceptual diagram for describing the horizontal-direction minification and magnification process performed by the horizontal-direction minification and magnification process unit 221, and FIG. 12C is a conceptual diagram for describing the vertical-direction minification and magnification process performed by the vertical-direction minification and magnification process unit 222.

The horizontal-direction minification and magnification process unit 221 performs the process (first process) of relatively further magnifying the area close to the vehicle body in the left and right direction than the area far away from the vehicle body on the image signal DF output from the mirror image generation unit 220. Specifically, a magnification varying process depending on the set magnification ratio H1 or minification ratio H2 is performed on the image of the areas LR1 to LR6. This magnification varying process is a process performed on every line. For example, in a case where the number of pixels in one line is 100 (that is, 100 columns), a process of minifying pixels from a first column to a fortieth column belonging to the upper left area LR1, the left center area LR2, and the lower left area LR3 with the minification ratio H2 (25%) is performed. That is, a process of decreasing the number of pixels from 40 up to 10 is performed. For example, as the minification process, a known method of calculating arithmetic mean of the values indicated by the detection signals output from the light receiving elements for a predetermined number of adjacent pixels is arbitrarily adopted. A process of magnifying the pixels from a forty-first column to a hundredth column belonging to the upper center area LR4, the center area LR5, and the lower center area LR6 with the magnification ratio H1 (150%) is performed. That is, a process of increasing the number of pixels from 60 up to 90 is performed. As the magnification process, a known method such as nearest-neighbor interpolation is arbitrarily adopted. If the first process is performed on all the lines, the image (image indicated by the image signal DH) of which the size ratio of the images in the respective LR1 to LR6 is changed as shown in FIG. 12B is generated.

The vertical-direction minification and magnification process unit 222 performs the process (second process) of relatively further magnifying the center area in the up and down direction than the upper or lower area of the image signal DH1 output for every line from the horizontal-direction minification and magnification process unit 221. Specifically, a magnification varying process depending on the set magnification ratio V1 or minification ratio V2 or V3 is performed on the image of the respective areas LR1 to LR6. This magnification varying process is a process performed for every plurality of lines. For example, in a case where the number of lines of the image signals DH is 100 rows, a process of thinning as many lines as the number depending on the minification ratio V2 (25%) out of the lines of a first row to a twentieth line belonging to the upper left area LR1 and the upper center area LR4 is performed. That is, a process of thinning one line out of four lines is performed. The interpolation process corresponding to the magnification ratio V1 (150%) is performed on the pixels from a twentieth-first row to an eightieth row belonging to the left center area LR2 and the center area LR5. A process of thinning as many lines as the number depending on the minification ratio V3 (25%) out of the lines of an eightieth-first row to a hundredth row belonging to the lower left area LR3 and the lower center area LR6 is performed. If the second process is performed on all the lines, an image (image indicated by the image signal D) of which the size ratio of the image in the respective areas LR1 to LR6 is changed as shown in FIG. 12C is generated.

Figure 13:
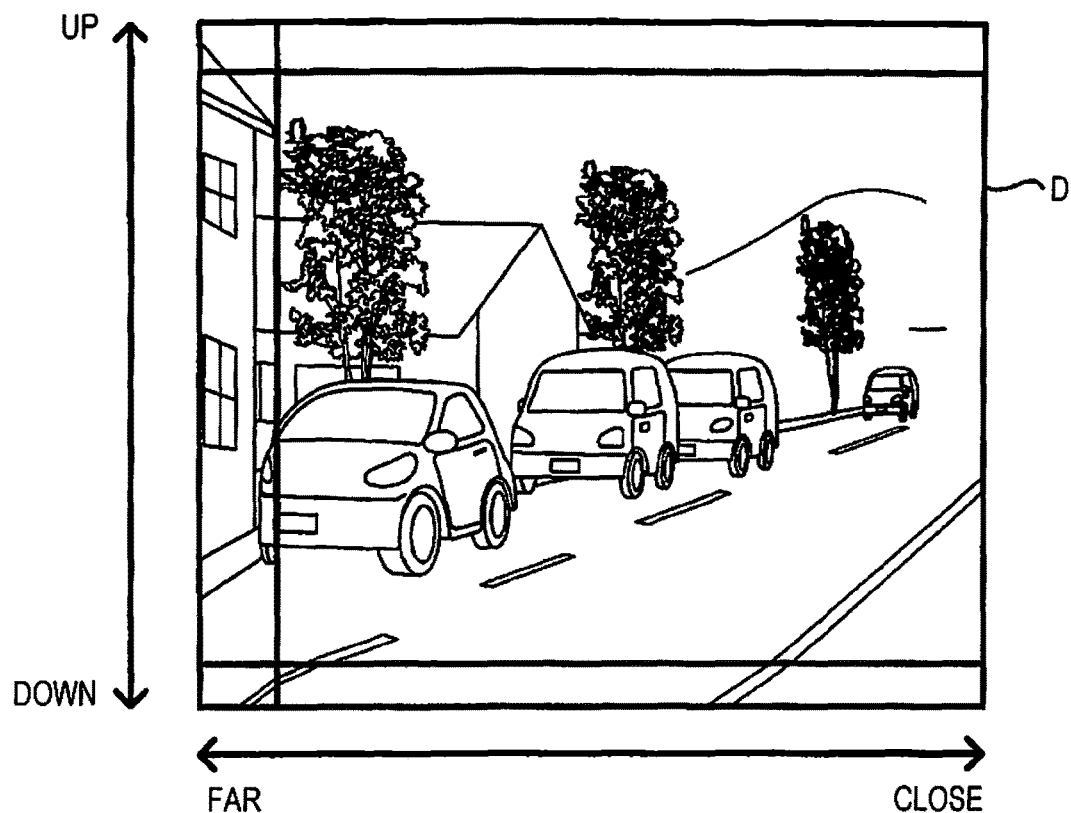
FIG. 13 shows an example of an image indicated by an image signal D after an image generation process.

FIG. 13 shows an example of the image indicated by the image signal D on which the first process and the second process have been performed. As shown in the drawing, an image of which the area which is close to the vehicle body in the left and right direction and is the center in the up and down direction is relatively further magnified than another area is displayed.

Figure 12D:
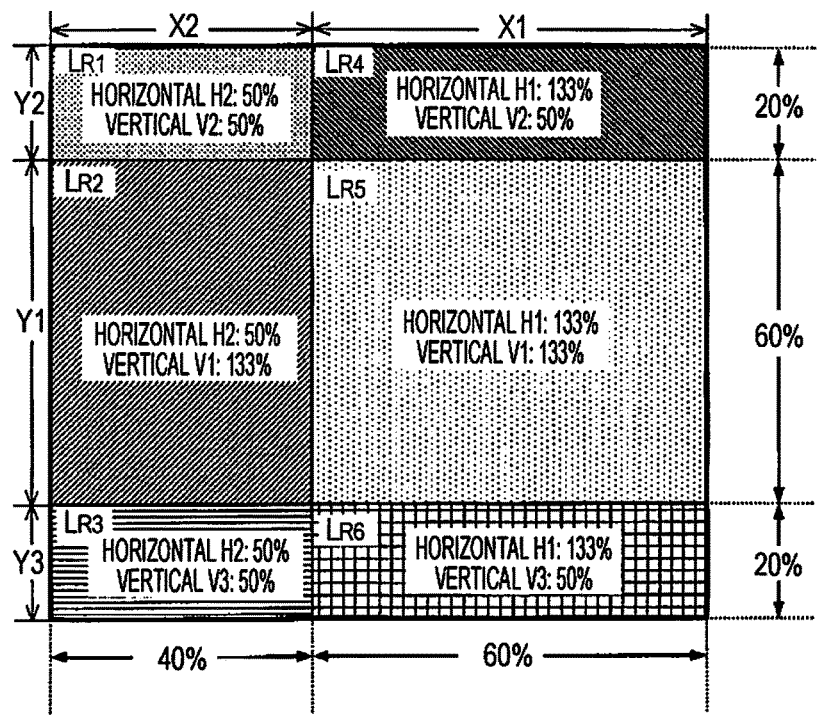
FIG. 12D is a conceptual diagram for describing the magnification and minification process performed on the image based on the imaging signal DSL.
Figure 12E:
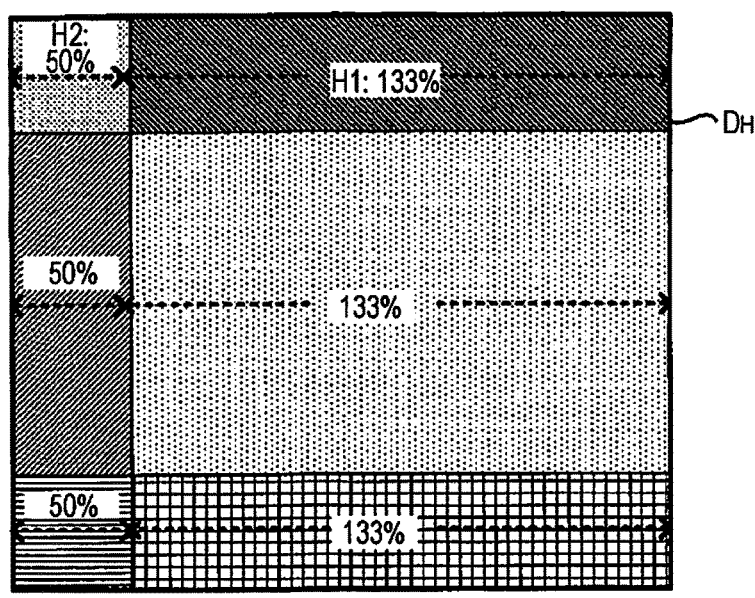
FIG. 12E is a conceptual diagram for describing a horizontal-direction minification and magnification process.
Figure 12F:
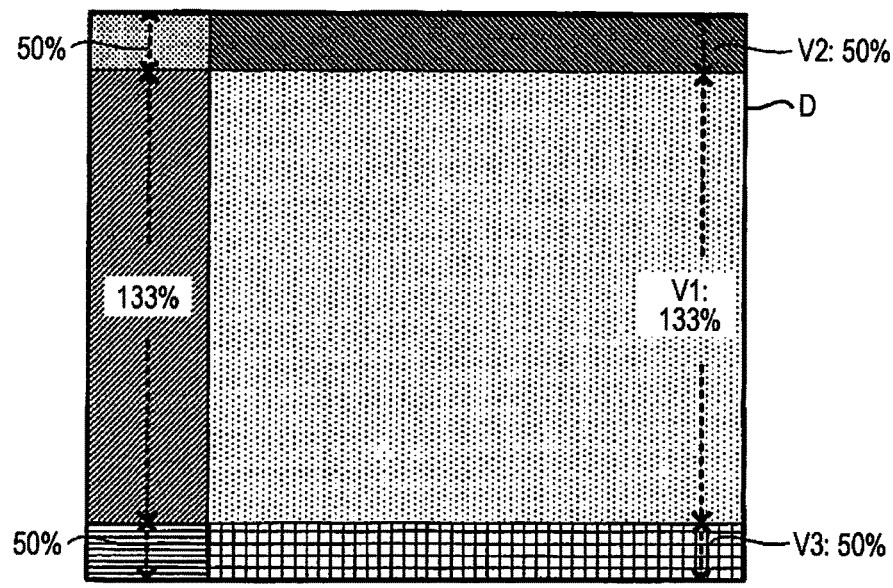
FIG. 12F is a conceptual diagram for describing a vertical-direction minification and magnification process.

A division ratio, a horizontal-direction variable magnification, and a vertical-direction variable magnification shown in FIG. 12A may be appropriately set. As shown in FIGS. 12D to 12F, the horizontal-direction variable magnification and the vertical-direction variable magnification are set to be values different from those in the example of FIG. 12A. In this example, a value of the division ratio is the same as that in the example of FIG. 12A. Specifically, a minification ratio H2 in the left and right direction and minification ratios V2 and V3 in the up and down direction are set as 50% to the upper left area LR1 and the lower left area LR3 which are far away from the vehicle body and are upper or lower areas, as shown in FIG. 12D. The minification ratio H2 in the left and right direction and the magnification ratio V1 in the up and down direction are respectively set as 50% and 133% to the left center area LR2 which is far away from the vehicle body but is the center area in the up and down direction. A magnification ratio H1 in the left and right direction and the minification ratios V2 and V3 in the up and down direction are respectively set as of 133% and 50% to the upper center area LR4 and the lower center area LR6 which are close to the vehicle body but are the upper or lower area. The magnification ratio H1 in the left and right direction and the magnification ratio V1 in the up and down direction are set as 133% to the center area LR5 which is close to the vehicle body and is the center area in the up and down direction.

According to this example, the image (the image indicated by the image signal DH) on which the horizontal-direction minification and magnification process has been performed by the horizontal-direction minification and magnification process unit 221 is as shown in FIG. 12E. The image (the image indicated by the image signal D) on which the vertical-direction minification and magnification process has been performed the vertical-direction minification and magnification process unit 222 is as shown in FIG. 12F.

Figure 12G:
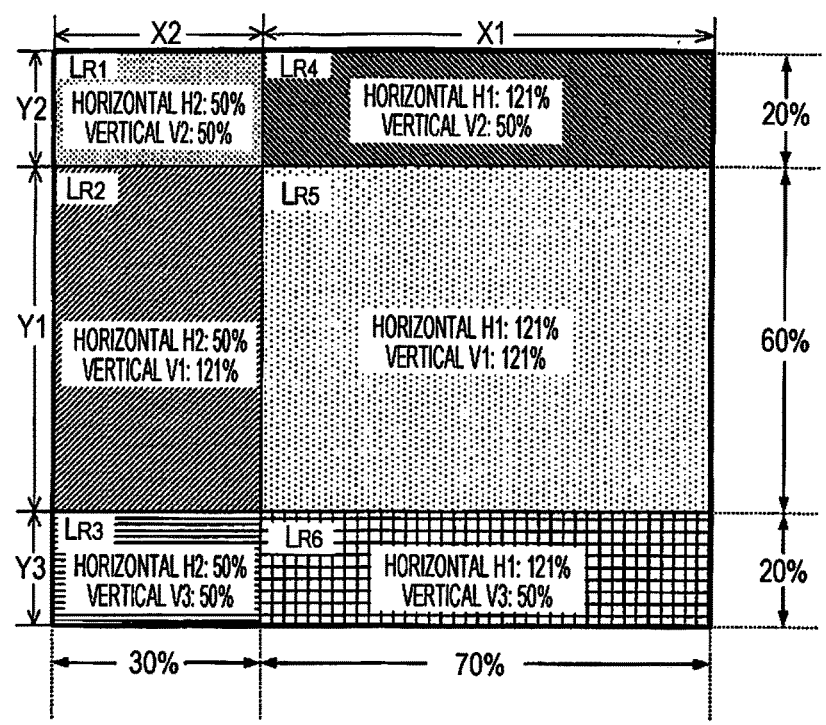
FIG. 12G is a conceptual diagram for describing the magnification and minification process performed on the image based on the imaging signal DSL.
Figure 12H:
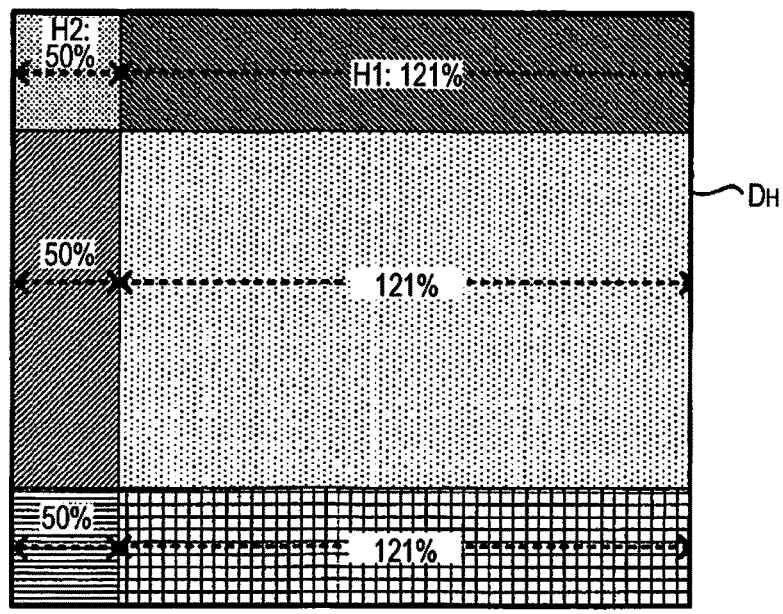
FIG. 12H is a conceptual diagram for describing a horizontal-direction minification and magnification process.
Figure 12I:
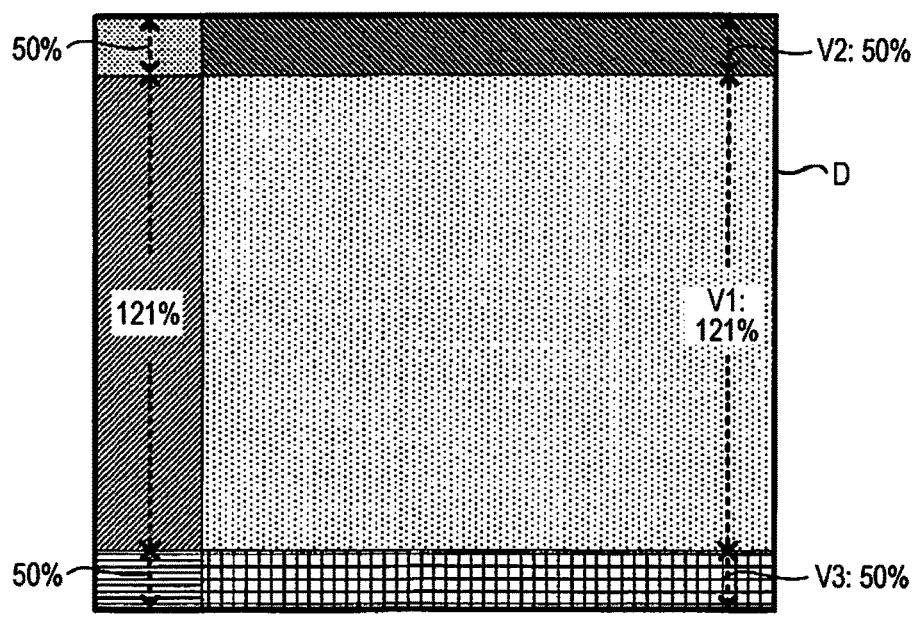
FIG. 12I is a conceptual diagram for describing a vertical-direction minification and magnification process.

Other setting examples are shown in FIGS. 12G to 12I. As shown in FIG. 12G, in this example, the division ratio in the left and right direction is set to be not "40%:60%" but "30%:70%". The division ratio in the up and down direction is the same as that in the example of FIG. 12A. The minification ratio H2 in the left and right direction and the minification ratios V2 and V3 in the up and down direction are set as 50% to the upper left area LR1 and the lower left area LR3 which are far away from the vehicle body and which are the upper or lower area. The minification ratio H2 in the left and right direction and the magnification ratio V1 in the up and down direction are respectively set as 50% and 121% to the left-center area LR2 which is far away from the vehicle body but is the center area in the up and down direction. A magnification ratio H1 in the left and right direction and the minification ratios V2 and V3 in the up and down direction are respectively set as of 121% and 50% to the upper-center area LR4 and the lower-center area LR6 which are close to the vehicle body but are the upper or lower area. The magnification ratio H1 in the left and right direction and the magnification ratio V1 in the up and down direction are set as 121% to the center area LR5 which is close to the vehicle body and is the center area in the up and down direction.

According to this example, the image (the image indicated by the image signal DH) on which the horizontal-direction minification and magnification process has been performed by the horizontal-direction minification and magnification process unit 221 is as shown in FIG. 12H. The image (the image indicated by the image signal D) on which the vertical-direction minification and magnification process has been performed by the vertical-direction minification and magnification process unit 222 is as shown in FIG. 12I.

Incidentally, it is convenient that the driver can freely set the variable magnification of the image (the image indicated by the image signal D) displayed on the display unit 40 in the horizontal direction and the vertical direction.

Figure 12J:
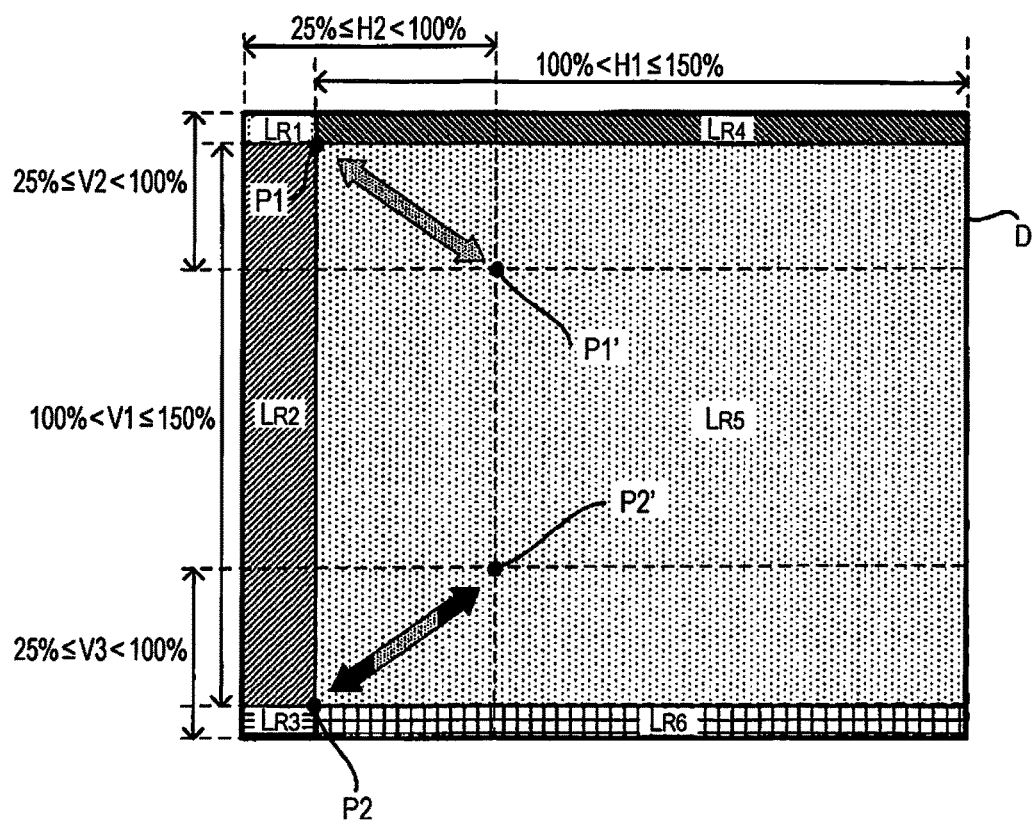
FIG. 12J is a conceptual diagram for describing a variable magnification changing process.

FIG. 12J is a conceptual diagram for describing a variable magnification changing process. In the illustrated example, the driver can change (input) the horizontal-direction variable magnifications (H1 and H2) and the vertical-direction variable magnifications (V1, V2, and V3) by moving a point P1 which is a lower right vertex of the upper left area LR1 or a point P2 which is an upper right vertex of the upper left area LR1. An arbitrary method may be used as the method of moving the points. In the present embodiment, the driver changes the horizontal-direction variable magnifications (H1 and H2) and the vertical-direction variable magnifications (V1, V2, and V3) on the touch panel (operation unit 60) through an operation (a so-called "dragging operation") for moving the point P1 or the point P2 toward the inside or outside of the display area AD while touching the point P1 or the point P2.

Since the point P1 is the upper right vertex of the left center area LR2, is the lower left vertex of the upper center area LR4, and is the upper left vertex of the center area LR5, if the point P1 is moved in a direction (that is, toward the inside of the display area AD) in which the magnification ratio of the center area LR5 becomes smaller, the magnification ratios (V1 and H2) of the left center area LR2, the upper center area LR4, and the center area LR5 are decreased (a value (%) of the magnification ratio is reduced), and the minification ratios (V2 and H2) of the upper left area LR1, the left center area LR2, and the upper center area LR4 are inversely increased (a value (%) of the minification ratio is increased). If the aspect ratio of the display area AD is, for example, 4:3, since the aspect ratio of the image of each magnified or minified area also needs to be 4:3, the point P1 is moved, and thus, the point P2 is also moved. Thus, the point P1 is moved toward the inside of the display area, and thus, the minification ratios (V3 and H2) of the lower left area LR3 and the lower center area LR6 are increased (a value (%) of the minification ratio is increased), and the magnification ratio (H1) thereof is decreased (a value (%) of the magnification ratio is reduced). Similarly, in a case where the point P2 is moved through dragging, the point P1 is moved. According to the aspect, the driver can change the magnification ratios and the minification ratios of the respective areas, as desired.

If the minification ratio is extremely small, the visual perceptibility of the image required to safely drive the vehicle A is deteriorated. Thus, a lower limit of the minification ratio is preferably set from the viewpoint of safety. The lower limit of the minification ratio may be arbitrarily set. For example, preferably, the minification ratios V1 and V3 in the vertical direction and the minification ratio H2 in the horizontal direction may be changed in a range from 25% or more to less than 100% and the magnification ratio V1 in the vertical direction and the magnification ratio H1 in the horizontal direction may be changed in a range from more than 100% to 150% or less.

In a case where the method of inputting the values of the variable magnifications by using another known input means is adopted instead of the dragging operation, the magnification ratio or the minification ratio may be input using, for example, a numeric keypad displayed on the touch panel.

If the image signals D[m] are generated by the above-described process, the image processing unit 21 stores the generated image signals D[m] in the line buffer 22, and outputs a writing-completion signal PtA indicating that the storing of the image signals D[m] in the line buffer 22 is completed to the timing control unit 30.

The time length at which the display area AD of the display unit 40 can display as many an image as one screen is less than the time length at which the imaging unit 10 can image as many an image as one screen. Thus, in a case where there is an attempt to display the image at a cycle at which the liquid crystal panel 42 can display, the output of the imaging signal DS from the imaging unit 10 does not the cycle. thus, in the vehicle imaging display system 1 according to the present embodiment, output timings of the image signals D from the image processing circuit 100 are adjusted by the image processing circuit 100, and thus, a display speed of the display unit 40 follows an output cycle of the imaging signals DS from the imaging unit 10.

In the present embodiment, the writing-completion signal PtA is a signal (ma is a natural number which satisfies 1≤ma≤M) indicating the number ma of the line corresponding to the image signal D which has been written in the line buffer 22 by the image processing unit 21. The line number ma which is the value indicated by the writing-completion signal PtA is an example of "image processing line information" indicating the line on which the image processing has been performed.

The writing-completion signal PtA is not limited to the signal indicating the number of the line, and may be a binary signal including a pulse waveform which rises to a high level in a case where the generation of the image signals D[m] by the image processing unit 21 is completed. In a case where the writing-completion signal PtA is the binary signal, the timing control unit 30 counts the number of pulses included in the writing-completion signal PtA after displaying is started on one screen, and it is possible to calculate the line numbers of the image signals D[m] which have been already generated by the image processing unit 21. In this case, the pulse waveform (or the number of pulse waveforms) included in the writing-completion signal PtA corresponds to the "image processing line information".

The image signal output unit 23 reads the image signals D for every one line from the line buffer 22, and outputs as many of the read image signals D[m] as one line to the display unit 40 under the control of the timing control unit 30.

Hereinafter, in a case where it is necessary to distinguish between the image signals for the sake of convenience in the description, the image signals D which are generated by the image processing unit 21 and are stored in the line buffer 22 are referred to as image signals DGA, and the image signals D which are acquired from the line buffer 22 and are output to the display unit 40 by the image signal output unit 23 are referred to as image signals DGB. Among the image signals DGA stored in the line buffer 22 by the image processing unit 21, the image signals DGA indicating the image to be displayed in the (m-th)-row line of the display area AD are referred to as image signals DGA[m], and among the image signals DGB output to the display unit 40 by the image signal output unit 23, the image signals DGB indicating the image to be displayed in the (m-th)-row line of the display area AD are referred to as image signals DGB[m].

In a case where the process of reading the image signals DGB[m] from the line buffer 22 to output the image signals DGB[m] to the display unit 40 is completed, the image signal output unit 23 outputs output-completion signals PtB indicating that the output of the image signals DGB[m] to the display unit 40 is completed to the timing control unit 30. In the present embodiment, the output-completion signals PtB are signals indicating the numbers m of the lines corresponding to the image signals D which have been output to the display unit 40 by the image signal output unit 23. Hereinafter, the numbers m of the lines indicated by the output-completion signals PtB are particularly described as "line numbers Mb" (mb is basically a natural number satisfying 0≤mb≤M). The line numbers mb which are values indicated by the output-completion signals PtB are an example of "display output line information" indicating the lines of the image signals D[m] which have been output to the display unit 40.

Although the details will be described below, the image signal output unit 23 may output inactive signals Dmy instead of output the image signals DGB[m] to the display unit 40 (see FIG. 14D). In this case, the image signal output unit 23 does not output the output-completion signals PtB.

mb satisfies mb=M immediately after the final line of one frame is output, and mb=M is subsequently maintained. It is assumed that the mb signal is reset at a point of time (at a timing after a vertical back porch period after a vertical synchronization signal is output is completed) when preparation to output an image for the next frame is completed and mb=0.

The output-completion signal PtB is not limited to the signal indicating the number of the line, and may be a binary signal including a pulse waveform which rises to a high level in a case where the output of the image signals D[m] by the image signal output unit 23 is completed.

As shown in FIG. 6, the timing control unit 30 includes an output control unit 31 that generates output control signals CTR (precisely, CTR[m]) based on the writing-completion signals PtA and the output-completion signals PtB, a timing generator 32 that generates various timing signals and controls timings when the image signal output unit 23 outputs the image signals DGB[m], and a parameter transmission unit 33 that transmits setting parameters PRM for defining an operation of the controller 41 to the controller 41.

The output control unit 31 determines whether or not the image signal output unit 23 completes preparation to output the image signals D[m] (image signals DGB[m]) indicating the image to be displayed in the m-th row of the display area AD to the display unit 40 based on the writing-completion signals PtA and the output-completion signals PtB, and generates the output control signals CTR (precisely, CTR [m]) indicating the determination results.

Here, the "preparation to output the image signals D[m] (image signals DGB[m]) being completed" means that the following first condition and second condition are satisfied.

(First Condition) The image processing unit 21 completes the image processing of the image signals D[m] (image signals DGA[m]) in the m-th row, and completes the writing of the image signals DGB[m] in the line buffer 22.

(Second Condition) The image signal output unit 23 completes the output of the image signals D[m-1] (image signals DGB[m-1]) in an (m-1)-th row.

The first condition indicates a case where the line number ma indicated by the writing-completion signal PtA is equal to or greater than the line number m, and is satisfied in a case where "m≤ma" is satisfied. The second condition is satisfied in a case where the line numbers mb indicated by the output-completion signals PtB satisfy "mb=m-1" (specifically, the second condition is satisfied in a case where "mb=0" (the mb signal is reset at a timing after the completion of the vertical back porch period after the output of the vertical synchronization signal after "mb=M", and thus, mb=0) is satisfied in a case where "m=1").

In the present specification, the lines of the display area AD displaying the image indicated by the image signals D[m] to be determined by the output control unit 31 may be referred to as "display target lines".

Specifically, in order for the image signal output unit 23 to output the image signals D[m] (image signals DGB[m]), the following third condition needs to be satisfied.

(Third Condition) The timing when the image signal output unit 23 outputs the image signals D[m] (image signals DGB[m]) in the m-th row is included in a period (a horizontal active data period DHI to be described in FIGS. 14C and 14D) during which the display area AD can display the image.

However, in a case where the first condition and the second condition are satisfied, the timing generator 32 controls the output timings of the image signals D[m] (image signals DGB[m]) from the image signal output unit 23, and thus, the third condition is necessarily satisfied. Thus, in the present embodiment, the third condition is not taken into consideration in the determination of the output control unit 31.

Hereinafter, a method of implementing the control method of the output control unit 31 will be described in more details. For example, the output control unit 31 may perform the determination of whether or not "the preparation to output the image signals D[m] (image signals DGB[m]) is completed" by the following two aspects.

A first aspect is an aspect in which the output control unit 31 directly performs two determinations of determination (first determination) of whether or not the first condition is satisfied and determination (second determination) of whether or not the second condition is satisfied.

Specifically, the output control unit 31 determines whether or not m satisfies "m≤ma" based on the line number ma indicated by the writing-completion signal PtA (performs the first determination) if the image processing unit 21 outputs the writing-completion signal PtA, determines whether or not the line number mb indicated by the output-completion signal PtB satisfies "mb=m−1" (performs the second determination) if the image signal output unit 23 outputs the output-completion signal PtB, and determines that the "preparation to output the image signals D[m] is completed" in a case where both the determination result of the first determination and the determination result of the second determination are positive.

In this case, the output control unit 31 functions as a "processing state determination unit" that determines whether or not the image signals corresponding to the image to be displayed in the display target lines are generated by performing the first determination, and functions as a "display determination unit" that determines whether or not the image in the display target lines can be displayed by performing the second determination.

In a case where the determination of the first determination or the determination result of the second determination is negative, the output control unit 31 repeats the first determination and the second determination until both the determination result of the first determination and the determination result of the second determination become positive. Specifically, for example, the output control unit 31 may perform the first determination whenever the writing-completion signals PtA are output from the image processing unit 21 and may perform the second determination whenever the output-completion signals PtB are output from the image signal output unit 23 until both the determination results of the first determination and the second determination become positive. For example, the output control unit 31 may repeat the first determination and the second determination at a cycle of a horizontal scanning period Hd, to be described below, until both the determination results of the first determination and the second determination become positive. When both the determination result of the first determination and the determination result of the second determination become positive, the output control signals CTR (precisely, CTR[m]) are set to be values indicating that the determination results are positive.

Next, a second aspect of the determination of whether or not "the preparation to output the image signals D[m] (image signals DGB[m]) is completed" is an aspect in which the output control unit 31 performs the determination (first determination) of whether or not the first condition is satisfied at a timing when the image signal output unit 23 outputs the line numbers mb=m−1 indicated by the output-completion signals PtB after the result of the previous determination (determination of whether or not the preparation to output the image signals D[m−1] is completed) becomes positive.

In this aspect, in a case where the determination result of the first determination is negative, the output control unit 31 repeats the first determination until the determination result of the first determination becomes positive, and sets the output control signals CTR to the values (CTR[m]) indicating that the determination results are positive when the determination result of the first determination becomes positive. Specifically, for example, in a case where the determination result of the first determination is negative at a timing when the output-completion signals PtB are output, the output control unit 31 may determine whether or not m satisfies "m≤ma" based on the line numbers ma indicated by the writing-completion signals PtA whenever the image processing unit 21 outputs the writing-completion signals PtA, and may determine that the first condition is satisfied when "m≤ma" is satisfied.

As stated above, the image processing unit 21 generates the image signals D[m] (image signals DGA[m]) in the order of the line numbers, and the image signal output unit 23 outputs the image signals D[m] (image signals DGA[m]) in the order of the line numbers. In the present embodiment, after the output of the image signals D[m−2] in an (m−2)-th row is completed and the output control unit 31 determines that "the preparation to output the image signals D[m−1] is completed", the image signal output unit 23 outputs the image signals D[m−1]. Thus, the timing when the output control unit 31 determines whether or not "the preparation to output the image signals D[m] (image signals DGB[m]) is completed is a timing after the image signals D[m−2] (image signals DGB[m−2]) is output from the image signal output unit 23 and is a timing after the output control unit 31 determines that "the preparation to output the image signals D[m−1] (image signals DGB[m−1]) is completed". That is, the line numbers mb indicated by the output-completion signals PtB output by the image signal output unit 23 become "m−1" at a timing when the output control unit 31 performs the determination of whether or not "the preparation to output the image signals D[m] is completed".

Thus, in the second aspect, the output control unit 31 regards that the second condition is satisfied based on the output of the output-completion signals PtB from the image signal output unit 23. The output control unit 31 performs the determination (first determination) of whether or not the first condition is satisfied at a timing when the output-completion signals PtB are output from the image signal output unit 23, and thus, the output control unit determines whether or not "the preparation to output the image signals D[m] (image signals DGB[m]) is completed.

In the present embodiment, it will be described on the assumption that the second aspect of the two aspects is adopted.

The timing generator 32 generates a display vertical synchronization signal DVsync, a vertical active data signal DVactive, a display horizontal synchronization signal DHsync, a display dot clock signal DCLK, and an enable signal DEnb, and outputs the generated signals to the image signal output unit 23 and the display unit 40.

Figure 14A:
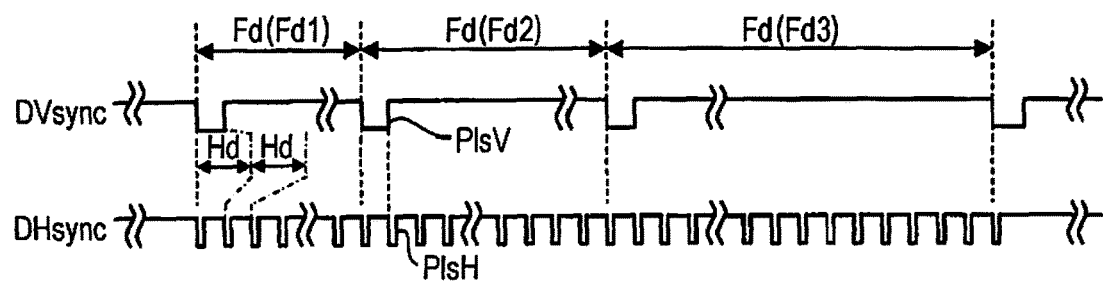
FIG. 14A is a timing chart for describing the operation of the vehicle imaging display system 1.
Figure 14B:
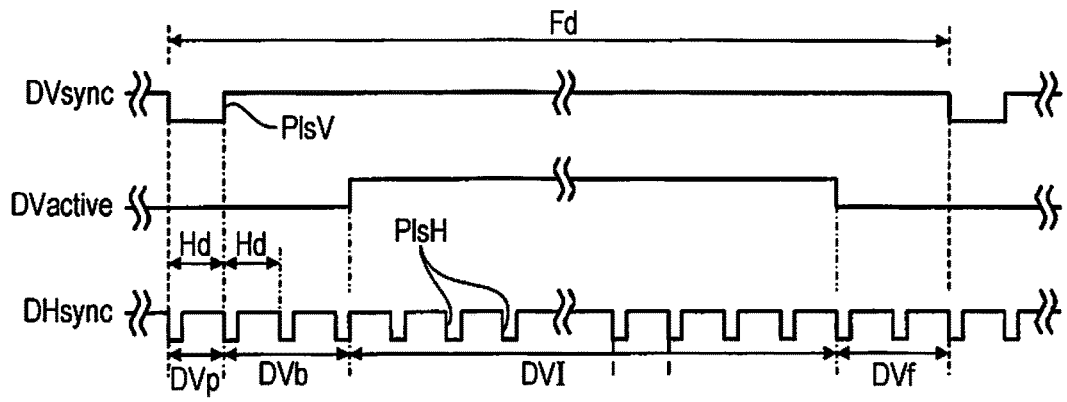
FIG. 14B is a timing chart for describing the operation of the vehicle imaging display system 1.
Figure 14C:
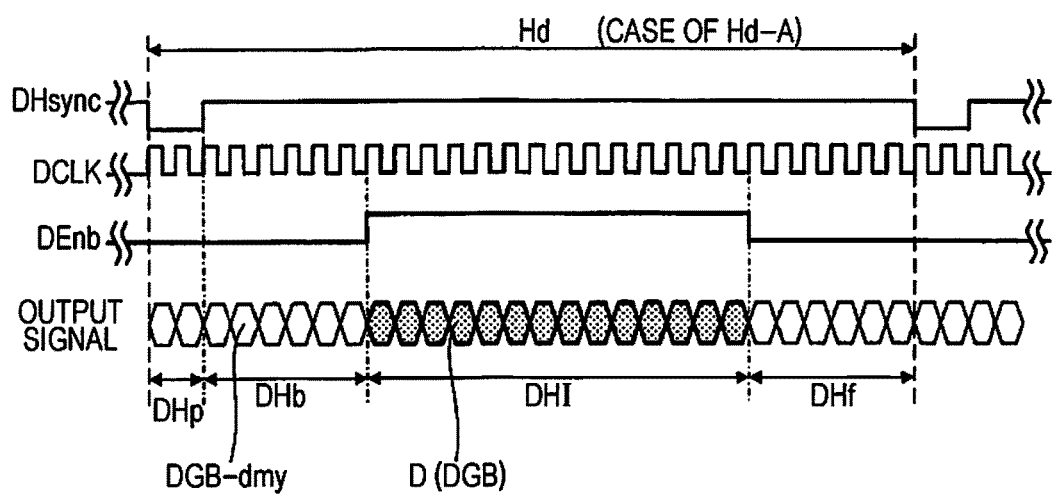
FIG. 14C is a timing chart for describing the operation of the vehicle imaging display system 1.
Figure 14D:
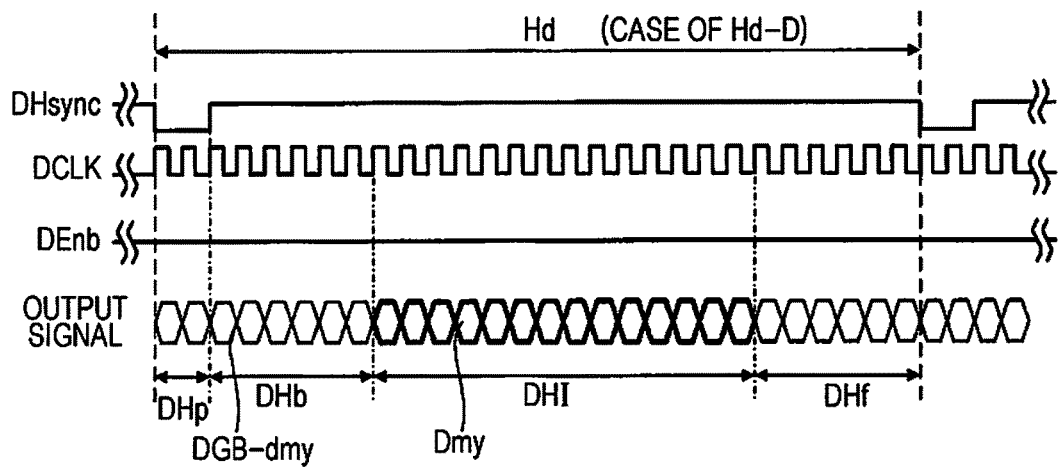
FIG. 14D is a timing chart for describing the operation of the vehicle imaging display system 1.

FIGS. 14A and 14D are timing charts for describing the display vertical synchronization signal DVsync, the vertical active data signal DVactive, the display horizontal synchronization signal DHsync, the display dot clock signal DCLK, and the enable signal DEnb which are generated by the timing generator 32.

As shown in FIGS. 14A and 14B, the display vertical synchronization signal DVsync is a signal that defines a display vertical scanning period Fd (that is, the frame period of the display unit 40) during which the image is displayed in the pixels (as many pixels as M lines) of the entire display area AD of the liquid crystal panel 42. The display horizontal synchronization signal DHsync is a signal that defines the horizontal scanning period Hd during which the image is displayed in as many pixels as one line of the display area AD. The display dot clock signal DCLK is a signal that defines the timing when the image is displayed in the respective pixels of the display area AD.

In the present embodiment, the horizontal scanning period Hd has a predetermined constant time length. In the present embodiment, the display vertical scanning period Fd includes the plurality of horizontal scanning periods Hd, and has a variable time length (cycle) less than the time length (cycle) of the imaging vertical scanning period Fs. Thus, the number of horizontal scanning periods Hd included in each display vertical scanning period Fd is variable. In the example shown in FIG. 14A, a case where among the plurality of display vertical scanning periods Fd shown in FIG. 14A, a display vertical scanning period Fd1 which is a first display vertical scanning period Fd is shorter than a display vertical scanning period Fd2 subsequent to the display vertical scanning period Fd1 and the display vertical scanning period Fd2 is shorter than a display vertical scanning period Fd3 subsequent to the display vertical scanning period Fd2 is illustrated.

Among the waveforms of the display vertical synchronization signal DVsync, pulse-shaped waveforms that define timings when the display vertical scanning period Fd is started and ended are referred to as vertical synchronization pulses PlsV. Among the waveforms of the display horizontal synchronization signal DHsync, pulse-shaped waveforms that define timings when the horizontal scanning period Hd is started and ended are referred to as horizontal synchronization pulse PlsH.

As shown in FIG. 14B, the display vertical scanning period Fd includes a vertical synchronization period DVp, a vertical back porch period DVb, a vertical active data period DVl, and a vertical front porch period DVf.

The vertical synchronization period DVp is a period during which the display vertical synchronization signal DVsync is active (is at a low level in the example of this drawing), and is a period having a predetermined time length which is started simultaneously with the starting of the display vertical scanning period Fd. The vertical back porch period DVb is a period subsequent to the vertical synchronization period DVp and is a period having a predetermined time length. The vertical active data period DVl is a period having a variable time length which is subsequent to the vertical back porch period DVb. The image signals DGB (image signals DGB[1] to DGB[M]) are output from the image signal output unit 23 during the vertical active data period DVl. The vertical front porch period DVf is a period subsequent to the vertical active data period DVl and is a period having a predetermined time length which is ended simultaneously with the ending of the display vertical scanning period Fd.

The vertical active data period DVl is a period from the starting of the horizontal scanning period Hd during which the enable signal DEnb becomes initially active to the ending of the horizontal scanning period Hd during which the enable signal DEnb becomes active in the M-th number of times in each display vertical scanning period Fd (a case where the enable signal DEnb becomes active is described below).

For example, the vertical active data period DVl may be determined based on a count value output by a counter (not shown) that counts the number of times the enable signal DEnb becomes active. Here, in the present embodiment, for the sake of convenience in the description, the vertical active data signal DVactive that becomes active during the period from the starting of the horizontal scanning period Hd during which the enable signal DEnb becomes initially active to the ending of the horizontal scanning period Hd during which the enable signal DEnb becomes active (is at a high level in the example of this drawing) in the M-th number of times is introduced in each display vertical scanning period Fd. That is, it will be described in the present embodiment that the period during which the vertical active data signal DVactive becomes active is the vertical active data period DVl. The vertical active data signal DVactive is a signal introduced for the sake of convenience in the description, and the output control unit 31 may not output the vertical active data signal DVactive.

As shown in FIGS. 14C and 14D, the horizontal scanning period Hd includes a horizontal synchronization period DHp, a horizontal back porch period DHb, a horizontal active data period DHl, and a horizontal front porch period DHf.

The horizontal synchronization period DHp is a period during which the display horizontal synchronization signal DHsync is active (is at a low level in the example of this drawing), and is a period having a predetermined time length which is started simultaneously with the starting of the horizontal scanning period Hd. The horizontal back porch period DHb is a period subsequent to the horizontal synchronization period DHp and is a period having a predetermined time length. The horizontal active data period DHl is a period having a predetermined time length which is subsequent to the horizontal back porch period DHb. The horizontal front porch period DHf is a period subsequent to the horizontal active data period DHl and is a period having a predetermined time length which is ended simultaneously with the ending of the horizontal scanning period Hd.

In the present embodiment, an active horizontal scanning period Hd-A (see FIG. 14C) during which the image signal output unit 23 outputs the image signals D[m] and an inactive horizontal scanning period Hd-D (see FIG. 14D) during which the image signal output unit outputs the inactive signals Dmy[m] instead of outputting the image signals D[m] are present in the horizontal scanning period Hd.

FIG. 14C shows a case where the horizontal scanning period Hd is the active horizontal scanning period Hd-A. As shown in this drawing, in a case where the horizontal scanning period Hd is the active horizontal scanning period Hd-A, the enable signal DEnb becomes active (is at a high level in the example of this drawing) during the horizontal active data period DHl. The image signals D[m] (image signals DGB[m]) are output from the image signal output unit 23 during the horizontal active data period DHI during which the enable signal DEnb becomes active. Meanwhile, the enable signal DEnb becomes inactive during the periods (the horizontal synchronization period DHp, the horizontal back porch period DHb, and the horizontal front porch period DHf) other than the horizontal active data period DHI in the active horizontal scanning period Hd-A. The image signal output unit 23 stops outputting the image signals D[m] (image signals DGB[m]) for every pixel of line data during the periods other than the horizontal active data period DHI during which the enable signal DEnb becomes inactive in the active horizontal scanning period Hd-A, and outputs inactive line signals DGB-dmy.

The timing generator 32 activates the enable signal DEnb during the horizontal active data period DHI, and thus, the third condition is satisfied. That is, the timing control unit 30 that includes the output control unit 31 and the timing generator 32 causes the image signal output unit 23 to output the line data of the image signals D[m] (image signals DGB[m]) corresponding to the display target lines for every pixel at a timing when all the first condition to the third condition are satisfied.

FIG. 14D shows a case where the horizontal scanning period Hd is the inactive horizontal scanning period Hd-D. As shown in this drawing, the enable signal DEnb becomes inactive (that is, DEnb is in a low level) during the horizontal active data period DHI in a case where the horizontal scanning period Hd is the inactive horizontal scanning period Hd-D. The image signal output unit 23 outputs the inactive signals Dmy instead of the image signals D[m] (image signals DGB[m]) during the horizontal active data period DHI of the inactive horizontal scanning period Hd-D. Meanwhile, the enable signal DEnb becomes inactive during the periods (the horizontal synchronization period DHp, the horizontal back porch period DHb, and the horizontal front porch period DHf) other than the horizontal active data period DHI of the inactive horizontal scanning period Hd-D. The image signal output unit 23 stops outputting the image signals D[m] (image signals DGB[m]) to output the inactive line signals DGB-dmy during the periods other than the horizontal active data period DHI of the inactive horizontal scanning period Hd-D.

The timing generator 32 determines whether the horizontal scanning period Hd is set to the active horizontal scanning period Hd-A or the inactive horizontal scanning period Hd-D, in other words, whether or not to set the enable signal DEnb to be active during the horizontal active data period DHI, based on the output control signals CTR output by the output control unit 31. The relationship between the types of the output control signal CTR, the enable signal DEnb, and the horizontal scanning period Hd will be described below.

Figure 15:
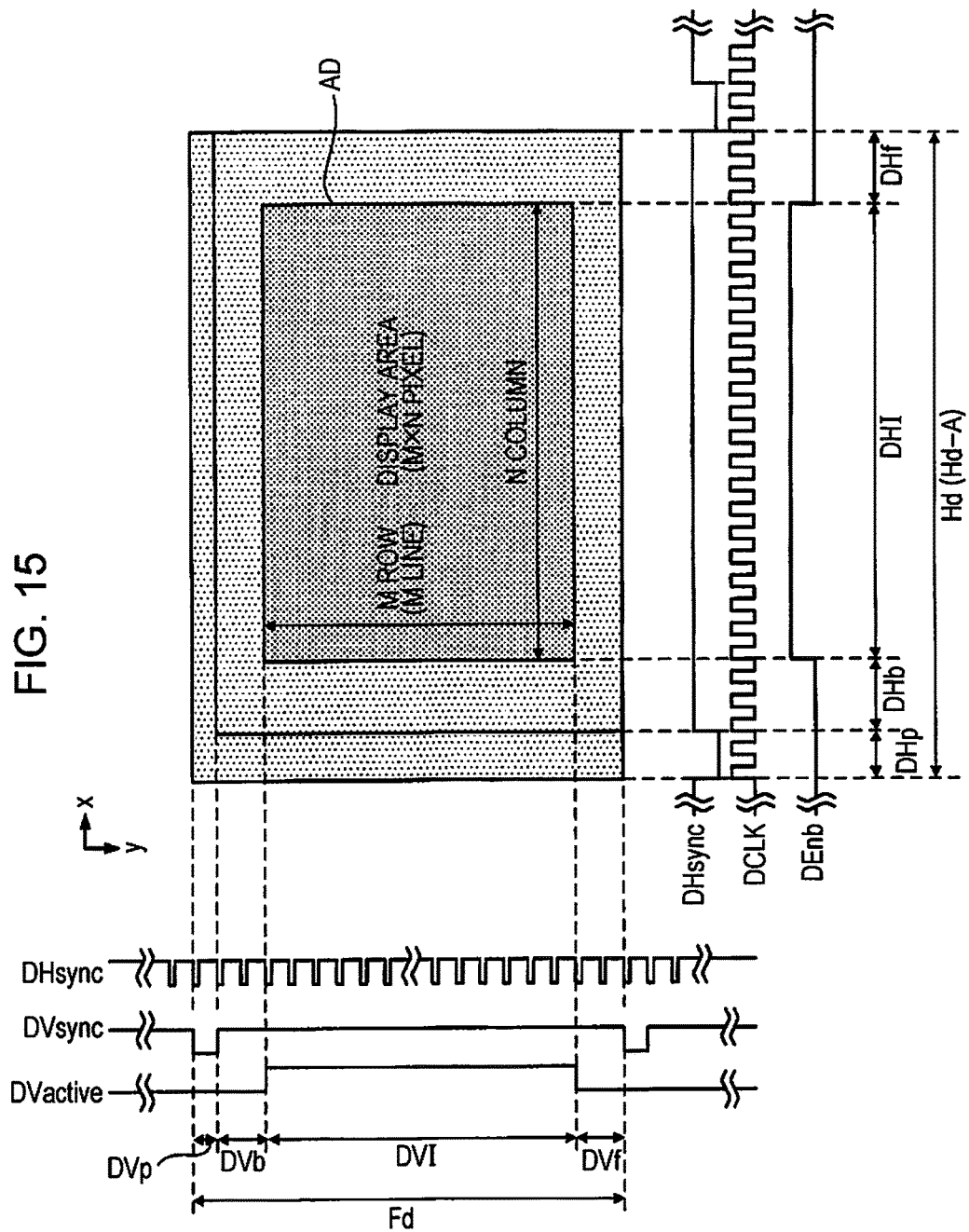
FIG. 15 is an explanatory diagram for describing the display area AD and showing a timing chart for displaying the display area AD in the display unit.

FIG. 15 is an explanatory diagram for describing the relationship between various signals generated by the timing generator 32 and the display timing of the image in the display area AD of the liquid crystal panel 42.

As shown in this drawing, the pixels in M rows×N columns over a first-row line to an (M-th)-row line of the display area AD display as many an image as one screen indicated by the image signals D[1] to D[M] during the vertical active data period DVI during which the vertical active data signal DVactive becomes active, in the display vertical scanning period Fd.

N pixels constituting the (m-th)-row line of the display area AD display an image for every pixel of the line data indicated by the image signals D[m] during the horizontal active data period DHI during which the enable signal DEnb becomes active, in the horizontal scanning period Hd (active horizontal scanning period Hd-A).

Although the vertical active data period DVI is extended depending on the number of inactive horizontal scanning periods Hd-D included in the vertical active data period DVI, it is assumed in this drawing that all the horizontal scanning periods Hd included in the vertical active data period DVI are the active horizontal scanning periods Hd-A.

Hereinafter, the left display unit 40-1 will be described with reference to FIG. 16.

Figure 16:
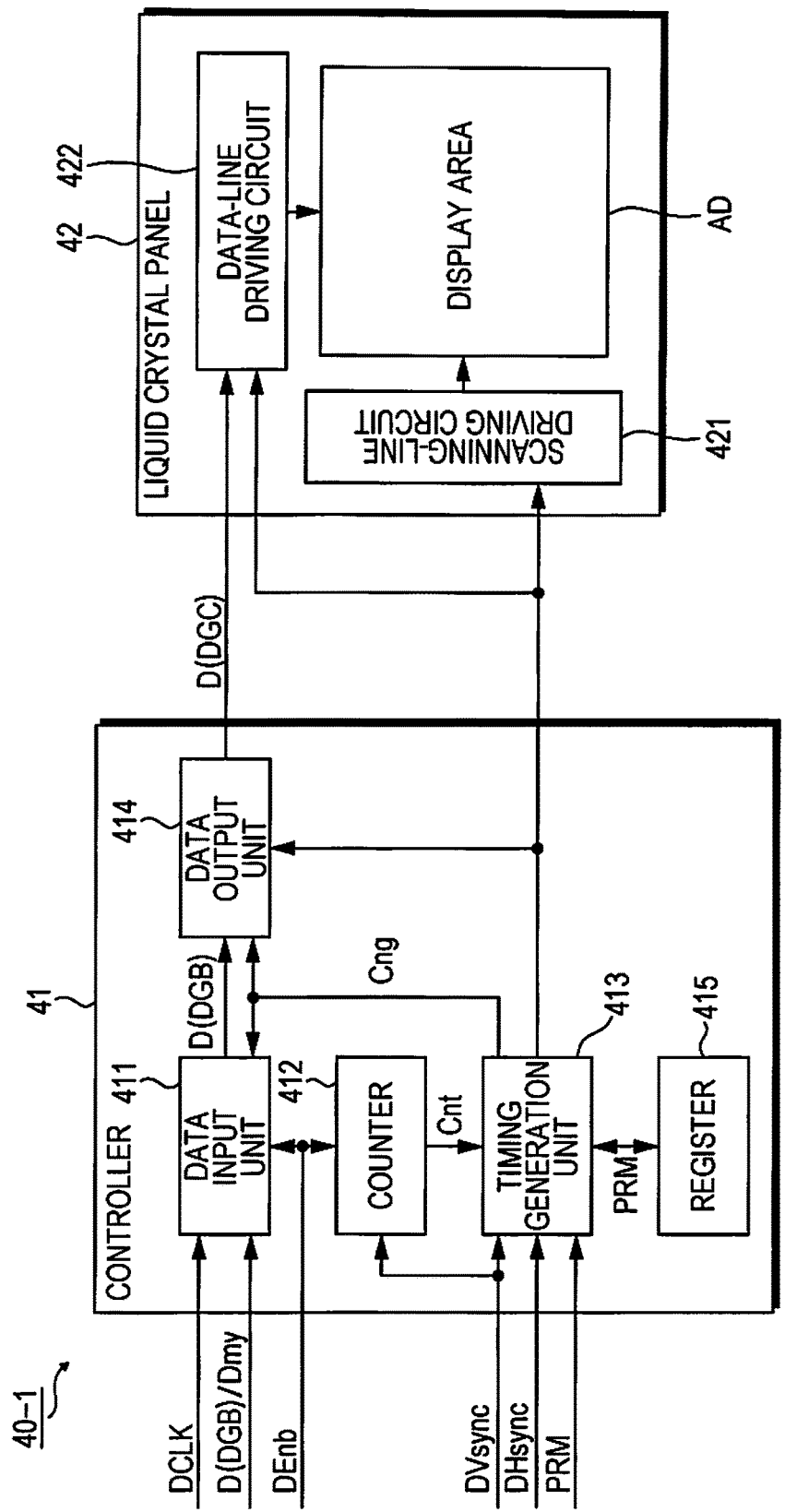
FIG. 16 is a block diagram showing the configuration of the left display unit 40-1.

FIG. 16 is a block diagram showing a configuration of the left display unit 40-1. As stated above, the left display unit 40-1 includes the controller 41 that controls the operation of the liquid crystal panel 42, and the liquid crystal panel 42 for displaying the image corresponding to the image signals D.

As sated above, the display area AD for displaying the image corresponding to the image signals D is formed in the liquid crystal panel 42. The display area AD includes M-row scanning lines extending in the X-axis direction in FIG. 15, N-column data lines extending in the Y-axis direction, and pixels in M rows×N columns which are received so as to correspond to the intersections of the scanning lines and the data lines. The liquid crystal panel 42 includes a scanning-line driving circuit 421 for selecting the scanning line, and a data-line driving circuit 422 for driving the data line.

The controller 41 includes a data input unit 411 to which the image signal D (image signal DGB) is input from the image signal output unit 23, a counter 412 that counts the number of active horizontal scanning periods Hd-A (the number of times the enable signal DEnb becomes active) during each vertical active data period DVI, a timing generation unit 413 that generates various timing signals for defining a driving timing of the liquid crystal panel 42, a data output unit 414 that outputs the image signal D (image signal DGC) to the liquid crystal panel 42, and a register 415 that stores setting parameters PRM for defining the operations of the controller 41.

In the present embodiment, data transmission between the image processing circuit 100 (image signal generation unit 20 and the timing control unit 30) and the controller 41 is performed through a parallel interface (not shown).

The setting parameters PRM set to the register 415 are values that are used to operate the controller 41 according to the specification of the liquid crystal panel 42 and define the operations of the controller 41.

For example, the setting parameters PRM may include the time length of the horizontal scanning period Hd (or the number of clocks of the display dot clock signals DCLK included in the horizontal scanning period Hd. Hereinafter, the number of clocks of the display dot clock signals DCLK is simply referred to as a "clock number".), the time length of the horizontal active data period DHI (or the number of pixels (N) of the display area AD in an X-axis direction), the time length of the horizontal synchronization period DHp (or a clock number), the time length of the horizontal back porch period DHb (or a clock number), the time length of the horizontal front porch period DHf (or a clock number), the time length of the vertical active data period DVI in a case where the inactive horizontal scanning period Hd-D is not included in the vertical active data period DVI (or the number of lines (M) of the display area AD in the Y-axis direction. That is, the number of active horizontal scanning periods Hd-A included in the vertical active data period DVI), the time length of the vertical synchronization period DVp (or a clock number), the time length of the vertical back porch period DVb (or a clock number), and the time length of the vertical front porch period DVf (or a clock number).

In the vehicle imaging display system 1 according to the present embodiment, since the operation timing of the controller 41 can be set from the image processing circuit 100 according to the specification of the liquid crystal panel 42, it is not necessary to change the controller 41 even in a case where the size of the liquid crystal panel 42 is changed or a case where the specification of the liquid crystal panel 42 such as the frame rate is changed. Thus, it is possible to improve the versatility of the system.

The display dot clock signal DCLK, the output signal including the image signal D (Image signal DGB), the inactive line signal DGB-dmy, and the inactive signal Dmy from the image signal output unit 23, and the enable signal DEnb are supplied from the image processing circuit 100 to the data input unit 411.

If the enable signal DEnb becomes active, the data input unit 411 synchronizes the display dot clock signal DCLK for the period during which the enable signal DEnb is active, receives as many image signals D[m] as one line supplied from the image signal output unit 23, and outputs the received image signals D[m] to the data output unit 414. Meanwhile, in a case where the enable signal DEnb is inactive, the data input unit 411 discards the inactive signal Dmy supplied from the image signal output unit 23 without receiving the inactive signal.

The enable signal DEnb and the display vertical synchronization signal DVsync are supplied to the counter 412 from the image processing circuit 100.

The counter 412 counts rising edges of the enable signal DEnb, and outputs the count value Cnt indicating the count result to the timing generation unit 413. If the display vertical synchronization signal DVsync becomes active and the display vertical synchronization pulse PlsV is supplied as the vertical synchronization signal DVsync, the counter 412 resets the count value Cnt to be "0". Thus, the counter 412 can count the number of active horizontal scanning periods Hd-A included in each display vertical scanning period Fd. That is, the count value Cnt indicates the line number (m) corresponding to the image signal D[m] in a case where the data input unit 411 receives the image signal D[m] that designates the image to be displayed by the (m-th)-row line.

The display vertical synchronization signal DVsync, the display horizontal synchronization signal DHsync, and the setting parameters PRM from the image processing circuit 100 and the count value Cnt from the counter 412 are supplied to the timing generation unit 413.

As mentioned above, if the setting parameter PRM is supplied from the image processing circuit 100, the timing generation unit 413 sets the supplied setting parameter PRM to the register 415.

In a case where the count value Cnt indicates "m", the timing generation unit 413 causes the scanning-line driving circuit 421 to select the (m-th)-row line (scanning line) corresponding to the count value Cnt. In a case where the count value Cnt indicates "m", the timing generation unit 413 causes the data output unit 414 to supply the as many image signals D[m] as one line received by the data input unit 411 to the data-line driving circuit 422, the image signals DGC[m]. In this case, the data-line driving circuit 422 writes the image signals DGC[m] supplied from the data output unit 414 in N pixels (the (m-th)-row line) formed so as to correspond to the (m-th)-row line scanning line selected by the scanning-line driving circuit 421. Accordingly, the image of the selected line is displayed in the display area AD. Although it has been described in the present embodiment that the image signals DGA and DGB are digital signals, the image signals DGC may be digital signals or may be analog signals.

As stated above, the controller 41 displays the image (that is, the image indicated by the image signal DL) indicated by the image signals D supplied from the image signal output unit 23 in the display area AD of the liquid crystal panel 42.

Figure 17:
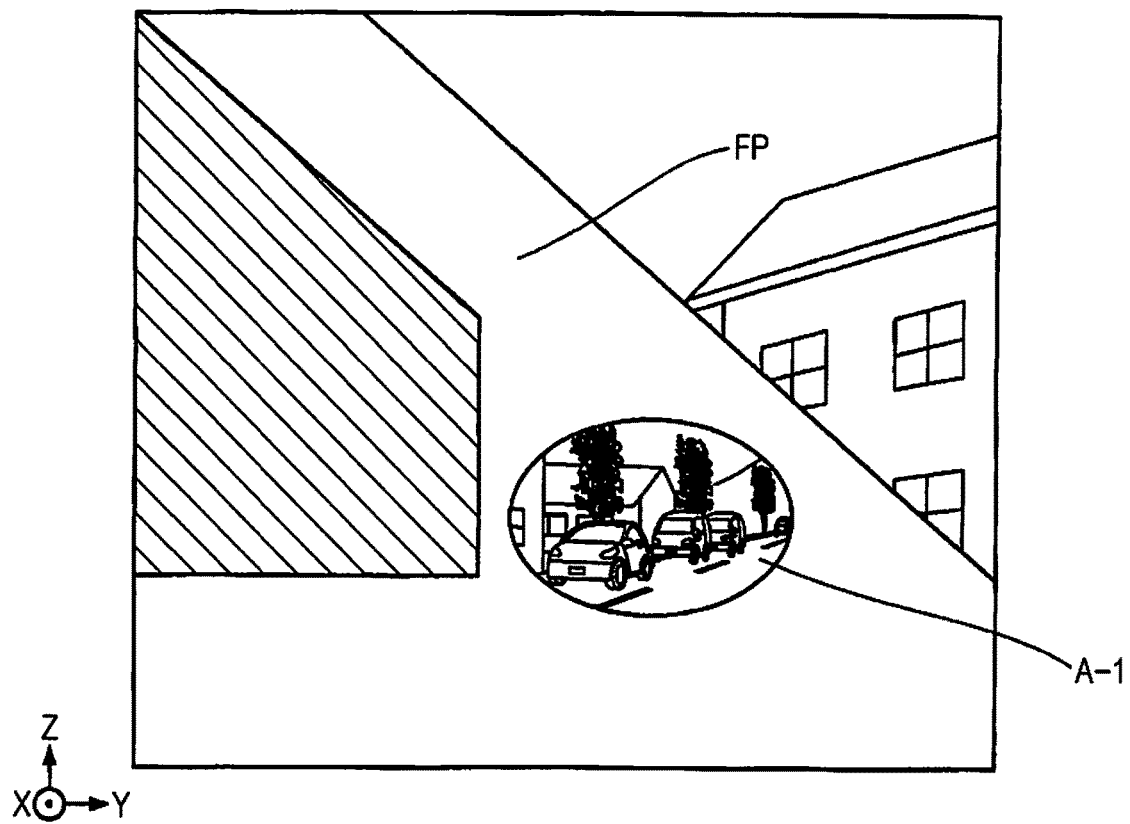
FIG. 17 is a diagram showing a display example of an image indicated by an image signal DL in a left front A pillar FP.

FIG. 17 shows a display example of the image indicated by the image signal DL of the left front A pillar. As shown in the drawing, the image indicated by the image signal DL is displayed in the area A-1 near the surface close to the interior in the left front A pillar FP present on a left side of the windshield of the vehicle A so as to be visually perceived by the driver. In the left display unit 40-1, if the transmission type screen 402L is irradiated with the image indicated by the image signal DL displayed in the rectangular display area AD from the pico projector 401L, the real image is formed on the transmission type screen 402L, and the irradiation light is reflected from the combiner 404L. Among the irradiation light reflected from the combiner 404L, only light reaching the inside of the elliptical opening OpL is output to the outside of the left front A pillar FP, and thus, the elliptical image is visually perceived by the driver as shown in the illustrated example.

Figure 18A:
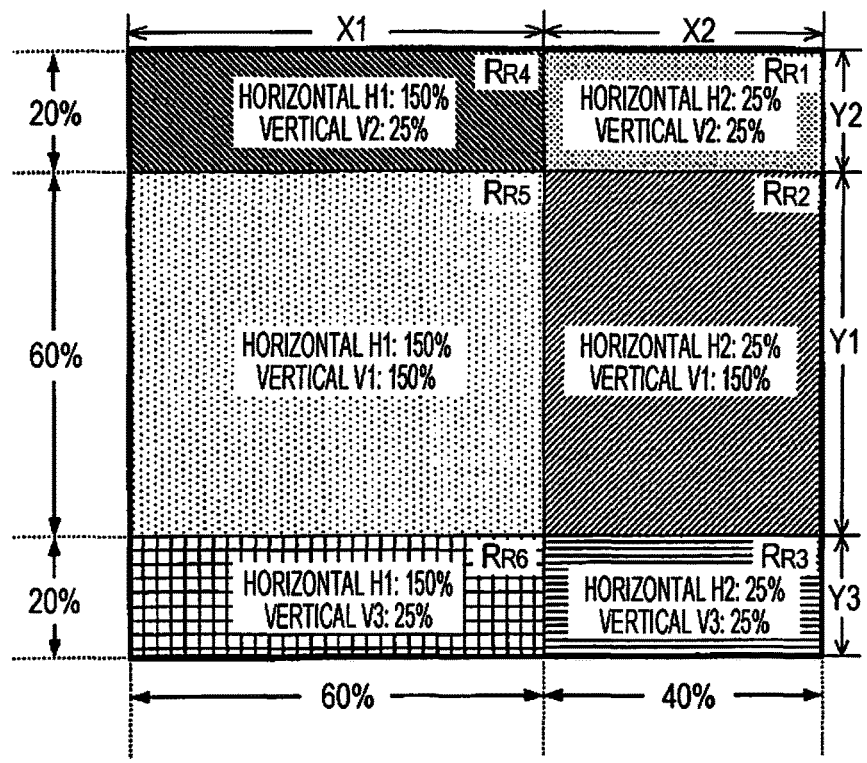
FIG. 18A is a conceptual diagram of a magnification and minification process performed on an image based on an imaging signal DSR.
Figure 18B:
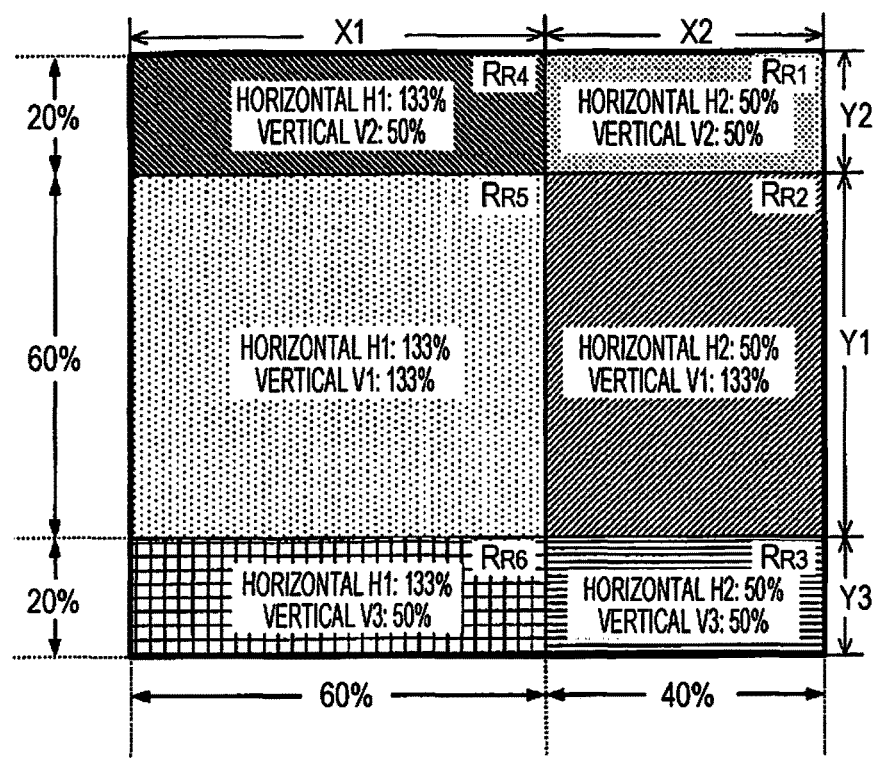
FIG. 18B is a conceptual diagram of the magnification and minification process performed on the image based on the imaging signal DSR.
Figure 18C:
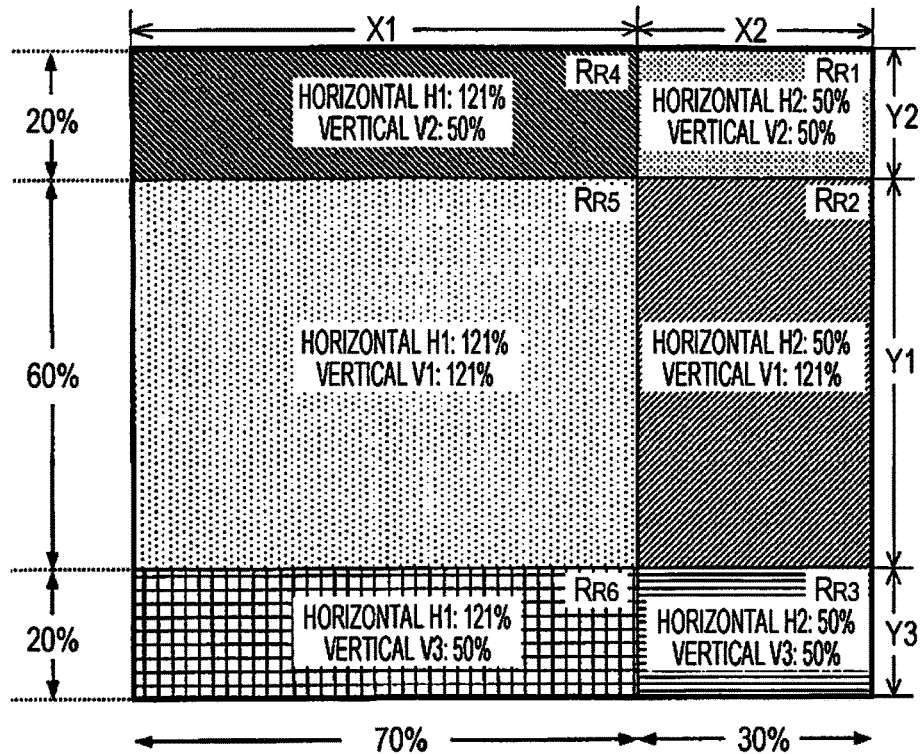
FIG. 18C is a conceptual diagram of the magnification and minification process performed on the image based on the imaging signal DSR.

The configurations of the rear-right-area imaging unit 10-3, the image processing circuit 100-3, and the right display unit 40-3 are the same as the configurations of the rear-left-area imaging unit 10-1, the image processing circuit 100-1, and the left display unit 40-1 except that the term indicating the direction is changed from the left to the right. Specifically, in a case where the minification and magnification process on the left display unit 40-1 is the process shown in FIGS. 12A, 12D and 12G, the minification and magnification process on the right display unit 40-3 is the process shown in FIGS. 18A, 18B, and 18C.

Figure 18D:
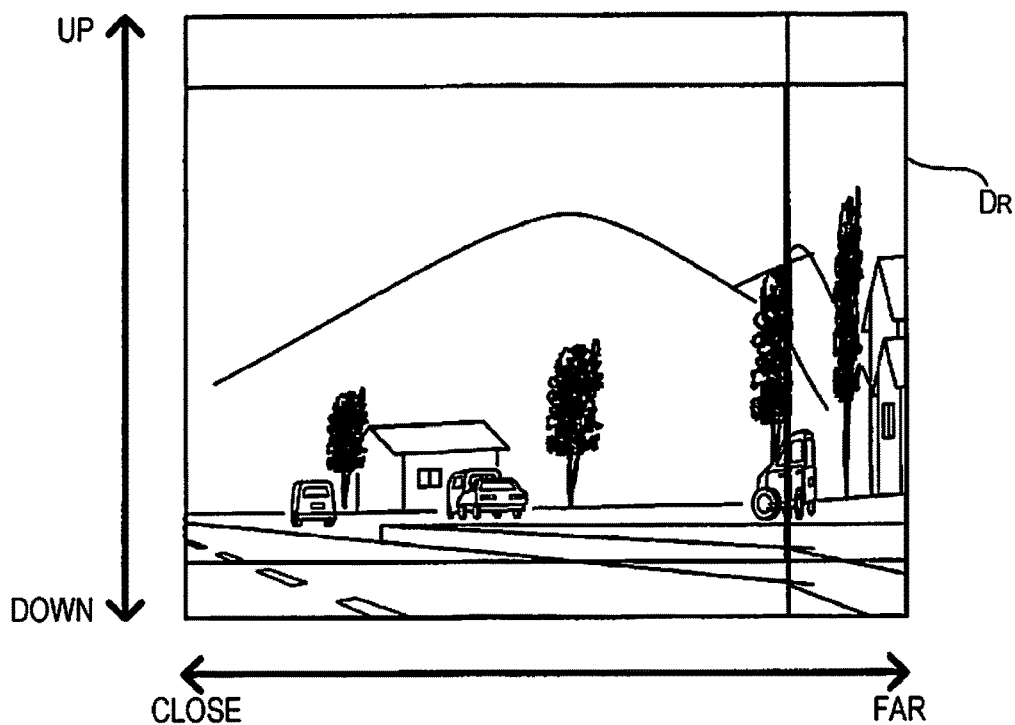
FIG. 18D is a diagram showing an example of an image indicated by an image signal DRR.

As shown in FIG. 18D, the image (the image indicated by the image signal DR) based on the imaging signal DS imaged by the rear-right-area imaging unit 10-3 is displayed such that the area RRC (FIG. 2) close to the vehicle body in the left and right direction is further magnified than the area RRR far away from the vehicle body and the center area in the up and down direction is magnified. The image indicated by the image signal DR is projected toward the transmission type screen 402R from the pico projector 401R of the right display unit 40-3, is reflected from the combiner 404R, and is displayed in the area A-3 near the surface close to the interior in the right front A pillar present on the right side of the windshield of the vehicle A so as to be visually perceived by the driver.

As described for the left display unit 40-1, the division ratio, the vertical-direction variable magnification, and the horizontal-direction variable magnification of the screen used in the horizontal-direction minification and magnification process and the vertical-direction minification and magnification process are arbitrarily set.

Hereinafter, the configurations of the rear-center-area imaging unit 10-2, the image processing circuit 100-2, and the center display unit 40-2 are the same as the configurations of the rear-left-area imaging unit 10-1, the image processing circuit 100-1, and the left display unit 40-1. However, in the image processing unit 21 of the image processing circuit 100-2, the magnification and minification ratios are different between the process by the horizontal-direction minification and magnification process unit 221 and the magnifying process by the vertical-direction minification and magnification process unit 222.

Figure 19:
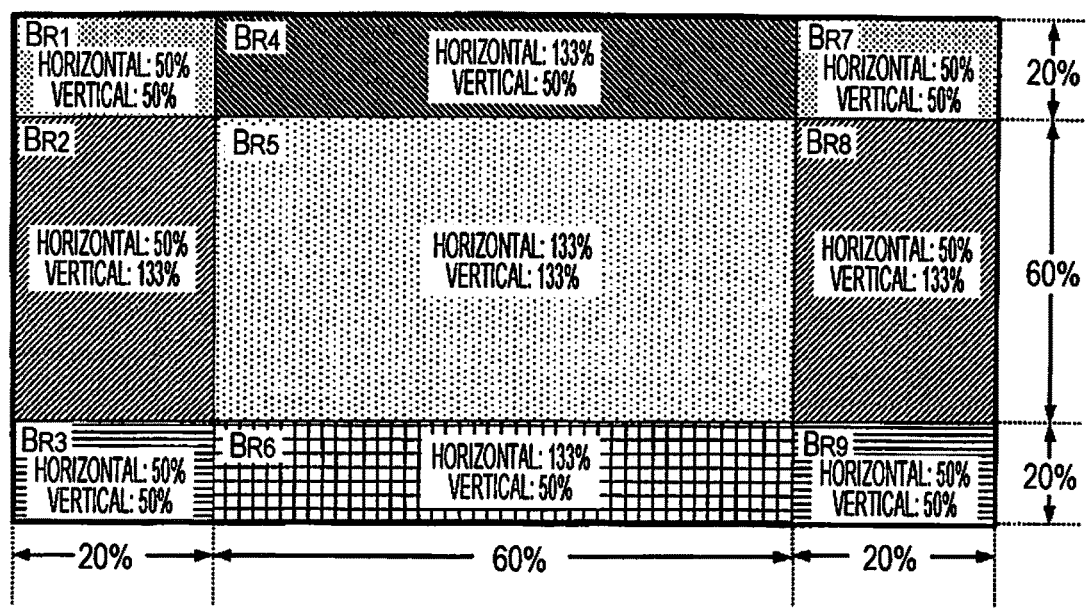
FIG. 19 is a conceptual diagram of a magnification and minification process performed on an image based on an imaging signal DSC.

FIG. 19 is a conceptual diagram of the magnification and minification process performed on the image based on the imaging signal DSC imaged by the rear-center-area imaging unit 10-2. The illustrated example indicates the image signal DF acquired by performing the trimming process and the left-right reversal process on the imaging signal DSC. As shown in this drawing, in the magnification and minification process, the image of the image signals DI output from the mirror image generation unit 220 is classified into nine areas including an upper left area BR1, a left center area BR2, a lower left area BR3, an upper center area BR4, a center area BR5, a lower center area BR6, an upper right area BR7, a right center area BR8, and a lower right area BR9. A length ratio between the left area BRL (FIG. 2), the center area BRC, and the right area BRR in the left and right direction and a length ratio between the upper area, the center area, and the lower area in the up and down direction may be arbitrarily determined. In the example shown in FIG. 19, the area in the left and right direction is divided into areas with 20%, 60%, and 20%, and the area in the up and down direction is divided into areas with 20%, 60%, and 20%.

A predetermined horizontal-direction variable magnification (a magnification ratio or a minification ratio in the left and right direction) and a predetermined vertical-direction variable magnification (a magnification ratio or a minification ratio in the up and down direction) are previously set to the respective areas. Specifically, the minification ratio in the left and right direction and the minification ratio in the up and down direction are set as 50% to the upper left area BR1, the lower left area BR3, the upper right area BR7, and the lower right area BR9 in any direction of the left and right direction and the up and down direction, as shown in FIG. 19. The minification ratio in the left and right direction and the magnification ratio in the up and down direction are respectively set as 50% and 133% to the left center area BR2 and the right center area BR8 which are the end areas in the left and right direction but are the center areas in the up and down direction. The magnification ratio in the left and right direction and the minification ratio in the up and down direction are respective set as 133% and 50% to the upper center area BR4 and the lower center area BR6 which are the center areas in the left and right direction but are an upper or lower area. The magnification ratio in the left and right direction and the magnification ratio in the up and down direction are set as 133% to the center area BR5 which is the center area in any direction of the left and right direction and the up and down direction. By setting the ratios in this manner, it is possible to improve visual perceptibility of a required area by the safety check when the vehicle is driven, among the image based on the imaging signals DS. For example, it is possible to further improve visual perceptibility of the area which is the center in the up and down direction and the up and down direction without requiring a physical machining process than that in the configuration in which a plane-surface mirror portion and a convex-surface mirror portion are formed on the mirror surface of the rear-view mirror and the mirror image reflected on the convex-surface mirror portion is contracted.

The image indicated by the image signal DC generated in this manner is projected toward the transmission type screen 402C from the pico projector 401C of the center display unit 40-2, is reflected from the combiner 404C, and is displayed in the area A-2 on the lower portion of the windshield glass of the vehicle A so as to be visually perceived by the driver.

Figure 20:
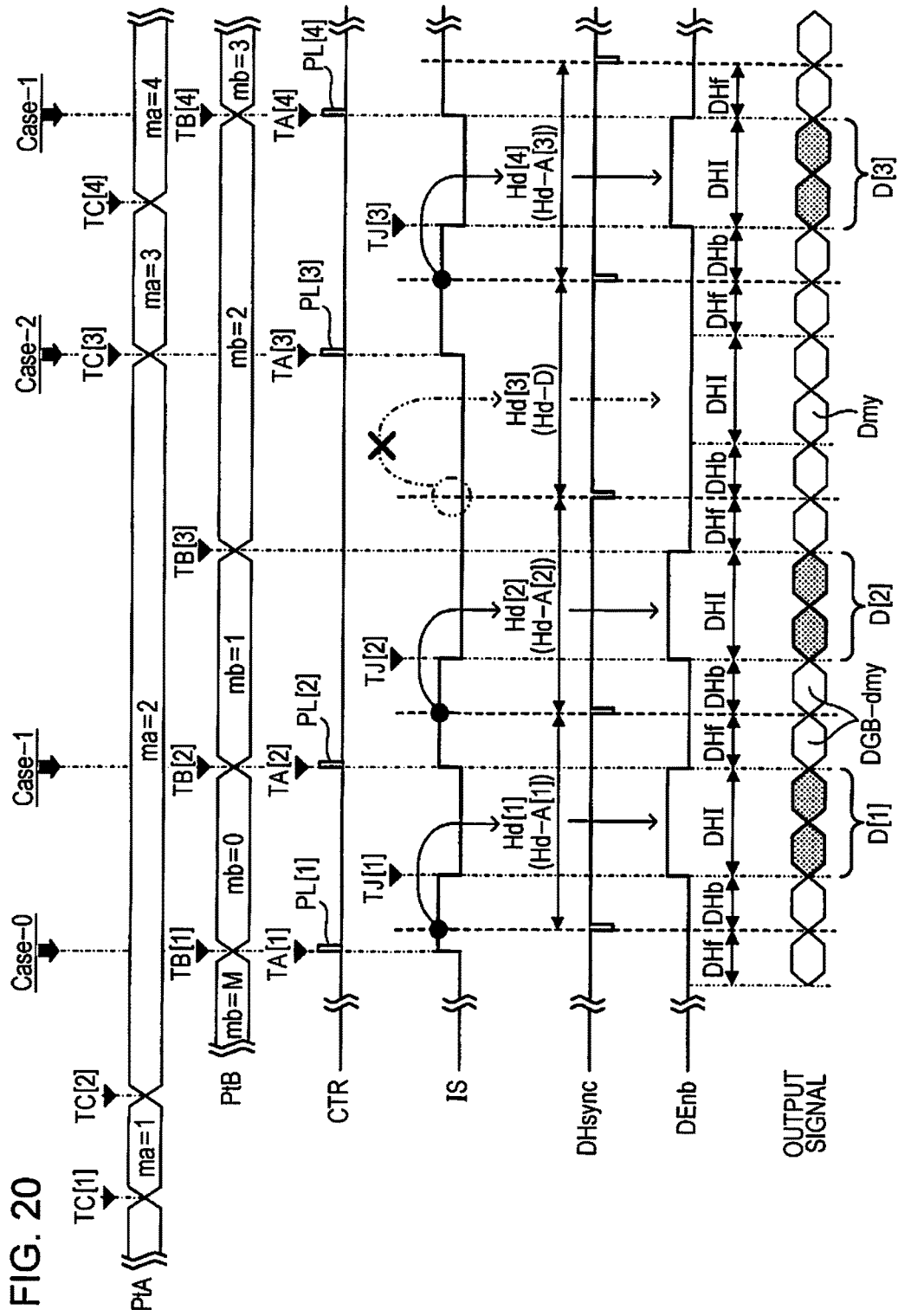
FIG. 20 is a timing chart for describing the operation of the vehicle imaging display system 1.

FIG. 20 is an explanatory diagram for describing the output control signal CRT and the enable signal DEnb.

As stated above, when it is determined that the preparation to output the image signals D[m] is completed, that is, when the first condition and the second condition are satisfied, the output control unit 31 sets the values CTR[m] indicating that the determination results are positive to the output control signals CTR. Here, for convenience's sake, it is assumed that the output control unit 31 temporarily outputs pulse-shaped waveforms that rise to a high level to the output control signals CTR when it is determined that the preparation to output the image signals D[m] is completed, and it is assumed as shown in FIG. 20 that output pulse waveforms representing the determination results indicating that the preparation to output the image signals D[m] set to the output control signals CTR is completed are referred to as output permission pulses PL[m] (=CTR[m]).

As stated above, the output control unit 31 according to the present embodiment regards that the second condition is satisfied based on the output of the output-completion signals PtB from the image signal output unit 23. The output control unit 31 determines whether or not the preparation to output the image signals D[m] is completed by performing the determination (first determination) of whether or not the image processing on the image signals D[m] is completed (the first condition is satisfied) when the output-completion signals PtB are output.

As shown in FIG. 20, in a case where the output control unit 31 determines whether or not the preparation to output the image signals D[m] is completed, a timing when the output control unit 31 determines (determines that the first condition is satisfied) that the image processing on the image signals D[m] is completed, that is, a timing when the results of the first determination become positive is referred to as an image processing determination time TA[m].

A timing when the output-completion signal PtB is supplied to the output control unit 31 (the second condition is regarded as being satisfied) is referred to as a display preparation determination time TB[m].

Hereinafter, for the sake of convenience in the description, a time when the generation of the image signals D[m] by the image processing unit 21 is actually completed is defined as an image signal generation time TC[m]. That is, the image signal generation time TC[m] is the same time as the time when the image processing unit 21 outputs the writing-completion signal PtA.

The display preparation determination time TB[m] is the substantially same time as the time when the output of the image signals D[m−1] from the output control unit 31 is completed, and is the substantially same time as the time when the horizontal active data periods DHI of the active horizontal scanning periods Hd-A (referred to as active horizontal scanning periods Hd-A[m−1]) during which the image signals D[m−1] is output are ended. A time when the horizontal active data period DHI of the first horizontal scanning period Hd[m] is started after the display preparation determination time TB[m] is an example of a "display available time".

In the present specification, the "substantially same time" includes the concept that even though there are time lags caused by the signal transmission and reception or time lags caused by various processes, these times can be regarded as the same time in a case where these time lags are ignored.

The image processing determination time TA[m] is the substantially same time as the display preparation determination time TB[m] in a case where the generation of the image signals D[m] (image signals DGA[m]) is completed before the display preparation determination time TB[m], that is, in a case (referred to as Case-1) where the image signal generation time TC[m] elapses before the display preparation determination time TB[m].

In the case of Case-1, at the timing (=timing when the second condition is regarded as being satisfied) of the display preparation determination time TB[m], the output control unit 31 performs the determination indicating that m satisfies "m≤ma" based on the line numbers ma indicated by the writing-completion signals PtA supplied to the output control unit 31 before the display preparation determination time TB[m]. Since the timing when this determination is performed is the image processing determination time TAM, there is actually a time lag between the image processing determination time TA[m] and the display preparation determination time TB[m], but it is assumed in the following description that both these times are substantially the same for the sake of convenience in the description.

Meanwhile, in a case (referred to as Case-2) where the generation of the image signals D[m] (image signals DGA [m]) is not completed before the display preparation determination time TB[m] (that is, the image signal generation time TC[m] does not arrive before the display preparation determination time TB[m]), the image processing determination time TA[m] become the time (that is, the substantially same time as the image signal generation time TC[m]) when the image processing unit 21 completes the generation of the image signal D[m].

In the case of Case-2, after the image processing unit 21 completes the generation of the image signals D[m] at the image signal generation time TC[m], the image processing unit 21 outputs the writing-completion signal PtA, and since the timing when the output control unit 31 which receives the writing-completion signals PtA determines that "m≤ma" is satisfied is the image processing determination time TA[m], there is a time lag between the image processing determination time TA[m] and the image signal generation time TC[m], but both the times are regarded as being substantially the same for simplicity's sake in the following description.

As mentioned above, since there may be Case-1 and Case-2, if both the cases are summarized, the output control unit 31 sets the output permission pulse PL[m] to the output control signal CTR at the later time (that is, this time is the image processing determination time TA[m]) of the image signal generation time TC[m] and the display preparation determination time TB[m]. That is, the output permission pulse PL[m] is output when the first condition and the second condition are satisfied for the image signal D[m]. When the third condition is satisfied after the output permission pulse PL[m] is output, in other words, when the enable signal DEnb initially becomes active after the output permission pulse PL[m] is output, the timing generator 32 controls the image signal output unit 23 to output the image signal D[m].

For the sake of convenience in the description, hereinafter, the time when all the first condition to the third condition are satisfied for the image signal D[m] is referred to as an output condition satisfaction time TJ[m].

In the present embodiment, the timing generator 32 determines a level of an internal processing signal IS for use in internal processing of the timing generator 32 based on the output control signal CTR. The timing generator 32 determines the timing when the enable signal DEnb becomes active and the type (active horizontal scanning period Hd-A or inactive horizontal scanning period Hd-D) of the horizontal scanning period Hd based on the internal processing signal IS.

Specifically, if the output permission pulse PL[m] is set to the output control signal CTR as shown in FIG. 20, the timing generator 32 sets the internal processing signal IS to be active (high level in the example of this drawing).

In a case where the internal processing signal IS is active at the timing when the horizontal scanning period Hd is started, the timing generator 32 determines (classifies) the type of the horizontal scanning period Hd as the active horizontal scanning period Hd-A[m], and sets the enable signal DEnb to be active at the timing when the horizontal active data period DHI of the active horizontal scanning period Hd-A[m]. The timing when the enable signal DEnb becomes active corresponds to the output condition satisfaction time TJ[m].

The timing generator 32 sets the internal processing signal IS to be inactive at the timing when the horizontal active data period DHI of the active horizontal scanning period Hd-A[m] is started and the enable signal DEnb becomes active, that is, the output condition satisfaction time TJ[m].

Meanwhile, in a case where the internal processing signal IS becomes inactive at the timing when the horizontal scanning period Hd is started, the timing generator 32 determines (classifies) the type of the horizontal scanning period Hd as the inactive horizontal scanning period Hd-D, and sets the enable signal DEnb to be inactive during the inactive horizontal scanning period Hd-D.

Here, in the example shown in FIG. 20, mb of the PtB signal is maintained at mb a M from immediately after the final line of one frame is output before the display preparation determination time TB[1]. Data output of the next frame is possible at a point of time the vertical back porch period is completed after the vertical synchronization signal is output. Thus, the mb signal is reset at the display preparation determination time TB[1], and mb=0 (Case-0). There is only Case-0 once at a special timing when one first line of one frame is started to be displayed and in one frame. As a result, the horizontal active data period DHI of the horizontal scanning period Hd[2] is started.

Hereinafter, an example of the second line and the subsequent lines will be described. Hereinafter, a case (corresponding to Case-1) where the output control unit 31 determines whether or not the preparation to output the image signal D[2] is completed and sets the output permission pulse PL[2] to the output control signal CTR will be described in the example shown in FIG. 20.

In the example shown in FIG. 20, the display preparation determination time TB[2] is a time when the horizontal active data period DHI of the horizontal scanning period Hd[1] (active horizontal scanning period Hd-A[1]) during which the output of the image signal D[1] is completed. In this example, it is assumed that the image signal generation time TC[2] when the image processing on the image signal D[2] is completed arrives before the display preparation determination time TB[2]. Thus, in this example, the image processing determination time TA[2] becomes the substantially same as the display preparation determination time TB[2]. Thus, the output control unit 31 outputs the output permission pulse PL[2] as the output control signal CTR when the horizontal active data period DHI of the horizontal scanning period Hd[1] is ended, that is, at the display preparation determination time TB[2].

The timing generator 32 sets the internal processing signal IS to be active at the timing when the output permission pulse PL[2] is output as the output control signal CTR, that is, the timing when the horizontal active data period DHI of the horizontal scanning period Hd[1] is ended. In this case, the internal processing signal IS becomes active even when the horizontal scanning period Hd[2] is started. Here, it is assumed that the timing generator 32 determines whether to set the horizontal scanning period to be the active horizontal scanning period Hd-A[m] or the inactive horizontal scanning period Hd-D at the starting timing (DHsync pulse) of the horizontal scanning period based on the internal processing signal IS. In this case, the internal processing signal IS is active. Thus, the timing generator 32 sets the horizontal scanning period Hd[2] to be the active horizontal scanning period Hd-A[2], and sets the enable signal DEnb to be active during the horizontal active data period DHI of the horizontal scanning period Hd[2].

That is, the starting time of the horizontal active data period DHI of the horizontal scanning period Hd[2] becomes the output condition satisfaction time TJ[2] when all the first condition to the third condition are satisfied for the image signal D[2]. Thus, the image signal D[2] is output during the horizontal scanning period Hd[2]. The timing generator 32 sets the internal processing signal IS to be inactive at the timing when the horizontal active data period DHI of the horizontal scanning period Hd[2] is started.

Hereinafter, a case (corresponding to Case-2) where the output control unit 31 determines whether or not the preparation to output the image signal D[3] is completed and sets the output permission pulse PL[3] to the output control signal CTR will be described in the example shown in FIG. 20.

In the example shown in FIG. 20, the display preparation determination time TB[3] is the time when the horizontal active data period DHI of the horizontal scanning period Hd[2] (active horizontal scanning period Hd-A[2]) during which the output of the image signal D[2] is completed. In this example, it is assumed that the image signal generation time TC[3] when the image processing on the image signal D[3] is completed is later than the display preparation determination time TB[3]. Thus, the image processing determination time TA[3] becomes the time later than the display preparation determination time TB[3]. In this example, it is assumed that the image signal generation time TC[3] is later than the starting time of the horizontal scanning period Hd[3]. Thus, the output control unit 31 outputs the output permission pulse PL[3] at the time later than the starting time of the horizontal scanning period Hd[3].

As mentioned above, the timing generator 32 sets the internal processing signal IS to be inactive at the starting time of the horizontal active data period DHI of the horizontal scanning period Hd[2]. Thus, the internal processing signal IS becomes inactive at the starting time of the horizontal scanning period Hd[3]. Since the state of the internal processing signal IS is inactive at the starting timing (DHsync pulse) of the horizontal scanning period, the timing generator 32 classifies the horizontal scanning period Hd[3] as the inactive horizontal scanning period Hd-D, and sets the enable signal DEnb to be inactive during the horizontal active data period DHI of the horizontal scanning period Hd[3]. In this case, the image signal output unit 23 outputs the inactive signal Dmy without output the image signal D[3] during the horizontal active data period DHI of the horizontal scanning period Hd[3].

Thereafter, the timing generator 32 sets the internal processing signal IS to be active at the timing when the output permission pulse PL[3] is output as the output control signal CTR. In this example, the timing when the output permission pulse PL[3] is output is before the horizontal scanning period Hd[4]. In this case, the internal processing signal IS becomes active at the starting time (DHsync pulse) of the horizontal scanning period Hd[4]. Thus, the timing generator 32 sets the horizontal scanning period Hd[4] to be the active horizontal scanning period Hd-A[3], and sets the enable signal DEnb to be active during the horizontal active data period DHI of the horizontal scanning period Hd[4].

That is, the starting time of the horizontal active data period DHI of the horizontal scanning period Hd[4] becomes the output condition satisfaction time TJ[3] when all the first condition to the third condition are satisfied for the image signal D[3]. Thus, the image signal D[3] is output during the horizontal scanning period Hd[4].

In the example shown in this drawing, it is assumed that a case where the output control unit 31 determines whether or not the preparation to output the image signal D[1] is completed and sets the output permission pulse PL[1] to the output control signal CTR, and a case (Case-0) where the output control unit determines whether or not the preparation to output the image signal D[1] is completed and sets the output permission pulse PL[1] to the output control signal CTR is the case of the condition as Case-1.

As stated above, in the present embodiment, when the first condition and the second condition are satisfied, the output control unit 31 outputs the output permission pulse PL[m], sets the state of the internal processing signal IS to be active, and determines whether to set the horizontal scanning period to be the active horizontal scanning period Hd-A[m] or the inactive horizontal scanning period Hd-D[m] at the starting time (DHsync pulse) of the horizontal scanning period. In a case where it is determined that the horizontal scanning period is set to be the active horizontal scanning period, the image signal output unit 23 performs an operation of outputting the image signal D[m] during the first horizontal scanning period Hd after the output permission pulse PL[m] is output. Due to such an operation, the output timing of the image signal D[m] from the image signal output unit 23 as result of the image processing on every line D[m] by the image processing unit 21 is adjusted for every horizontal scanning period Hd with precision.

It has been described in the example shown in FIG. 20 that the timing generator 32 determines the type of the horizontal scanning period Hd at the timing when the horizontal scanning period Hd is started, and such an example is merely an example. For example, the type of the horizontal scanning period may be determined during a period from the starting of the horizontal front porch period DHf of the horizontal scanning period Hd during which the output permission pulse PL[m] is output to the ending of the horizontal back porch period DHb of the first horizontal scanning period Hd after the output permission pulse PL[m] is output.

It has been described in the example shown in FIG. 20 that the timing when the internal processing signal IS becomes inactive is the timing when the enable signal DEnb becomes active, and such an example is merely an example. The timing when the timing generator 32 sets the internal processing signal IS to be inactive may be any horizontal active data period DHI from when the enable signal DEnb becomes active to when the enable signal becomes inactive.

It has been described in the present embodiment that the timing generator 32 determines the waveform of the enable signal DEnb and the type of the horizontal scanning period Hd by using the internal processing signal IS, and such an example is merely an example. The timing generator may determine the waveform thereof and the type thereof based on the output control signal CTR without using the internal processing signal IS.

It has been described in the present embodiment that the output control signal CTR has the waveform including the output permission pulse PL[m], and such an example is merely an example. For example, the output control signal CTR may have the waveform of the internal processing signal IS shown in FIG. 20. In this case, the timing generator 32 may supply various signals such as the enable signal DEnb necessary for the output control unit 31 to determine the waveform of the output control signal CTR to the output control unit 31.

Figure 21A:
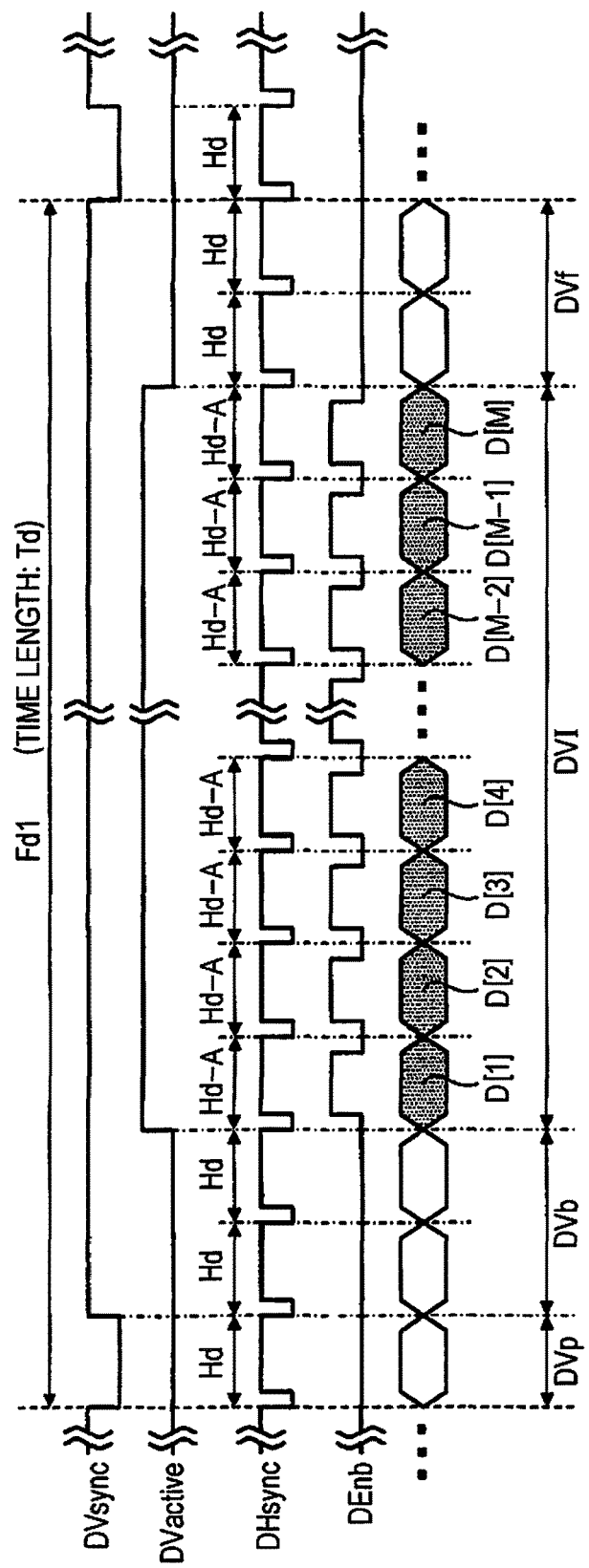
FIG. 21A is a timing chart for describing the operation of the vehicle imaging display system 1.
Figure 21B:
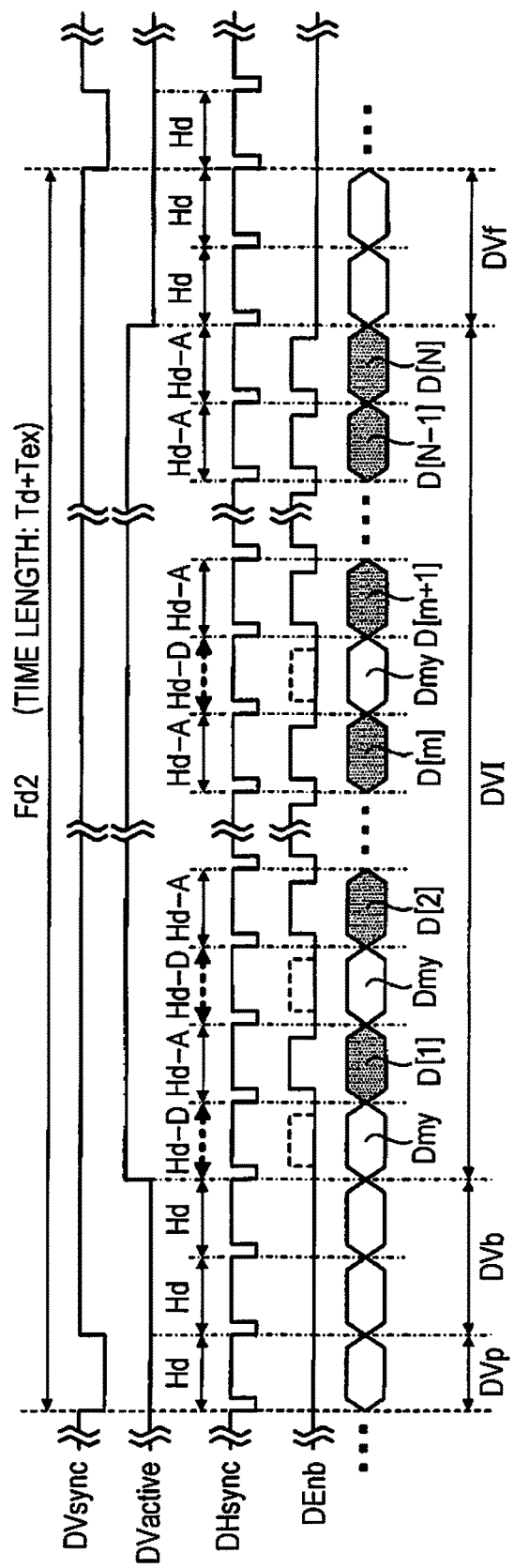
FIG. 21B is a timing chart for describing the operation of the vehicle imaging display system 1.

FIGS. 21A and 21B are explanatory diagrams for describing the relationship between the active horizontal scanning period Hd-A and the inactive horizontal scanning period Hd-D and between the active horizontal scanning period and the display vertical scanning period Fd.

The display vertical scanning period Fd is a period during which the image signals D[1] to D[M] corresponding to the (M-th)-row line are output. Thus, the timing generator 32 sets M active horizontal scanning periods Hd-A to the vertical active data period DVI of each display vertical scanning period Fd.

Meanwhile, the timing generator 32 according to the present embodiment classifies the horizontal scanning period Hd as any one of the active horizontal scanning period Hd-A and the inactive horizontal scanning period Hd-D. Only when the horizontal scanning period Hd is the active horizontal scanning period Hd-A, the image signal D[m] is output during the horizontal scanning period Hd.

Thus, in a case where the inactive horizontal scanning period Hd-D is set to the vertical active data period DVI of the display vertical scanning period Fd, the timing generator 32 according to the present embodiment extends as many of the vertical active data period DVI as the time length equivalent to the inactive horizontal scanning period Hd-D, and outputs the display vertical synchronization signal DVsync and the vertical active data signal DVactive such that M active horizontal scanning periods Hd-A are set to the vertical active data period DVI of each display vertical scanning period Fd.

For example, in a case where all the horizontal scanning period Hd of the vertical active data period DVI are set to be the active horizontal scanning period Hd-A like the display vertical scanning period Fd1 shown in FIG. 21A, the timing generator 32 sets the time length of the vertical active data period DVI to be a time length M times greater than the horizontal scanning period Hd. Here, the period of the display vertical scanning period Fd1 except for the vertical synchronization front porch period (DVf), the vertical synchronization period (DVp) and the vertical synchronization back porch period (DVb), that is, DVI is referred to as the vertical active data period DVI, and is set to a period of DVactive=H.

Meanwhile, in a case where one or the plurality of inactive horizontal scanning periods Hd-D are set to the vertical active data period DVI like the display vertical scanning period Fd2 shown in FIG. 21B, the timing generator 32 sets the time length (period of DVactive=H) of the vertical active data period DVI to be a time length acquired by adding a time length M times greater than the horizontal scanning period Hd and a total time length of one or the plurality of inactive horizontal scanning periods Hd-D existing in the vertical active data period DVI.

That is, the timing generator 32 can cause the image signal output unit 23 to output the image signals D[1] to D[M] during each display vertical scanning period Fd by adjusting the time length of the display vertical scanning period Fd for every horizontal scanning period Hd.

The time length of the display vertical scanning period Fd in a case where all the horizontal scanning period Hd of the vertical active data period DVI are the active horizontal scanning period Hd-A like the display vertical scanning period Fd1 shown in FIG. 21A is referred to as a standard vertical scanning time Td. The highest frame rate at which the display unit 40 can display, that is, "1/Td" which is a frame rate in a case where the time length of the display vertical scanning period Fd is the standard vertical scanning time Td may be referred to as a "second frame rate". Among the timing control processes performed by the timing control unit 30, timing control performed such that the image signal D is output at the second frame rate may be referred to as "first timing control".

The total value of the time lengths of one or the plurality of inactive horizontal scanning periods Hd-D in a case where one or the plurality of inactive horizontal scanning periods Hd-D is provided in the vertical active data period DVI like the display vertical scanning period Fd2 shown in FIG. 21B is referred to as an extended vertical scanning time Tex. That is, the time length of the display vertical scanning period Fd in a case where one or the plurality of inactive horizontal scanning period Hd-D is provided in the vertical active data period DVI is a total time of the standard vertical scanning time Td and the extended vertical scanning time Tex. Among the timing control processes performed by the timing control unit 30, timing control performed such that the image signal D is output during the vertical active data period DVI in which one or the plurality of inactive horizontal scanning periods Hd-D is provided may be referred to as "second timing control". Although the details are described below, the timing control unit 30 controls the timing such that the image signal D is output at the first frame rate in the second timing control.

In a case where it is detected that the count value Cnt is equal to the number of lines "M" of the display area AD set to the register 415, the controller 41 prepares a frame renewal process on the data input unit 411 and the data output unit 414 at the timing when the display horizontal synchronization signal DHsync is initially supplied after the detection, that is, the timing when the vertical front porch period DVf is started. After the vertical front porch period DVf is started, the timing generation unit 413 outputs a frame renewal process starting signal Cng for instructing that the frame process is performed to the data input unit 411 and the data output unit 414.

Here, the frame renewal process is a process for preparing to display the image during the next display vertical scanning period Fd, and includes, for example, a process of deleting data stored in the buffers included in the data input unit 411 and the data output unit 414. The frame renewal process is started after the vertical front porch period DVf is started. The frame renewal process is preferably ended before the vertical front porch period DVf is ended.

3. Output of Image Signal

Hereinafter, the relationship between the output timing of the imaging signal DS[p] from the imaging unit 10 and the output timing of the image signal D[m] from the image signal generation unit 20 will be described below.

Figure 22:
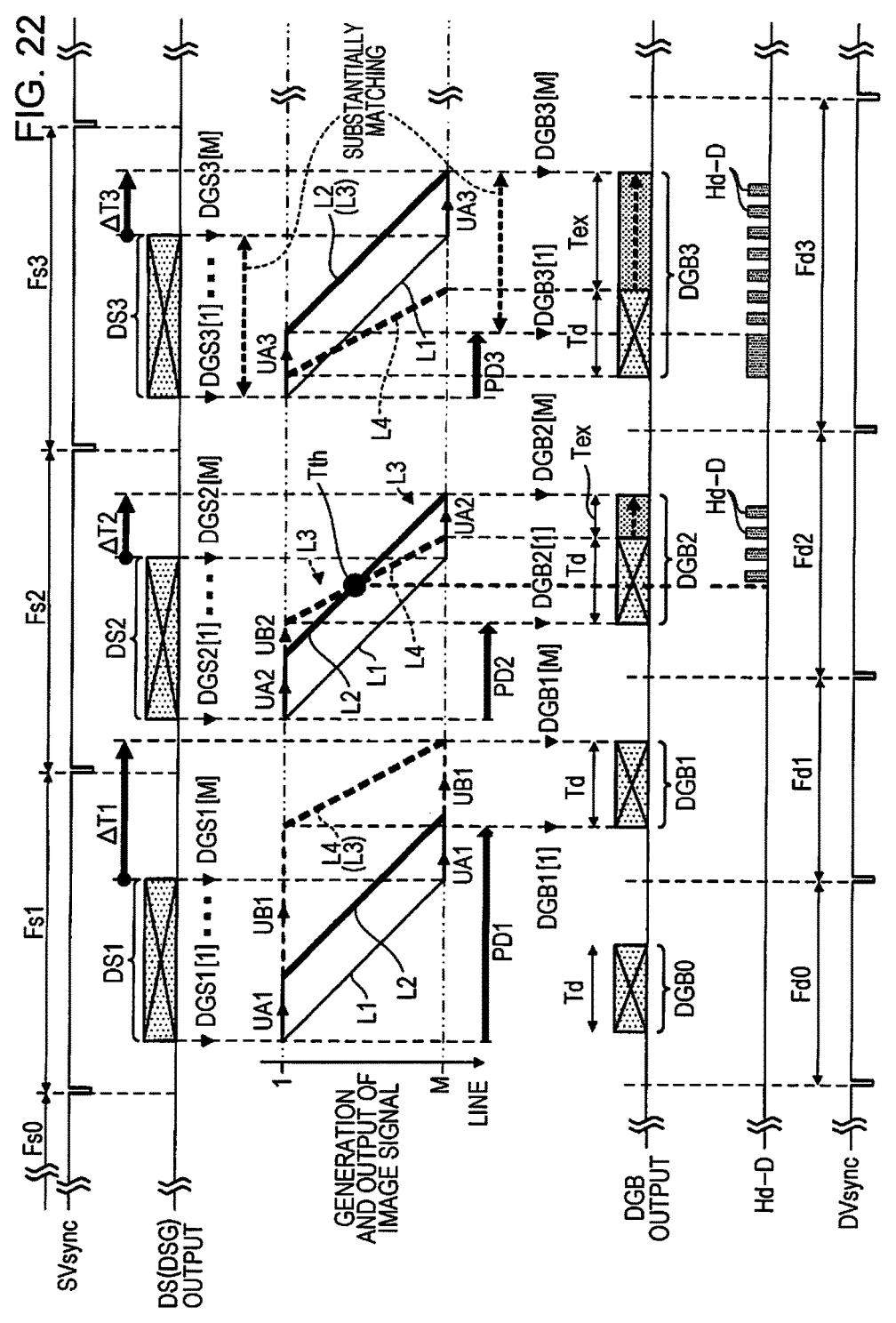

FIG. 22 is a schematic timing chart showing the relationship between the timing when the imaging unit 10 outputs the imaging signals DS (DS[1] to DS[P]) during the imaging vertical scanning periods Fs1 to Fs3 of the plurality of continuous imaging vertical scanning periods Fs (Fs0 to Fs3), the timing when the image processing unit 21 generates the image signals D (D[1] to D[M]), that is, the image signals DGA (DGA[1] to DGA[M]) and stores the generated image signals DGA in the line buffer 22 based on the imaging signals DS, and the timing when the image signal output unit 23 acquires the image signals D, that is, the image signals DGB (DGB[1] to DGB[M]) from the line buffer 22 and outputs the acquired signals to the display unit 40 during the display vertical scanning periods Fd1 to Fd3 of the plurality of continuous display vertical scanning periods Fd (Fd0 to Fd3). The periods during which the imaging signals DS are output, among the imaging vertical scanning periods Fs, are referred to as "frames of the imaging signals DS". The vertical active data periods DVI which are the periods during which the image signals D may be output, among the display vertical scanning periods Fd, are referred to as "frames of the image signals D". As shown in FIG. 22, a time from the starting of the frame of the imaging signal DS to the starting of the image signal D is referred to as a phase difference PD.

In FIG. 22, for the sake of convenience in the description, the imaging signals DS[P] output during the imaging vertical scanning periods Fs0 to Fs3 may be distinguishably described as imaging signals DS0[p] to DS3[p].

As described in FIG. 10, the imaging signals DS[1] to DS[p] output from the imaging unit 10 are the imaging signals DGS[1] to DGS[M] from the viewpoint of the generation of the image signals D[1] to D[M] in the image processing unit 21. Hereinafter, for the sake of convenience in the description, the imaging signals DGS[m] output during the imaging vertical scanning periods Fs0 to Fs3 may be distinguishably described as imaging signals DGS0[*m*] to DGS3[*m*].

Similarly, the image signals D[m] (DGA[m] or DGA[m]) generated based on the imaging signals DGS0[*m*] to DGS3[*m*] may be distinguishably described as image signals D0[*m*] to D3[*m*] (DGA0[*m*] to DGA3[*m*], or DGB0[*m*] to DGB3[*m*]).

As stated above, the imaging unit 10 sequentially output the imaging signals DS[1] to DS[P] during each imaging horizontal synchronization signal SHsync for every line. If the supply of the imaging signal DS[p] corresponding to the imaging signal DGS[m] is started, the image processing unit 21 starts the image processing for generating the image signal DGA[m]. That is, the timing in the vertical synchronization period when the image processing unit 21 starts the image processing for generating the image signal DGA[m] is different depending on the processing line of the generated DGA[m].

In FIG. 22, the input timings when the imaging unit 10 supplies the imaging signals DGS[1] to DGS[M] to the image processing unit 21 for every one line are depicted by line L1. That is, the line L1 represents an aspect (timing) in the time direction in which the image processing unit 21 sequentially starts the image processing for generating the image signals DGA[[1] to DGA[M] for every line.

Line L2 represents an aspect (timing) in the time direction in which the generation of the image signals DGA[1] to DGA[M] by the image processing unit 21 is completed and the generated image signals are sequentially stored in the line buffer 22 for every line. The image signal output unit 23 outputs the image signals DGB[m] after the generation of the image signals DGA[m] is completed. Thus, the image signals DGB[m] are not output at the time earlier than the time depicted by the line L2. The line L2 is a line that connects the image signal generation times TC[1] to TC[M] described in FIG. 20.

The timings when the image signal output unit 23 sequentially reads the image signals DGB[1] to DGB[M] for every line and outputs the read signals in a case where the image signal output unit 23 supplies the image signals DGB[1] to DGB[M] to the display unit 40 at an ideal timing, that is, in a case where the image signal output unit supplies the image signals DGB[1] to DGB[M] so as to be displayed at the highest frame rate (frame rate in a case where the time length of the display vertical scanning period Fd is the standard vertical scanning time Td) at which the display unit 40 can display are depicted by line L3. That is, the line L3 is a line indicating the timing when the display unit 40 sequentially reads the images indicated by the image signals DGB[1] to DGB[M] and displays the read images for every horizontal scanning period Hd in a case where it is assumed that the image signal output unit 23 outputs as many image signals DGB[m] as one line during every horizontal scanning period Hd during which the display unit 40 can display as many of an image as one line (that is, in a case where the frame rate of the display unit 40 is the second frame rate), and has a slope such that one line is increased for every horizontal scanning period Hd. That is, the line L3 indicates the time in a case where it is assumed that all the horizontal scanning periods included in the vertical active data period DVI are the active horizontal scanning periods Hd-A, and is not necessarily equal to the display preparation determination time TB[m] indicating the output time of the image signal D[m] based on the assumption that the output of the image signals D[m−1] in the (m−1)-th row is completed (the second condition) in a case where it is assumed that the inactive horizontal scanning periods Hd-D are included in the vertical active data period DVI.

The image signal output unit 23 outputs the image signals DGB[m] when the display unit 40 can display. Thus, the image signals DGB[m] are not read and output at the time earlier than the time depicted by the line L3.

In FIG. 22, a time required to perform the image processing for generating the image signal DGA[m] for every line is referred to as an image processing time UA. Hereinafter, for the sake of convenience in the description, the image processing times UA which respectively correspond to the image signals DGA0[*m*] to DGA3[*m*] may be distinguishably described as image processing times UA0 to UA3.

In FIG. 22, times from the storing of the image signals DGA[m] in the line buffer 22 to the outputting of the image signals to the display unit 40 by the image signal output unit 23 are referred to as waiting times UB. Hereinafter, for the sake of convenience in the description, the waiting times UB which respectively correspond to the image signals DGB1[*m*] to DGB3[*m*] may be distinguishably described as waiting times UB1 to UB3.

As stated above, the imaging signals DS[1] to DS[P] and the imaging signals DGS[1] to DGS[M] are not in a one-to-one correspondence with each other, and a starting interval of the image processing for generating the image signals D[m] corresponding to the respective lines may be changed. Thus, the line L1 is not typically the straight line and is a broken line, but is drawn as the straight line for the sake of convenience in the illustration in FIG. 22. In a case where the line L1 is the straight line (for example, a case where a starting point and an ending point of the line L1 is connected by the straight line), the slope of the line L1 is determined depending on the first frame rate which is the frame rate of the imaging unit 10.

As mentioned above, the number of lines of the imaging signals DS[p] included in the respective imaging signals DGS[1] to DGS[M] may be different depending on the line. That is, as described in FIG. 10, there may be a case where the image processing unit 21 generates the image signals DGS[m] based on the imaging signals DGS[m] including as many imaging signals as three lines or a case where the image processing unit generates the image signals DGA[m]

based on the imaging signals DGS[m] including as many imaging signals DS[p] as five lines. In the latter case, the image processing time UA becomes longer than that in the former. That is, the image processing time UA when the image processing unit 21 generates the image signals DGA[1] to DGA[M] is typically changed depending on the position of the line. Thus, the line L2 is not typically the straight line and is a broken line, but is drawn as the straight line for the sake of convenience in the illustration in FIG. 22.

As shown in FIG. 22, the line L2 indicating the time when the image processing unit 21 generates the image signal D1[m] (DGA1[m]) based on the imaging signal DS1[p] (DGS1[m]) output from the imaging unit 10 during the imaging vertical scanning period Fs1 temporarily precedes line L4 (a virtual timing different from the definition of the line L3 is described as line L4) indicating the earliest time when the display unit 40 can display the image indicated by the image signal D1[m] (DGA1[m]) during the display vertical scanning period Fd1. A state in which the line L2 temporally precedes the line L3 (line L4) is referred to as a "first state".

That is, the first state is a state in which the display unit 40 is not prepared to display the image indicated by the image signals D[m] when the image processing unit 21 generates the image signals D[m] based on the imaging signals DS[p]. Here, for example, the case where the display unit 40 is not prepared to display the image signals D[m] is a case where the display unit 40 is displaying the image indicated by the image signals D0 to be displayed before the image signal D1 and the display unit 40 does not display the image indicated by the image signal D1[m] when the image signal D1[m] is generated.

That is, the first state is a state in which even though the image processing unit 21 generates the image signal D[m], since the preparation of the display unit 40 for displaying the image signal D[m] is not in time, the display of the image on the display unit 40 is delayed due to a bottleneck phenomenon occurring in the display preparation of the display unit 40. In other words, the first state is a state in which the image signal D[m] can be promptly displayed without being delayed at the timing when the display unit 40 can display the image signal D[m].

Incidentally, since a time (cycle) necessary for the display unit 40 to display one screen is less than a time (cycle) necessary for the imaging unit 10 to image one screen, a display delay due to the bottleneck phenomenon occurring in the display preparation of the display unit 40 is slowly reduced and resolved.

In FIG. 22, for the sake of convenience in the illustration, only one pair of vertical scanning periods including one imaging vertical scanning period Fs (Fs1) and one display vertical scanning period Fd (Fd1) is described as the first state, but there may be a plurality of pairs of vertical scanning periods. In this case, in the first state, a phase difference PD1 (is a phase difference PD in the first state, and is assigned reference sign PD1 as shown in FIG. 22) is shortened by a time equivalent to a difference between the display vertical scanning period Fd and the imaging vertical scanning period Fs. In other words, a distance between the line L3 and the line L2 for each pair of vertical scanning periods is roughly shortened by the time equivalent to the difference between the display vertical scanning period Fd and the imaging vertical scanning period Fs.

Before the display delay due to the bottleneck phenomenon occurring in the display preparation of the display unit 40 is resolved, the line L2 temporally precedes the line L3 (line L4). Meanwhile, in a case where the display delay due to the bottleneck phenomenon occurring in the display preparation is resolved, the display delay is not actually resolved, but it is assumed that the line L4 indicating the earliest time when the display unit 40 can display the image may be a timing that temporally precedes the line L2 as a virtual state. That is, in the virtual state, it can be seen that the timing when the display delay due to the bottleneck phenomenon occurring in the display preparation is resolved may be a timing when the line L2 and the line L4 cross each other in the fastest state in the virtual state.

As stated above, the line L2 may not be a straight line, and may be a broken line. In this case, it can be seen that the line L2 and the virtual line L4 may cross multiple times.

In the example shown in FIG. 22, the line L2 indicating the time when the image processing unit 21 generates the image signal D2[m] (DGA2[m]) based on the imaging signal DS2[p] (DGS2[m]) output from the imaging unit 10 during the imaging vertical scanning period Fs2 crosses the line L4 indicating the earliest time when the display unit 40 can display the image indicated by the image signal D2[m] (DGA2[m]) during the display vertical scanning period Fd2. Such a state in which the line L2 and the line L4 cross is referred to as a "second state". In a case where the line L2 and the line L4 cross multiple times, a state in which these lines initially cross is referred to as the "second state". The time when the line L2 and the line L4 cross is referred to as a time Tth. In a case where the line L2 and the line L4 cross multiple times, it is assumed that the time when these lines initially cross is the time Tth.

That is, the second state refers to transition from a state (state in which the line L2 temporally precedes the line L3 in general) in which the display unit 40 is not prepared to display the image indicated by the image signal D[m] when the image processing unit 21 generates the image signal D[m] based on the imaging signal DS[p] to a state (state in which the line L4 temporally precedes the line L2) in which the image processing unit 21 may not complete the image processing for generating the image signal D[m] when the display unit 40 can display the image indicated by the image signal D[m].

That is, the second state is a state in which the image indicated by the image signal D[m] is displayed without being delayed at the timing when the display unit 40 can display the image indicated by the image signal D[m] before the time Tth, and is a state in which even though the time when the display unit 40 can display the image signal D[m] arrives, since the image processing in the image processing unit 21 for generating the image signal D[m] is not in time, the image processing of the image processing unit 21 is in the bottleneck state, and thus, the display of the image of the display unit 40 may be delayed after the time Tth. In the second state, a phase difference PD2 (is a phase difference PD in the second state, and is assigned reference sign PD2 as shown in FIG. 22) is less than the phase difference PD1 as shown in FIG. 22.

After the time Tth, the timing generator 32 inserts the inactive horizontal scanning period Hd-D into the vertical active data period DVI once, and adjusts the output timing (display timing of the image indicated by the image signal D[m] on the display unit 40) of the image signal D[m] from the image signal output unit 23. Even though the inactive horizontal scanning period Hd-D is inserted once, the image processing of the image processing unit 21 for generating the image signal D[m] is not in time, the insertion of the next inactive horizontal scanning period Hd-D is repeated. The display unit 40 waits for the completion of the image processing for generating the image signal D[m], and displays the image indicated by the image signal D[m] within a time equal to or less than the horizontal scanning period Hd in a case where the image signal D[m] is generated. That is, after the time Tth, the output timing of the image signal D[m] (DGB[m]) from the image signal output unit 23 is adjusted due to the insertion of the inactive horizontal scanning period Hd-D, and thus, the display timing of the display unit 40 follows a completion timing of the image processing of the image processing unit 21 with the precision of the horizontal scanning period Hd.

As shown in FIG. 22, the line L4 indicating the earliest time when the display unit 40 can display the image indicated by the image signal D3[m] (DGA3[m]) during the display vertical scanning period Fd3 temporally precedes the line L2 indicating the time when the image processing unit 21 generates the image signal D3[m] (DGA3[m]) based on the imaging signal DS3[p] (DGS3[m]) output during the imaging vertical scanning period Fs3. Such a state in which the line L4 temporally precedes the line L2 is referred to as a "third state". In other words, the state in the imaging vertical scanning period Fs and the display vertical scanning period Fd started after the time Tth is the third state.

That is, the third state is a state in which the image processing unit 21 may not constantly complete the image processing for generating the image signal D[m] when the display unit 40 completes the preparation to display the image indicated by the image signal D[m].

That is, the third state is a state in which even though the preparation of the display unit 40 for displaying the image signal D[m] is completed, since the image processing of the image processing unit 21 for generating the image signal D[m] is not constantly in time, the image processing of the image processing unit 21 is in the bottleneck state, and thus, the display of the image of the display unit 40 is delayed.

In the third state, a phase difference PD3 (is a phase difference PD in the third state, and is assigned reference sign PD3 as shown in FIG. 22) is less than the phase difference PD2 as shown in FIG. 22. The phase difference PD1 in the first state is greater than the image processing time UA (more specifically, the maximum value of the image processing times UA[1] to UA[M]), and the phase difference PD3 in the third state is equal to or less than the maximum value of the image processing times UA[1] to UA[M].

As mentioned above, the image processing time UA is changed for every line. However, a changing range is sufficiently smaller than the imaging vertical scanning period Fs. Thus, in a state in which the output timing (display timing of the display unit 40) of the image signal D[m] follows the completion timing of the image processing of the image processing unit 21, a time length of the period during which the imaging unit 10 outputs the imaging signal DS3 is substantially the same as a time length of the period during which the image signal output unit 23 outputs the image signal DGB3. In other words, in the third state, the timing control unit 30 adjusts the timing when the image signal D[m] is output such that the frame rate of the display unit 40 becomes the first frame rate which is the frame rate of the imaging unit 10 (second timing control).

In FIG. 22, for the sake of convenience in the illustration, only one pair of vertical scanning periods including one imaging vertical scanning period Fs (Fs3) and one display vertical scanning period Fd (Fd3) is described as the third state, but there is actually a plurality of pairs of vertical scanning periods. In third state, the timing when the image signal D[m] is output is adjusted in each of the plurality of pairs of vertical scanning periods such that the time length of the period during which the imaging unit 10 outputs the imaging signal DS3 and the time length of the period during which the image signal output unit 23 outputs the image signal DGB3 are substantially the same. That is, in the third state, the timing when the image signal D[m] is output is adjusted in each of the plurality of pairs of vertical scanning periods such that the frame rate of the display unit 40 becomes the first frame rate which is the frame rate of the imaging unit 10. Thus, in the third state, the phase differences PD3 have the substantially same time length in the plurality of pairs of vertical scanning periods.

Hereinafter, the first state will be described using the relationship between the imaging signal DS1 (DGS1) output from the imaging unit 10 during the imaging vertical scanning period Fs1 and the image signal D1 (DGB1) output from the image signal generation unit 20 to the display unit 40 during the display vertical scanning period Fd1 an example by referring to FIGS. 22 and 23.

Figure 23:
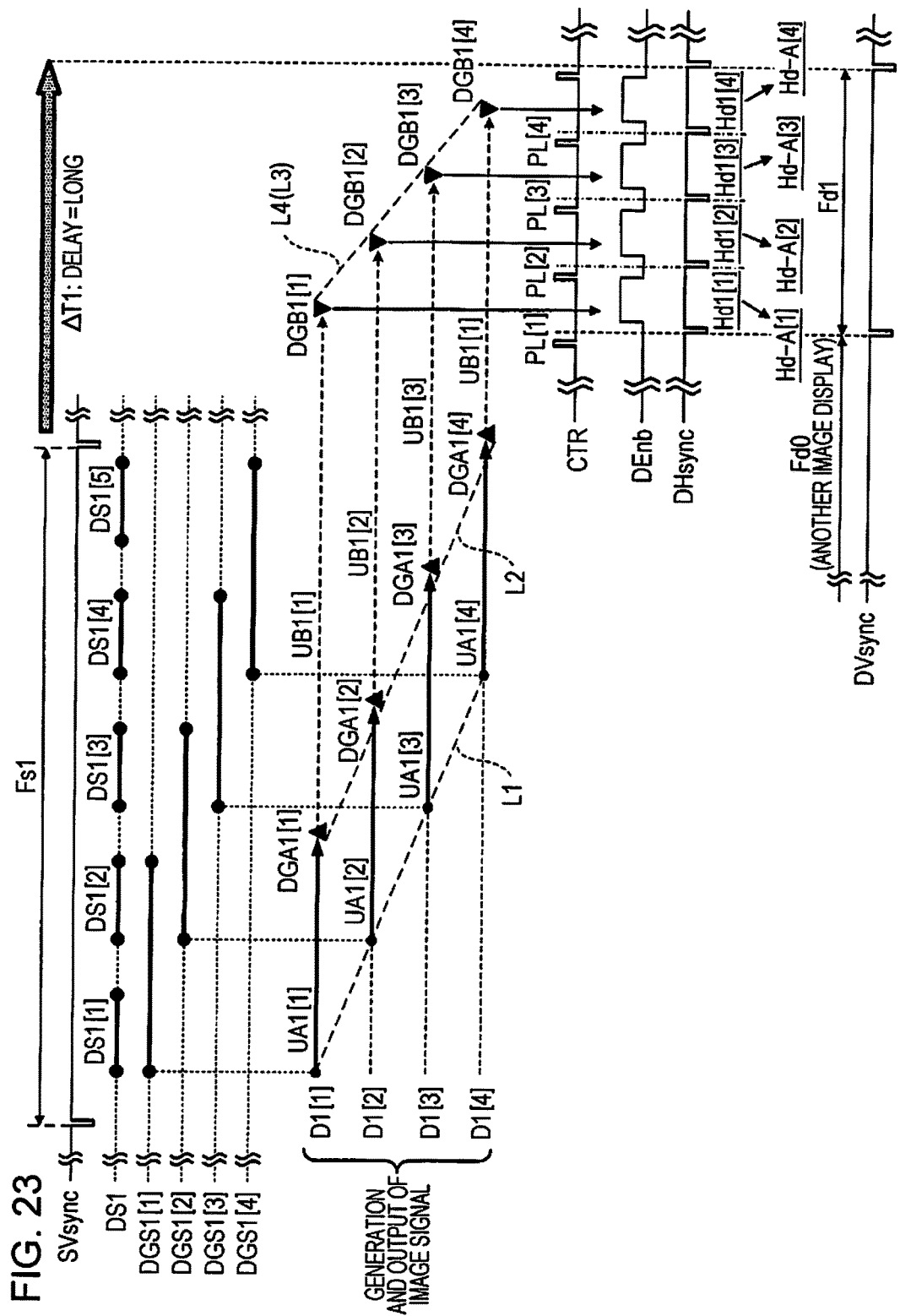
FIG. 23 is a timing chart for describing the operation of the vehicle imaging display system 1.

FIG. 23 is a timing chart for describing the relationship between the imaging signal DS1[p] (imaging signal DGS1[m]) and the image signal D1[m] (the image signal DGA1[m] and the image signal DGB1[m]).

Figure 24:
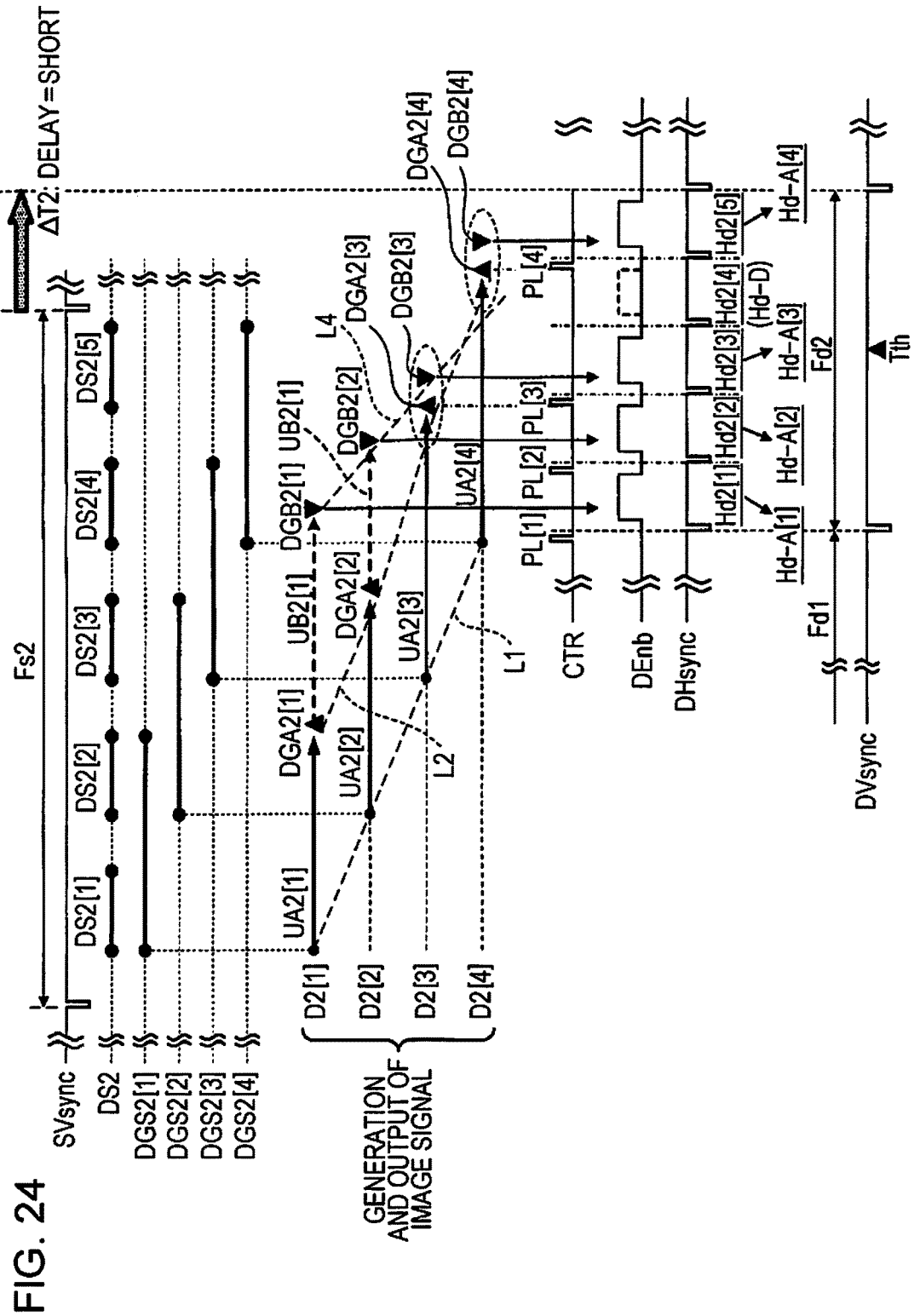
FIG. 24 is a timing chart for describing the operation of the vehicle imaging display system 1.
Figure 25:
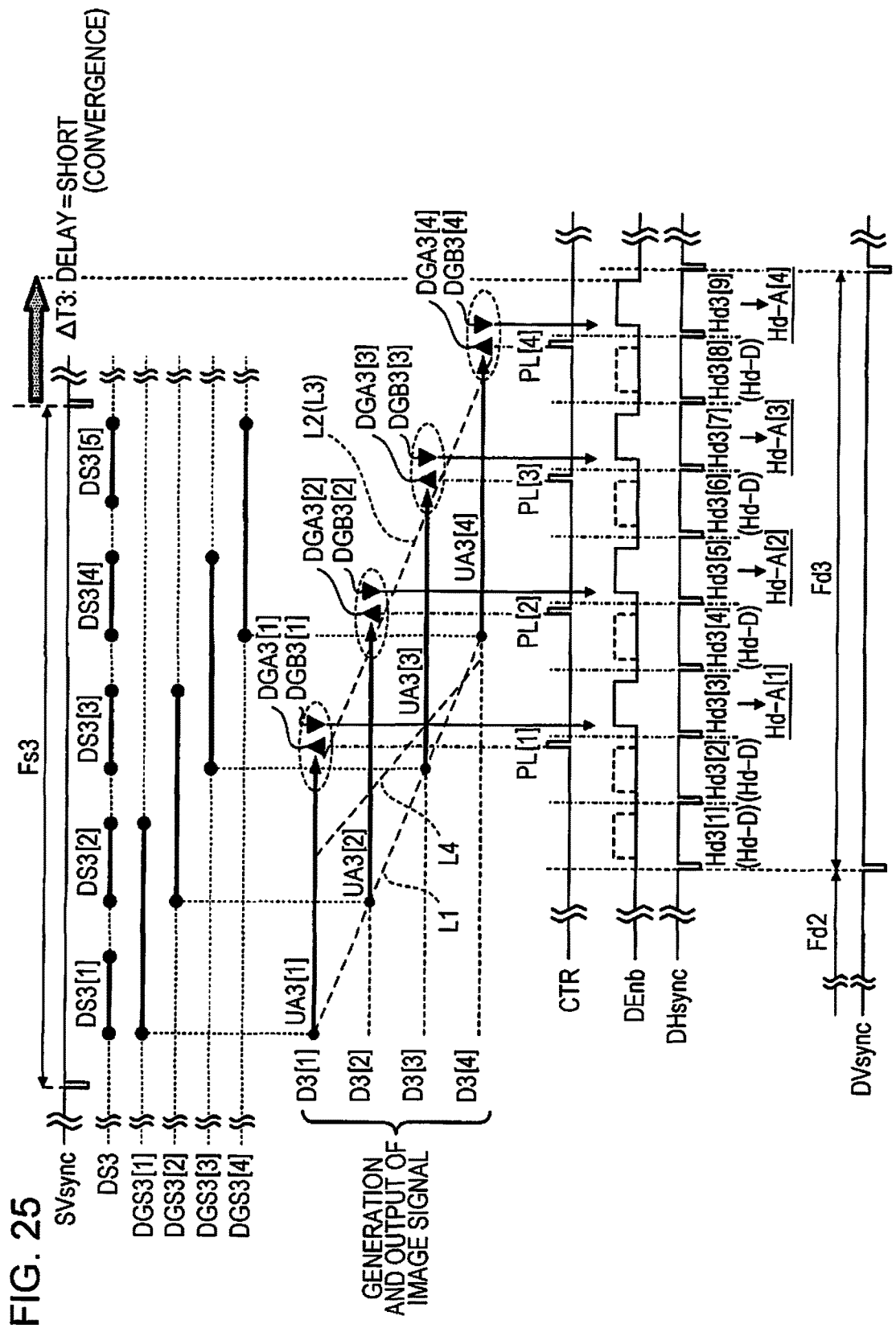
FIG. 25 is a timing chart for describing the operation of the vehicle imaging display system 1.

In FIG. 23 and FIGS. 24 and 25 to be described below, for the sake of convenience in the description, it is assumed that the number of lines of the image indicated by the imaging signal DS is five lines (P=5) and the number of lines of the image indicated by the image signal D is four lines (M=4). In the example shown in FIGS. 23 to 25, it is assumed that the imaging signal DGS[1] includes the imaging signals DS[1] and DS[2], the imaging signal DGS[2] includes the imaging signals DS[2] and DS[3], the imaging signal DGS[3] includes the imaging signals DS[3] and DS[4], and the imaging signal DGS[4] includes the imaging signals DS[4] and DS[5]. That is, in the example shown in FIGS. 23 to 25, it is assumed that the image signal D[1] is generated based on the imaging signals DS[1] and DS[2], the image signal D[2] is generated based on the imaging signals DS[2] and DS[3], the image signal D[3] is generated based on the imaging signals DS[3] and DS[4], and the image signal D[4] is generated based on the imaging signals DS[4] and DS[5]. In the example shown in FIGS. 23 to 25, it is assumed that the line L2 and the line L3 cross once.

As shown in FIG. 23, if the imaging signals DS1[m] and DS1[m+1] are output from the imaging unit 10 (the output of the imaging signals DGS1[m] is started for convenience's sake), the image processing unit 21 starts to generate the image signal DGA1[m] based on the imaging signal DGS1[m]. The image processing unit 21 completes the generation of the image signal DGA1 after the image processing time UA1[m] elapses from the starting of the image processing, and stores the generated signals in the line buffer 22.

Meanwhile, the example shown in FIG. 23 is a case where the first state is described as the example, and the line L2 temporally precedes the line L3. That is, in the example shown in FIG. 23, the display unit 40 is not prepared to display the image indicated by the image signal DGB1[m] at the timing when the generation of the image signal DGA1 [m] by the image processing unit 21 is completed. In other words, the output permission pulse PL[m] is not output from the output control unit 31 at the timing when the generation of the image signal DGA1[m] by the image processing unit 21 is completed.

Thus, the image signal output unit 23 waits for the output of the image signal DGB1[m] by the waiting time UB1[m] until the first horizontal scanning period Hd1[m] after the output permission pulse PL[m] is output, and then outputs the image signal DGB1[m] during the horizontal scanning period Hd1[m].

The first state shown in FIG. 23 is a case where the display preparation of the display unit 40 is not in time before the image processing of the image processing unit 21 is completed. In other words, the generation of the image signal DGA1[m] by the image processing unit 21 is completed before the horizontal scanning period Hd1[m] is started, and the image signal DGB1[m] can be output from the image signal output unit 23. Thus, in the first state shown in FIG. 23, all the horizontal scanning periods Hd included in the vertical active data period DVI of the display vertical scanning period Fd1 are the active horizontal scanning periods Hd-A. That is, in the first state, the time length of the display vertical scanning period Fd is the standard vertical scanning time Td.

As stated above, in the first state shown in FIG. 23, the image processing for generating the image signal D1 is completed with sufficient time to spare, but the display preparation of the display unit 40 is in the bottleneck state, and the display of the display unit 40 is delayed.

Thus, a delay time ΔT1 to when the display unit 40 displays the image indicated by the image signal D1 from when the imaging unit 10 outputs the imaging signal DS1 is a total time of a time (image processing time UA) required to perform the image processing of the image signal generation unit 20 and a time (waiting time UB) to wait for the display preparation of the display unit 40 after the image processing is completed.

Hereinafter, the second state will be described using the relationship between the imaging signal DS2 (DGS2) output from the imaging unit 10 during the imaging vertical scanning period Fs2 and the image signal D2 (DGB2) output from the image signal generation unit 20 to the display unit 40 during the display vertical scanning period Fd2 as an example by referring to FIGS. 22 and 24.

FIG. 24 is a timing chart for describing the relationship between the imaging signal DS2[p] (imaging signal DGS2 [m]) and the image signal D2[m] (the image signal DGA2 [m] and the image signal DGB2[m]).

As shown in FIG. 24, if the imaging signal including the imaging signals DS2[m] and DS2[m+1] is output from the imaging unit 10 (if the output of the signal DGS2[m] is started for convenience' sake), the image processing unit 21 starts to generate the image signal DGA2[m] based on the imaging signal DGS2[m]. The image processing unit 21 completes the generation of the image signal DGA2[m] after the image processing time UA2[m] elapses from the starting of the image processing, and stores the generated signals in the line buffer 22.

In the example shown in FIG. 24, it is assumed that the image signals D2[1], D2[2], and D2[3] are the image signals D[m] output from the image signal output unit 23 before the time Tth and the image signal D2[4] is the image signal D[m] output from the image signal output unit 23 after the time Tth.

Before the time Tth, the line L2 temporally precedes the line L3 (line L4). That is, before the time Tth, the output permission pulse PL[m] is not output from the output control unit 31 at the timing when the generation of the image signal DGA2[m] by the image processing unit 21 is completed.

Thus, before the time Tth, the image signal output unit 23 waits for the output of the image signal DGB2[m] by the waiting time UB2[m] until the first horizontal scanning period Hd2[m] after the output permission pulse PL[m] is output, and then outputs the image signal DGB2[m] during the horizontal scanning period Hd2[m].

In the example shown in FIG. 24, the image signal output unit 23 waits for the output of the image signal DGB2[1] by the waiting time UB2[1] after the image signal DGA2[1] is generated, and then outputs the image signal DGB2[1] during the horizontal scanning period Hd2[1]. Similarly, the image signal output unit 23 waits for the output of the image signal DGB2[2] by the waiting time UB2[2] after the image signal DGA2[2] is generated, and then outputs the image signal DGB2[2] during the horizontal scanning period Hd2 [2].

Meanwhile, after the time Tth, the line L4 temporally precedes the line L2 in general. In a case where the line L4 temporally precedes the line L2, if the image processing unit 21 generates the image signal DGA2[m], the display unit 40 can display the image indicated by the image signal DGB2 [m] immediately (during the horizontal scanning period Hd immediately after the generation of the signal). Thus, in a case where the line L4 temporally precedes the line L2, the output permission pulse PL[m] is output from the output control unit 31 at the timing when the generation of the image signal DGA2[m] by the image processing unit 21 is completed.

In the example shown in FIG. 24, the image signal output unit 23 outputs the image signal DGB2[3] during the first horizontal scanning period Hd2[3] after the image signal DGA2[3] is generated and the output permission pulse PL[3] is output.

In the example shown in this drawing, the image signal DGA2[4] is generated after the horizontal scanning period Hd2[4] is started. Thus, the image signal output unit 23 outputs the image signal DGB2[4] during the first horizontal scanning period Hd2[5] after the image signal DGA2[4] is generated and the output permission pulse PL[4] is output. The timing generator 32 sets the horizontal scanning period Hd2[4] to be the inactive horizontal scanning period Hd-D.

As stated above, in the second state shown in FIG. 24, after the time Tth, since the display delay caused by the image processing occurs, the inactive horizontal scanning period Hd-D is inserted into the vertical active data period DVI of the display vertical scanning period Fd2. That is, in the second state, the time length of the display vertical scanning period Fd is a total time of the standard vertical scanning time Td and the extended vertical scanning time Tex.

A delay time ΔT2 to when the display unit 40 displays the image indicated by the image signal D2 from when the imaging unit 10 outputs the imaging signal DS2 is a total time of the time (image processing time UA) required to perform the image processing of the image signal generation unit 20 and the time (waiting time UB) required to wait for the display preparation of the display unit 40 before the time Tth, and is only the time (image processing time UA) required to perform the image processing of the image signal generation unit 20 in a case where the line L4 temporally precedes the line L2 after the time Tth. Thus, the delay time ΔT2 according to the second state is less than the delay time ΔT1 according to the first state.

Hereinafter, the third state will be described using the relationship between the imaging signal DS3 (DGS3) output from the imaging unit 10 during the imaging vertical scanning period Fs3 and the image signal D3 (DGB3) output from the image signal generation unit 20 to the display unit 40 during the display vertical scanning period Fd3 as an example by referring to FIGS. 22 and 25.

FIG. 25 is a timing chart for describing the relationship between the imaging signal DS3[p] (imaging signal DGS3[m]) and the image signal D3[m] (the image signal DGA3[m] and the image signal DGB3[m]).

As shown in FIG. 25, if the imaging signal including the imaging signals DS3[m] and DS3[m+1] is output from the imaging unit 10 (the output of the image DGS3[m] is started for convenience' sake), the image processing unit 21 starts to generate the image signal DGA3[m] based on the imaging signal DGS3[m]. The image processing unit 21 completes the generation of the image signal DGA3[m] after the image processing time UA3[m] elapses from the starting of the image processing, and stores the generated signal in the line buffer 22.

In the third state, the line L4 temporally precedes the line L2 in general. In a case where the line L4 temporally precedes the line L2, if the image processing unit 21 generates the image signal DGA3[m], the display unit 40 can display the image indicated by the image signal DGB3[m] immediately (during the horizontal scanning period Hd immediately after the generation of the signal). Thus, in this case, the output permission pulse PL[m] is output from the output control unit 31 at the timing when the generation of the image signal DGA3[m] by the image processing unit 21 is completed.

Specifically, in the example shown in FIG. 25, the image signal output unit 23 outputs the image signal DGB3[1] during the first horizontal scanning period Hd3[3] after the image signal DGA3[1] is generated and the output permission pulse PL[1] is output, outputs the image signal DGB3[2] during the first horizontal scanning period Hd3[5] after the image signal DGA3[2] is generated and the output permission pulse PL[2] is output, outputs the image signal DGB3[3] during the first horizontal scanning period Hd3[7] after the image signal DGA3[3] is generated and the output permission pulse PL[3] is output, and outputs the image signal DGB3[4] during the first horizontal scanning period Hd3[9] after the image signal DGA3[4] is generated and the output permission pulse PL[4] is output. In this case, since the vertical active data period DVI of the display vertical scanning period Fd1 is started but the output permission pulse PL[1] is not output, the timing generator 32 performs a process of outputting the inactive horizontal scanning period Hd-D during the horizontal scanning periods hd3[1] and Hd3[2] and similarly outputting the inactive horizontal scanning period Hd-D during the periods Hd3[4], Hd3[6], and Hd3[8].

As stated above, in the third state shown in FIG. 25, since the display delay caused by the image processing occurs, the inactive horizontal scanning period Hd-D is inserted into the vertical active data period DVI of the display vertical scanning period Fd3. As a result, in the third state, the time length of the display vertical scanning period Fd is adjusted with the precision of the horizontal scanning period Hd such that the display unit 40 can display in synchronization with the imaging signal DS output during the imaging vertical scanning period Fs. That is, roughly speaking, in the third state, the display vertical scanning period Fd is adjusted so as to be substantially the same as the imaging vertical scanning period Fs.

In the third state, in a case where the line L4 temporally precedes the line L2, the display unit 40 displays the image indicated by the image signal D[m] during the first horizontal scanning period Hd after the image processing unit 21 generates the image signal D[m]. Thus, a delay time ΔT3 from when the imaging unit 10 outputs the imaging signal DS3 to when the display unit 40 displays the image indicated by the image signal D3 is substantially the same as the time (image processing time UA) required to perform the image processing of the image signal generation unit 20. Specifically, in the third state, a delay time ΔT3 from when the imaging unit 10 starts to output the imaging signal DS[p] to when the display unit 40 starts to display the image indicated by the image signal D[m] and the image processing time UA necessary for the image processing unit 21 to generate the image signal D[m] are equal with the precision of the horizontal scanning period Hd.

Thus, in the third state, the delay from the imaging by the imaging unit 10 to the displaying by the display unit 40 can be minimized with the precision of the horizontal scanning period Hd. In this case, the delay time ΔT3 is less than the delay time ΔT1 according to the first state, and is equal to or less than the delay time ΔT2 according to the second state.

As stated above, a time (cycle) necessary for the display unit 40 to display one screen is less than a time (cycle) necessary for the imaging unit 10 to image one screen. Thus, even in a case where the vehicle imaging display system 1 operates in the first state and the display delay due to the bottleneck phenomenon occurring in the display preparation of the display unit 40 occurs, the display delay slowly is reduced for every imaging vertical scanning period Fs.

That is, even in a case where the vehicle imaging display system 1 operates in the first state, the vehicle imaging display system may ultimately transition to the operation in the third state, and may maintain the operation in the third state after the operation in the third state is started. As a result, the display timing of the display unit 40 can follow the completion timing of the image processing of the image processing unit 21 with the precision of the horizontal scanning period Hd.

Thus, if the vehicle imaging display system 1 starts the operation, the vehicle imaging display system can maintain the state in which the delay time from the imaging by the imaging unit 10 to the image displaying by the display unit 40 is minimized except for the time immediately after the operation is started.

4. Advantages of First Embodiment

In the vehicle imaging display system 1 according to the present embodiment, the image signal D[m] is output from the image signal output unit 23 in a case where the first condition and the second condition are satisfied, and the output timing of the image signal D[m] from the image signal output unit 23 is adjusted with the precision of the horizontal scanning period Hd by inserting the inactive horizontal scanning period Hd-D in a case where the first condition or the second condition is not satisfied. That is, in the vehicle imaging display system 1 according to the present embodiment, the display unit 40 can display the image indicated by the image signal D[m] during the first horizontal scanning period Hd after the image processing unit 21 generates the image signal D[m]. Accordingly, the delay from the imaging by the imaging unit 10 to the displaying by the display unit 40 can be minimized with the precision of the horizontal scanning period Hd. Thus, the delay time from the imaging to the displaying is reduced, and thus, it is possible to display the image of the outside of the vehicle which is useful for safely driving the vehicle.

In the vehicle imaging display system 1 according to the present embodiment, the time length of the display vertical scanning period Fd can be varied and can be maintained so as to be substantially the same as the time length of the imaging vertical scanning period Fs by inserting the inactive horizontal scanning period Hd-D into the vertical active data period DVI.

Thus, it is possible to realize high-quality display with suppressed flickers in displaying. In a case where the phase difference is greater than the predetermined time, it is possible to gradually reduce the phase difference until the phase difference is equal to or less than the predetermined time, and since the phase difference is maintained after the phase difference converges on the length which is equal to or less than the predetermined time, a possibility that a delay capable of being predicted by the driver will occur is reduced.

For example, according to the present embodiment, even in a case where a part or all of the phase difference between the imaging unit 10 and the display unit 40, the frame rate of the imaging unit 10, and the highest frame rate at which the display unit 40 can display is changed, such as a case the image processing time is changed due to a change of the image processing method, a case where the image processing time UA is changed for every line, a case where the imaging unit 10 is replaced with an imaging unit having a different frame rate, or a case where the display unit 40 is replaced with a display unit having a different frame rate, the phase difference PD can automatically converge on the length equal to or less than the image processing time UA.

B. Second Embodiment

As shown in FIG. 20, it has been described in the aforementioned first embodiment that the output timing of the image signal D[m] is adjusted with the precision of the horizontal scanning period Hd and the time length of the horizontal scanning period Hd is the fixed length by inserting the inactive horizontal scanning period Hd-D into the vertical active data period DVI.

In contrast, the vehicle imaging display system according to the second embodiment is different from the vehicle imaging display system 1 according to the first embodiment in that the output timing of the image signal D[m] is adjusted at, for example, a cycle of the display dot clock signal DCLK by setting the time length of the horizontal scanning period Hd as the variable length.

Hereinafter, the vehicle imaging display system according to the second embodiment will be described with reference to FIGS. 26 to 28. Components having the same advantages or functions of the second embodiment to be described below as those of the first embodiment will be assigned the reference signs referred to in the aforementioned description, and thus, the detailed description thereof will be appropriately omitted (the same is true of modification examples to be described below).

Figure 26:
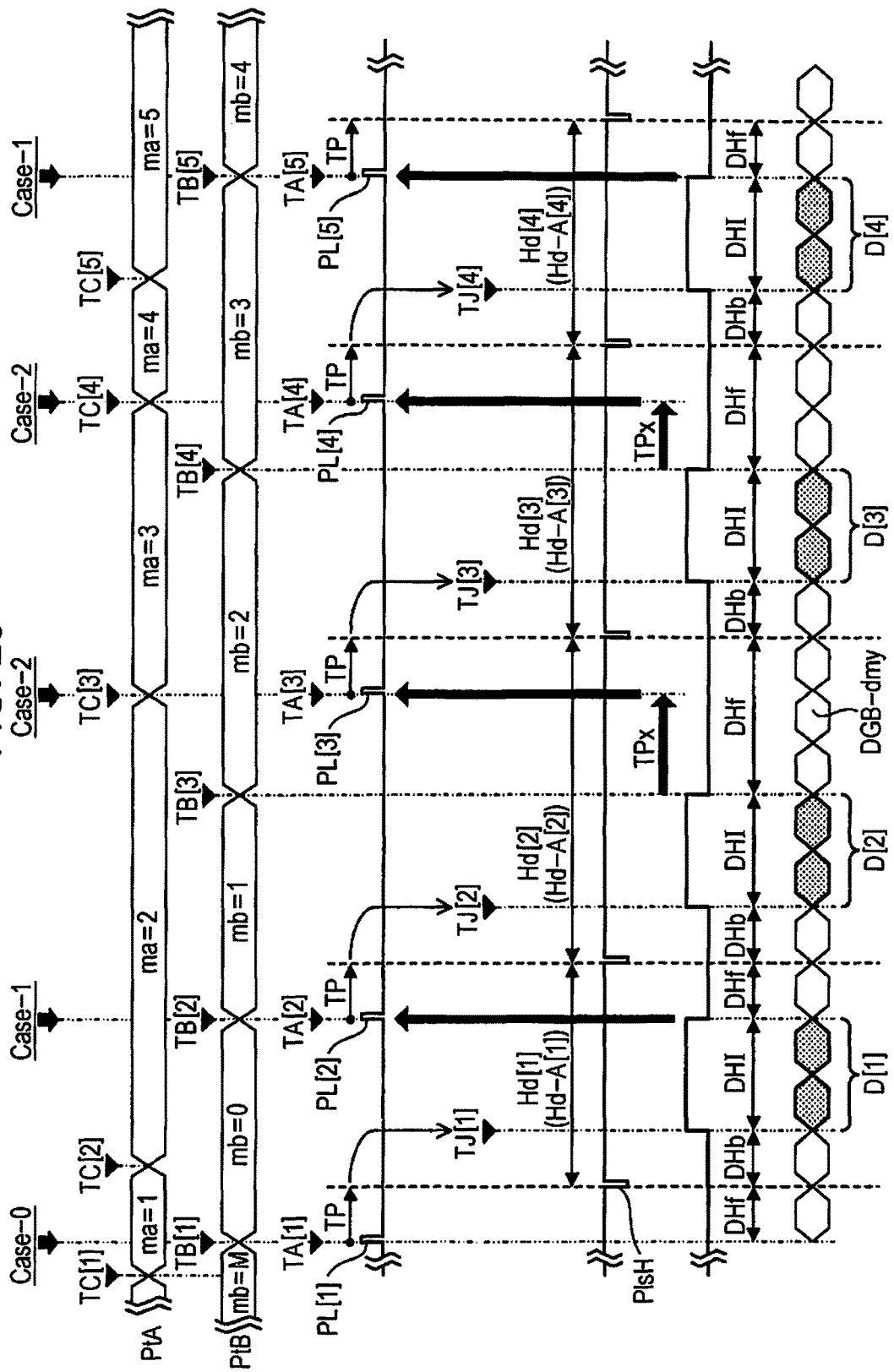
FIG. 26 is a timing chart for describing an operation of a vehicle imaging display system according to a second embodiment of the present invention.

FIG. 26 is an explanatory diagram for describing the relationship between the output control signal CTR, the enable signal DEnb, and a display horizontal synchronization signal DHsync2 which are generated by the timing control unit 30 (the output control unit 31 and the timing generator 32) included in the vehicle imaging display system according to the second embodiment.

The timing control unit 30 included in the vehicle imaging display system according to the second embodiment has the same configuration as that of the vehicle imaging display system 1 (see FIG. 20) according to the first embodiment except that the timing generator 32 generates a display horizontal synchronization signal DHsync2 having a horizontal synchronization pulse PlsH with a variable cycle instead of the display horizontal synchronization signal DHsync, and generates a display vertical synchronization signal DVsync2 having a vertical synchronization pulse PlsV with a variable cycle instead of the display vertical synchronization signal DVsync.

As shown in FIG. 26, similarly to the first embodiment, the output control unit 31 according to the second embodiment sets the output permission pulse PL[m] to the output control signal CTR at the later time (the image processing determination time TA[m] since the second aspect is adopted in this drawing) of the image processing determination time TA[m] and the display preparation determination time TB[m].

As shown in FIG. 26, the timing generator 32 according to the second embodiment outputs the horizontal synchronization pulse PlsH as the display horizontal synchronization signal DHsync2 after a reference front porch time TP which is a fixed time length elapses from the timing when the output permission pulse PL[m] is set to the output control signal CTR output from the output control unit 31.

Thus, in a case where the generation of the image signal D[m] is completed before the display preparation determination time TB[m] and the image signal generation time TC[m] elapses (Case-1), the time length of the horizontal front porch period DHf becomes the reference front porch time TP.

Meanwhile, in a case where the generation of the image signal D[m] is not completed before the display preparation determination time TB[m], that is, in a case where the image signal generation time TC[m] arrives later than the display preparation determination time TB[m] (Case-2), the time length of the horizontal front porch period DHf is the total time of the reference front porch time TP and an extended front porch time TPX which is a time length from the display preparation determination time TB[m] to the image signal generation time TC[m] (image processing determination time TA[m]).

As stated above, in the timing generator 32 according to the second embodiment, the output control unit 31 determines that the output preparation of the image signal D[m] is completed, waits to output the output permission pulse PL[m] as the output control signal CTR, and starts the horizontal scanning period Hd[m] after only the reference front porch time TP from the output of the output permission pulse PL[m]. In other words, the timing generator 32 according to the second embodiment extends the horizontal front porch period DHf until the output preparation of the image signal D[m] is completed.

Thus, for example, even in a case where the image processing of the image processing unit 21 on the image signal D[m] is delayed, the image signal output unit 23 can output the image signal D[m] during the horizontal scanning period Hd[m]. In this case, a delay time from when the imaging unit 10 outputs the imaging signal DGS[m] to when the display unit 40 displays the image based on the image signal D[m] is minimized with the precision of the display dot clock signal DCLK.

Figure 27:
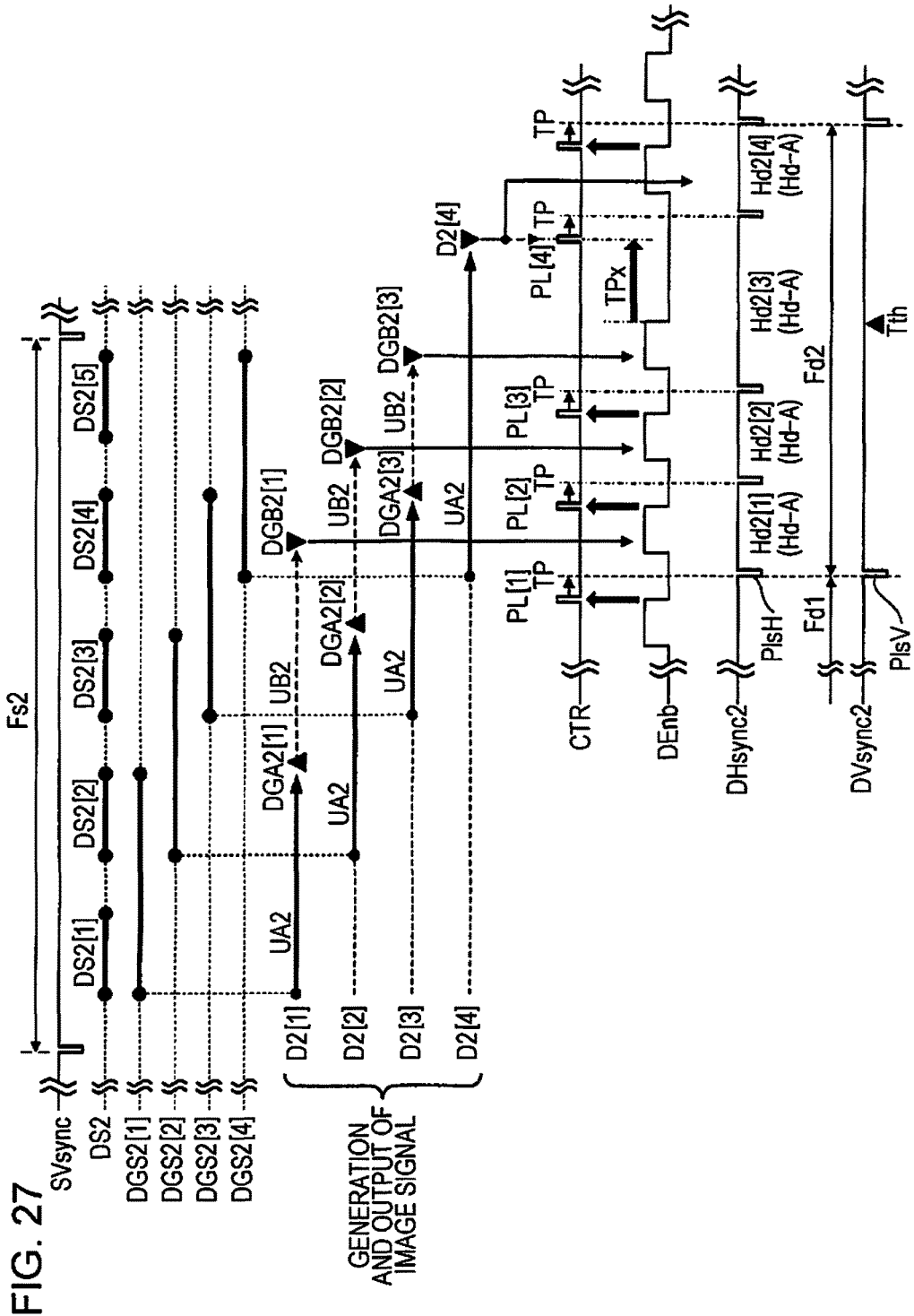
FIG. 27 is a timing chart for describing the operation of the vehicle imaging display system according to the second embodiment.

FIG. 27 is a timing chart for describing an operation of the vehicle imaging display system according to the second embodiment in a state (that is, the second state described in FIG. 24) in which the display delay as the bottleneck phenomenon occurring in the display preparation of the display unit 40 is resolved. FIG. 28 is a timing chart for describing the operation of the vehicle imaging display system according to the second embodiment in a state (that is, the third state described in FIG. 25) in which the display delay due to the bottleneck phenomenon occurring in the image processing of the image processing unit 21 occurs. In FIGS. 27 and 28, the reference signs described in FIGS. 22 to 25 will be used.

In FIG. 27, for example, the image signal DGA2[3] is generated before a falling timing of the enable signal DEnb during the horizontal scanning period Hd2[2]. Thus, the output permission pulse PL[3] is output at the falling timing of the enable signal DEnb during the horizontal scanning period Hd2[2]. In this case, the time length of the horizontal front porch period DHf of the horizontal scanning period Hd2[2] becomes the reference front porch time TP.

Meanwhile, in the example shown in this drawing, the timing when the image signal DGA2[4] is generated is later than the falling timing of the enable signal DEnb during the horizontal scanning period Hd2[3]. Thus, the output permission pulse PL[4] is output at the timing when the image signal DGA2[4] is generated. In this case, the time length of the horizontal front porch period DHf of the horizontal scanning period Hd2[3] becomes the total time length of the reference front porch time TP and the extended front porch time TPX (time from the falling timing of the enable signal DEnb during the horizontal scanning period Hd2[3] to the output of the output permission pulse PL[4]). That is, the horizontal scanning period Hd is extended depending on the status of the image processing after the time Tth when the display delay due to the display preparation of the display unit 40 is resolved.

Figure 28:
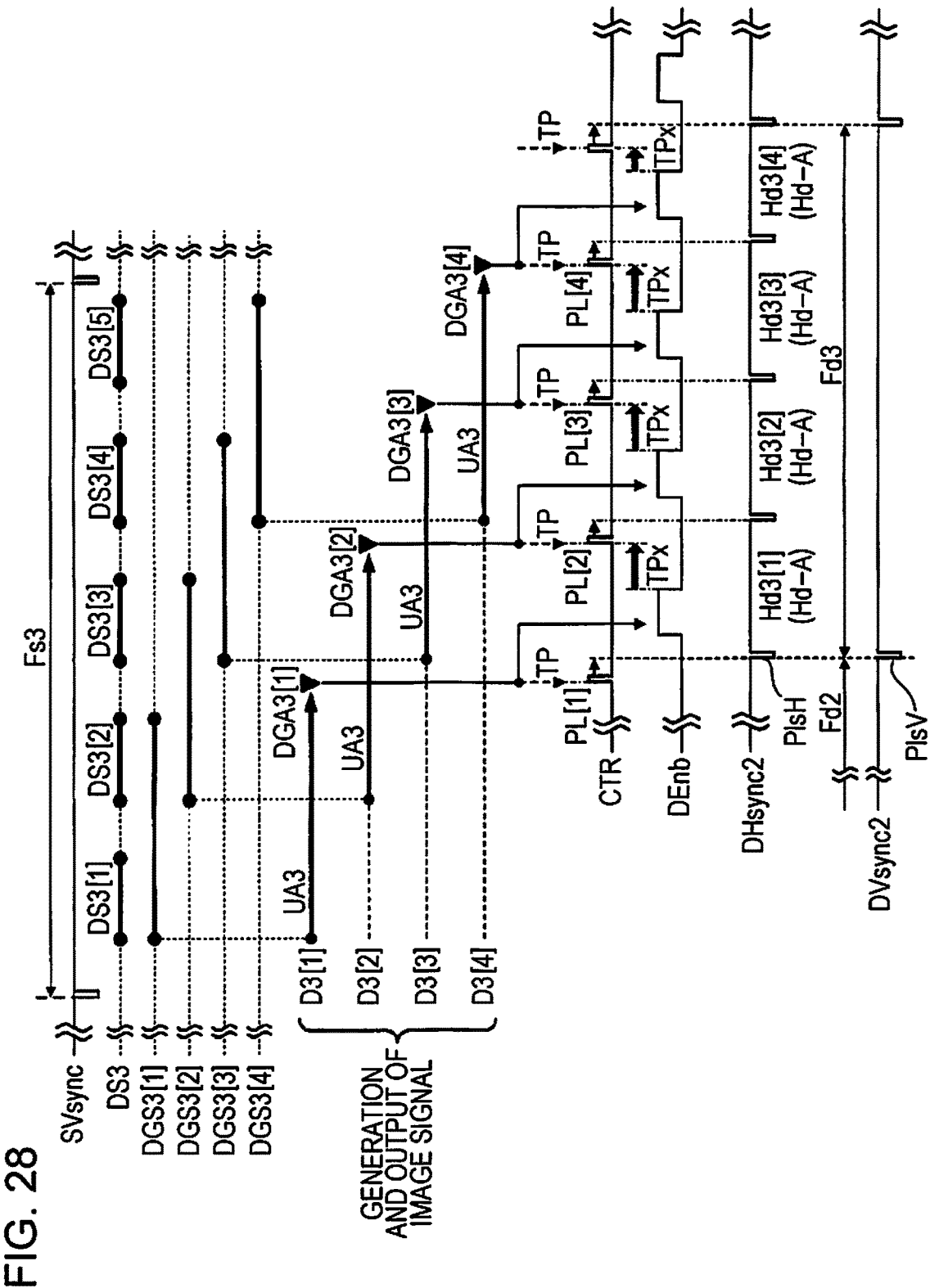
FIG. 28 is a timing chart for describing the operation of the vehicle imaging display system according to the second embodiment.

In FIG. 28, the timing when the image signal DGA3[$m$] is generated is later than the falling timing of the enable signal DEnb during the horizontal scanning period Hd3[$m$-1]. Thus, the output permission pulse PL[m] is output at the timing when the image signal DGA3[$m$] is generated. In this case, the time length of the horizontal front porch period DHf of the horizontal scanning period Hd3[$m$] becomes the total time length of the reference front porch time TP and the extended front porch time TPX (time from the falling timing of the enable signal DEnb during the horizontal scanning period Hd3[$m$] to the output of the output permission pulse PL[m]). That is, in a state (third state) in which the display delay due to the bottleneck phenomenon of the imaging processing of the image processing unit 21 occurs, the horizontal scanning period Hd is delayed depending on the status of the image processing.

As can be apparent from FIGS. 27 and 28, in the second embodiment, there is no inactive horizontal scanning period Hd-D, and all the horizontal scanning periods Hd become the active horizontal scanning periods Hd-A.

In the second embodiment, for example, since the horizontal scanning period Hd is varied for every display dot clock signal DCLK, the display vertical scanning period Fd also has a variable time length.

C. Modification Examples

The aforementioned embodiments may be variously modified. Specific modification aspects will be described below. Two or more aspects arbitrarily selected from the following examples may be appropriately combined with each other without a contradiction therebetween. In modification examples to be described below, common points with the above-described embodiments of the present invention will be omitted in order to avoid the redundant description thereof.

Modification Example 1

Although it has been described in the aforementioned embodiments that the HUD is used as the display unit 40, the present invention is not limited to such an aspect, and the display unit may be a rear-projection projector, a liquid crystal display device, an organic light emitting diode (OLED) display device, or a plasma display device.

Modification Example 2

Although it has been described in the aforementioned embodiment and modification examples that the data transmission between the image processing circuit 100 and the display unit 40 is performed through the parallel interface, the data transmission therebetween may be performed through a low-voltage differential (LVDS) serial interface, or an Ethernet (registered trademark) serial interface.

Modification Example 3

Although it has been described in the aforementioned embodiment and modification examples that the imaging vertical scanning period Fs defined by the imaging vertical synchronization signal SVsync has a time length which is equal to or greater than the display vertical scanning period Fd defined by the display vertical synchronization signal DVsync (or DVsync2), the present invention is not limited to such an aspect, and the imaging vertical scanning period Fs may have a time length less than the display vertical scanning period Fd.

Modification Example 4

Although it has been described in the aforementioned embodiment and modification examples that the output control unit 31 determines whether or not the preparation to output the image signal D[m] is completed based on the writing-completion signal PtA output from the image processing unit 21 and the output-completion signal PtB output from the image signal output unit 23, the present invention is not limited to such an aspect, and the output control unit 31 may determine whether or not the preparation to output the image signal D[m] is completed by determining that the image signal D[m] is registered in the line buffer 22 and the image signal D[m-1] is read from the line buffer 22 by periodically referring to the line buffer 22.

Modification Example 5

Although it has been described in the aforementioned embodiment and modification examples that the image processing times UA[m] are changed for the respective lines, the present invention is not limited to such an aspect, and the image processing times UA[m] may be the same between the lines.

Modification Example 6

Although the aspect in which the image processing unit 21 performs both the process (first process) of relatively further magnifying the area close to the vehicle body in the left and right direction than the area far away from the vehicle body and the process (second process) of relatively further magnifying the center area in the up and down direction than the upper or lower area has been described in the aforementioned embodiments, the image processing unit may perform any one thereof.

The process (first process) of relatively further magnifying the area close to the vehicle body in the left and right direction than the area far away from the vehicle body is a process capable of being realized by at least any one of the process of minifying the area far away from the vehicle body and the process of magnifying the area close to the vehicle body. That is, it is not necessary to perform the process of minifying the area far away from the vehicle body in a case where the area close to the vehicle body is magnified, and it is not necessary to perform the process of magnifying the area close to the vehicle body in a case where the area far away from the vehicle body is minified.

Similarly, the process (second process) of relatively further magnifying the center area in the up and down direction than the upper or lower area is a process capable of being realized by at least one of the process of magnifying the center area, the process of minifying the upper area, and the process of minifying the lower area. That is, it is not necessary to perform the process of magnifying the upper or lower area in a case where the center area is magnified, and it is not necessary to perform the process of magnifying the center area in a case where the upper or lower area is minified.

In the magnification and minification process, a ratio between the respective areas LR1 to LR6 (see FIG. 12) or the respective areas BR1 to BR9 (see FIG. 19), the number of areas to be divided, a magnification ratio, or a minification ratio thereof may be appropriately changed.

Modification Example 7

Although it has been described in the aforementioned embodiment that the mirror image generation process is performed after the trimming process and then the horizontal-direction minification and magnification process and the vertical-direction minification and magnification process are performed, the present invention is not limited thereto, and the performing order may be appropriately changed. It has been described in the aforementioned embodiments that after the image of the trimming area Tarea trimmed in the trimming process is magnified so as to match to the size of the display area AD, the mirror image generation process, the horizontal-direction minification and magnification process, and the vertical-direction minification and magnification process are performed. However, the mirror image generation process may be performed without the process of magnifying the trimmed image, and then the magnification process for matching to the size of the display area AD may be performed in the horizontal-direction minification and magnification process and the vertical-direction minification and magnification process. In such a configuration, it is possible to reduce the image processing time.

Modification Example 8

Although the area in which the image indicating the rear left area LR is visually perceived, the area in which the image indicating the rear area BR is visually perceived, and the area in which the image indicating the rear right area RR is visually perceived have been described in FIGS. 3A, 3B, and 3C in the aforementioned embodiments, these areas may be appropriately changed without departing from the gist of the present invention.

Modification Example 9

Since the brightness of the image reflected on the wing mirror or the rear-view mirror is not sufficient while driving at night, the driver may not sense danger. Thus, the image processing unit 21 may perform the process of correcting the brightness of the image based on the imaging signal DS in addition to the image generation process described in the aforementioned embodiments. It is possible to display an image of the outside of the vehicle more useful for safely driving the vehicle even though the image is an image imaged in a dark place by performing the correction for increasing the brightness of the image based on the imaging signal DS.

The entire disclosure of Japanese Patent Application No. 2014-163282, filed Aug. 11, 2014 and Japanese Patent Application No. 2015-136255, filed Jul. 7, 2015 are expressly incorporated by reference herein.

REFERENCE SIGN

Reference Signs List 1 vehicle imaging display system
10-1 rear-left-area imaging unit
10-2 rear-center-area imaging unit
10-3 rear-right-area imaging unit
11 imaging optical system
12 image sensor
13 timing generator
20 image signal generation unit
21 image processing unit
218 trimming process unit
219 resizing process unit
220 mirror image generation unit
221 horizontal-direction minification and magnification process unit
222 vertical-direction minification and magnification process unit
22 line buffer
23 image signal output unit
30 timing control unit
31 output control unit
32 timing generator
33 parameter transmission unit
40-1 left display unit
40-2 center display unit
40-3 right display unit
41 controller
42 liquid crystal panel
50 control unit
60 operation unit
100-1, 100-2, 100-3 image processing circuit

The invention claimed is:

1. A vehicle imaging device for displaying an image of the outside of a vehicle on a display unit used in the vehicle, the device comprising:
    an imaging unit that is attached to the vehicle, images an image of the outside of the vehicle, and outputs an imaging signal, the imaging unit imaging an image of a rear lateral area of the vehicle; and
    an image processing circuit including
        an image signal generation unit that performs a generation process of generating an image signal indicating an image to be displayed in each line of the display unit based on the imaging signal, and outputs the image signal to the display unit, and
        a timing control unit that controls a timing when the image signal generation unit outputs the image signal to the display unit,
    wherein, when a time from when a frame of the imaging signal is started to when a frame of the image signal output to the display unit is started is a phase difference, a frame rate of the imaging unit is a first frame rate, and a highest frame rate at which the display unit is configured to display is a second frame rate, the timing control unit is configured to perform first timing control for decreasing the phase difference by causing the image signal generation unit to output the image signal such that the frame rate of the display unit is the second frame rate in a case where the phase difference is greater than a predetermined time, and second timing control for causing the image signal generation unit to output the image signal such that the frame rate of the display unit is the first frame rate after the phase difference is equal to or less than the predetermined time, wherein the generation process includes at least one of a first process or a second process, or both, the first process is a process of relatively further magnifying an area of the image based on the imaging signal which is close to a vehicle body in a left and right direction than an area thereof which is far away from the vehicle body, and the second process is a process of relatively further magnifying an area of the image based on the imaging signal which is located in the center in an up and down direction than an area thereof which is located in an upper or lower area than the center area, wherein, when a length of the area close to the vehicle body in the left and right direction is X1 and a magnification ratio thereof is H1, and a length of the area far away from the vehicle body in the left and right direction is X2 and a minification ratio thereof is H2, the H1 and the H2 are determined such that $X1+X2=X1 \cdot H1+X2 \cdot H2$ in the first process, and when a length of the center area in the up and down direction is Y1 and a magnification ratio thereof is V1, a length of the upper area in the up and down direction is Y2 and a minification ratio thereof is V2, and a length of the lower area in the up and down direction is Y3 and a minification ratio thereof is V3, the V1, the V2 and the V3 are determined such that $Y1+Y2+Y3=Y1 \cdot V1+Y2 \cdot V2+Y3 \cdot V3$ in the second process.

2. The vehicle imaging device according to claim 1, further comprising:

a display device through which an instruction of a user is configured to be input, wherein at least one of the magnification ratio of the area close to the vehicle body in the left and right direction and the minification ratio of the area far away from the vehicle body in the left and right direction, and at least one of the magnification ratio of the center area in the up and down direction, the minification ratio of the upper area in the up and down direction, and the minification ratio of the lower area in the up and down direction are input through the display device in the first process.

3. The vehicle imaging device according to claim 1, wherein the generation process includes a trimming process of trimming the image based on the imaging signal.

4. The vehicle imaging device according to claim 3, wherein the imaging unit is fixed to and attached to the vehicle, and in the trimming process, the image based on the imaging signal is trimmed in response to an operation of a display device through which an instruction of a user is input.

5. The vehicle imaging device according to claim 1, wherein the generation process includes a trimming process of trimming the image based on the imaging signal, and a magnification varying process of magnifying or minifying a first area and a second area of the image based on the imaging signal to cause a magnification of the first area and a magnification of the second area to be different, and the magnification varying process is performed after the trimming process.

6. The vehicle imaging device according to claim 1, wherein the generation process includes a process of generating a mirror image acquired by reversing the left and right of the image based on the imaging signal.

7. The vehicle imaging device according to claim 1, wherein the imaging unit includes a lens, and an image sensor that outputs the imaging signal, and the generation process includes a process of correcting distortion of the lens.

8. A vehicle imaging display system comprising:

the vehicle imaging device according to claim 1; and the display unit.

9. The vehicle imaging display system according to claim 8, wherein the display unit includes a projector, a field lens that adjusts a direction of irradiation light of the projector, and a combiner that reflects light from the field lens to output the reflected light through an opening, and the projector and the field lens are provided above the opening.

10. The vehicle imaging display system according to claim 8, wherein three pairs of vehicle imaging devices and display units are provided and the three pairs include a first vehicle imaging device that outputs the image signal indicating an image of a rear left side of the vehicle, a second vehicle imaging device that outputs the image signal indicating an image of a rear side of the vehicle, a third vehicle imaging device that outputs the image signal indicating an image of a rear right side of the vehicle, a first display unit that displays the image signal output from the first vehicle imaging device, a second display unit that displays the image signal output from the second vehicle imaging device, and a third display unit that displays the image signal output from the third vehicle imaging device, the first display unit is disposed on a left side of the second display unit, the third display unit is disposed in a right side of the second display unit, and the first display unit that displays the image signal output from the first vehicle imaging device is provided.

11. A vehicle comprising the vehicle imaging display system according to claim 8.

12. An imaging device for displaying an image of the outside of a vehicle on a display unit used in the vehicle, the device comprising:

an image sensor that captures an image of the outside of the vehicle, and outputs an imaging signal corresponding to the image, the imaging unit imaging an image of a rear lateral area of the vehicle; and an image processing circuit including an image signal generation unit that performs a generation process of generating an image signal indicating an image to be displayed in the display unit based on the imaging signal, and outputs the image signal to the display unit, and a timing control unit that controls a capturing timing of the imaging signal by the image sensor based on a first frame rate, a display timing of the image signal on the display unit based on a second frame rate, and a phase difference between the capturing timing of the imaging signal and the display timing of the image signal, wherein the second frame rate is faster than the first frame rate when the phase difference becomes larger than a predetermined time, wherein the second frame rate is same as the first frame rate when the phase difference becomes smaller than or equal to the predetermined time, wherein the generation process includes at least one of a first process or a second process, or both, the first process is a process of relatively further magnifying an area of the image based on the imaging signal which is close to a vehicle body in a left and right direction than an area thereof which is far away from the vehicle body, and the second process is a process of relatively further magnifying an area of the image based on the imaging signal which is located in the center in an up and down direction than an area thereof which is located in an upper or lower area than the center area, wherein, when a length of the area close to the vehicle body in the left and right direction is X1 and a magnification ratio thereof is H1, and a length of the area far away from the vehicle body in the left and right direction is X2 and a minification ratio thereof is H2, the H1 and the H2 are determined such that $X1+X2=X1 \cdot H1+X2 \cdot H2$ in the first process, and when a length of the center area in the up and down direction is Y1 and a magnification ratio thereof is V1, a length of the upper area in the up and down direction is Y2 and a minification ratio thereof is V2, and a length of the lower area in the up and down direction is Y3 and a minification ratio thereof is V3, the V1, the V2 and the V3 are determined such that $Y1+Y2+Y3=Y1 \cdot V1+Y2 \cdot V2+Y3 \cdot V3$ in the second process.

13. A vehicle imaging display system comprising:
the imaging device according to claim 12; and
the display unit.

14. A vehicle comprising the vehicle imaging display system according to claim 13.

\* \* \* \* \*